(12) United States Patent
Yamamoto et al.

(10) Patent No.: US 7,801,633 B2
(45) Date of Patent: Sep. 21, 2010

(54) SCHEDULING METHOD AND PROGRAM FOR A SUBSTRATE TREATING APPARATUS

(75) Inventors: Masahiro Yamamoto, Kyoto (JP); Daigo Yamada, Kyoto (JP)

(73) Assignee: Dainippon Screen Mfg. Co., Ltd. (JP)

( * ) Notice: Subject to any disclaimer, the term of this patent is extended or adjusted under 35 U.S.C. 154(b) by 203 days.

(21) Appl. No.: 12/170,042

(22) Filed: Jul. 9, 2008

(65) Prior Publication Data

US 2009/0018686 A1 Jan. 15, 2009

(30) Foreign Application Priority Data

| Jul. 10, 2007 | (JP) | ............................. 2007-181080 |
| Aug. 16, 2007 | (JP) | ............................. 2007-212090 |
| Dec. 11, 2007 | (JP) | ............................. 2007-319503 |
| Dec. 11, 2007 | (JP) | ............................. 2007-319504 |
| Dec. 11, 2007 | (JP) | ............................. 2007-319505 |
| May 21, 2008 | (JP) | ............................. 2008-133268 |

(51) Int. Cl.
*G06F 19/00* (2006.01)
(52) U.S. Cl. ........................ 700/100; 700/101; 700/102
(58) Field of Classification Search ................. 700/100, 700/101, 102
See application file for complete search history.

(56) References Cited

U.S. PATENT DOCUMENTS

| 5,442,561 | A | * | 8/1995 | Yoshizawa et al. ........... 700/100 |
| 5,787,000 | A | * | 7/1998 | Lilly et al. .................... 700/95 |
| 5,818,716 | A | | 10/1998 | Chin et al. |
| 5,826,236 | A | * | 10/1998 | Narimatsu et al. ............. 705/8 |
| 5,890,134 | A | * | 3/1999 | Fox ................................ 705/9 |
| 6,438,436 | B1 | | 8/2002 | Hohkibara et al. |
| 6,601,035 | B1 | * | 7/2003 | Panagos et al. ................ 705/8 |

(Continued)

FOREIGN PATENT DOCUMENTS

JP 2003-241818 8/2003

(Continued)

*Primary Examiner*—Michael D Masinick
(74) *Attorney, Agent, or Firm*—Ostrolenk Faber LLP

(57) ABSTRACT

A scheduling method for a substrate treating apparatus having a plurality of treating units for treating substrates, wherein, based on a procedure including a plurality of treating steps, a controller determines an order of treating a plurality of lots successively in the treating units. The method includes a step of preparing a plurality of schedules through execution of a basic allocating method, based on a systematic chart representing combinations of the treating steps for the respective lots, for allocating a first treating step of one of the lots, and thereafter, while following the systematic chart from the treating step, for searching and allocating as a next treating step a treating step selected from among succeeding treating steps in the lots, whose preceding treating step has an earliest expected completion time of all preceding treating steps; and a first allocating method for allocating treating steps based on the basic allocating method, and when a waiting time occurring with one of the treating steps exceeds an allowed time for enabling a standby at one of the treating units, for avoiding allocation of the one of the treating steps and restarting a search at one branching point before a branching point upstream of the one of said treating steps. The method further includes a step of selecting one schedule having been completed within a specified time, from the plurality of schedules prepared.

53 Claims, 66 Drawing Sheets

U.S. PATENT DOCUMENTS

| | | | |
|---|---|---|---|
| 6,748,287 B1 * | 6/2004 | Hagen et al. | 700/99 |
| 6,807,452 B2 | 10/2004 | Mukuta et al. | |
| 6,889,105 B2 | 5/2005 | Mukuta et al. | |
| 7,043,322 B1 * | 5/2006 | Denton et al. | 700/100 |
| 7,337,032 B1 * | 2/2008 | Nettles et al. | 700/100 |
| 2004/0153187 A1 * | 8/2004 | Knight et al. | 700/99 |
| 2007/0282476 A1 * | 12/2007 | Song et al. | 700/100 |

FOREIGN PATENT DOCUMENTS

| | | |
|---|---|---|
| JP | 2003-243274 | 8/2003 |

* cited by examiner

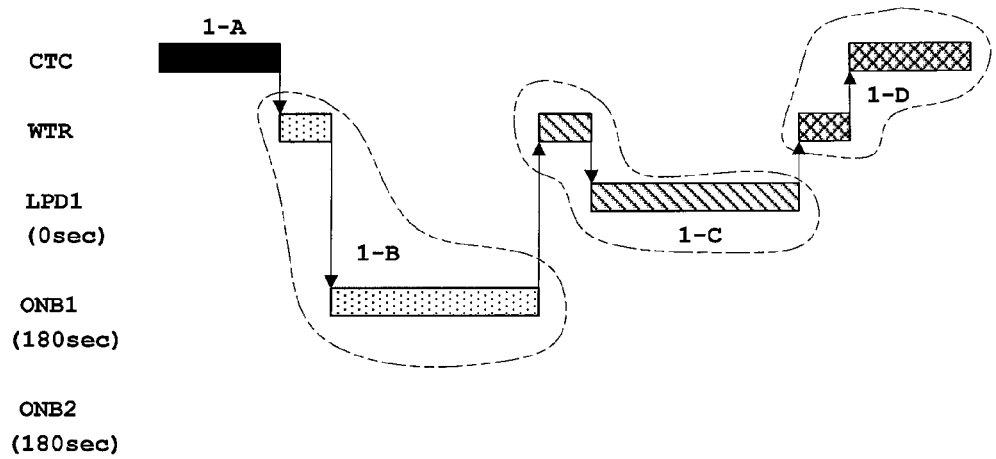
Fig.5A   Lot 1
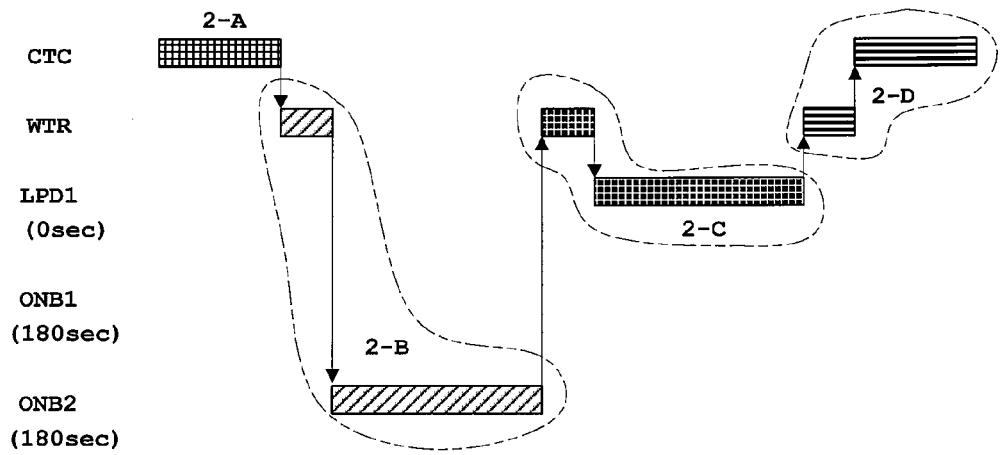
Fig.5B   Lot 2

Fig.7A Step 1
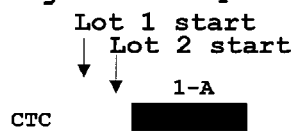
CTC
WTR
LPD1
(0sec)
ONB1
(180sec)
ONB2
(180sec)
Fig.7B Step 2
CTC
WTR
LPD1
(0sec)
ONB1
(180sec)
ONB2
(180sec)
Fig.7C Step 3
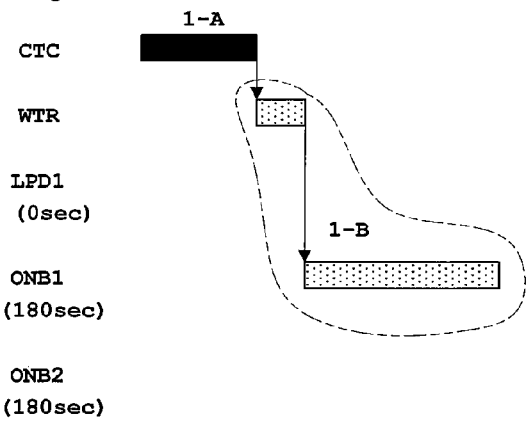
CTC
WTR
LPD1
(0sec)
ONB1
(180sec)
ONB2
(180sec)

Fig. 8A  Step 4
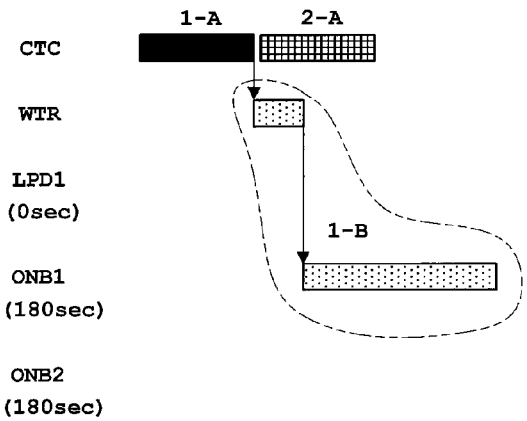
Fig. 8B  Step 5
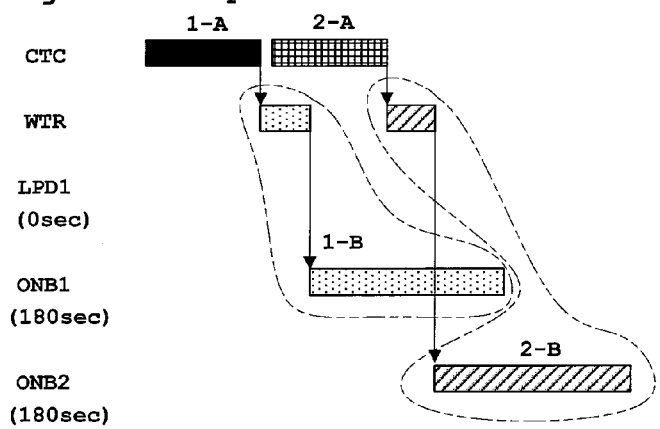
Fig. 8C  Step 6
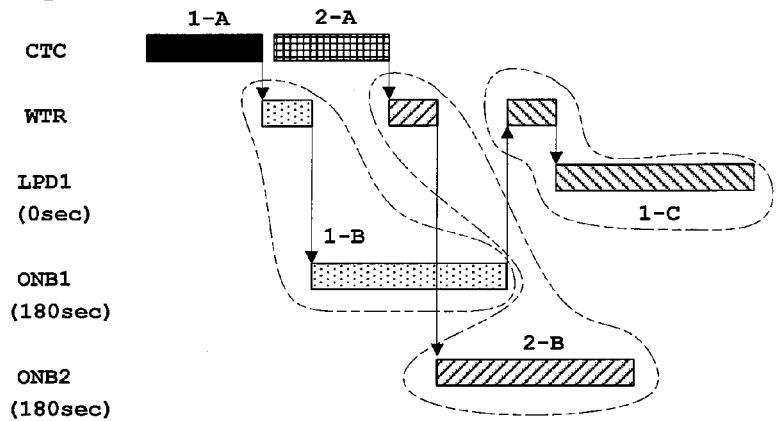

Fig. 9A  Step 7
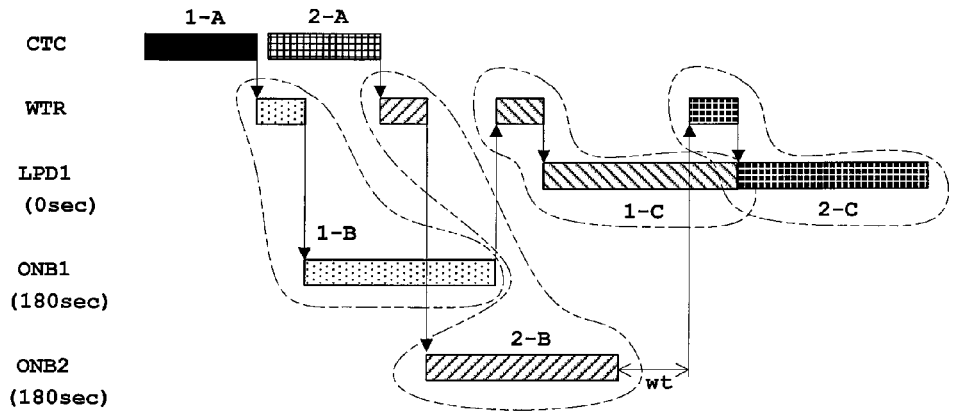
Fig. 9B  Step 8
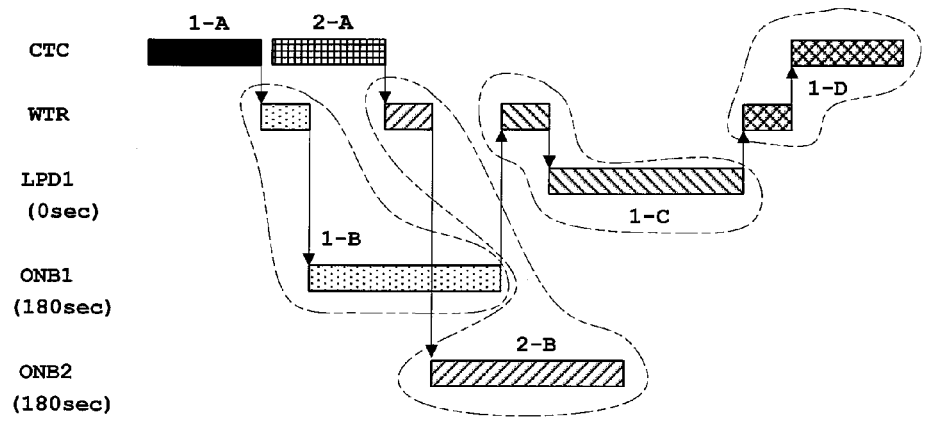
Fig. 9C  Step 9
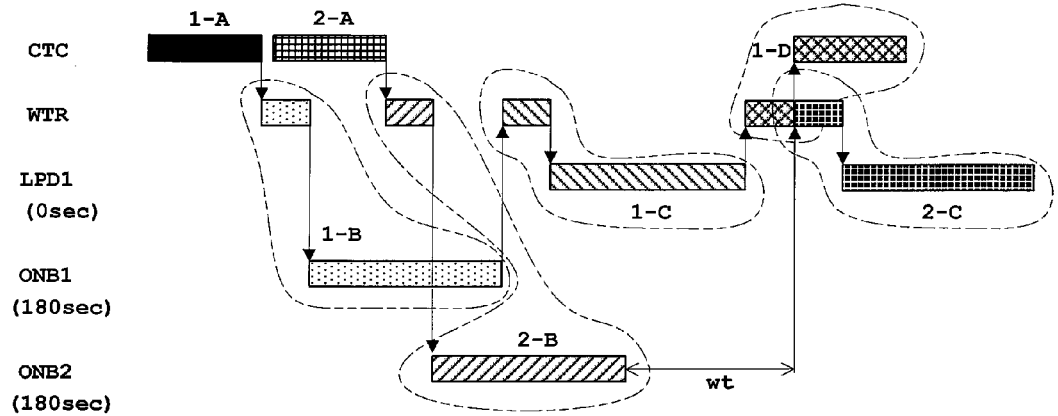

Fig.10A  Step 10
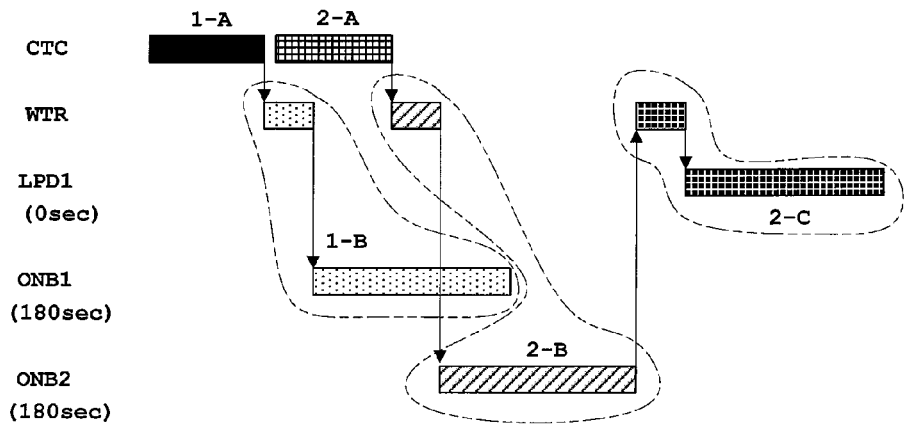
Fig.10B  Step 11
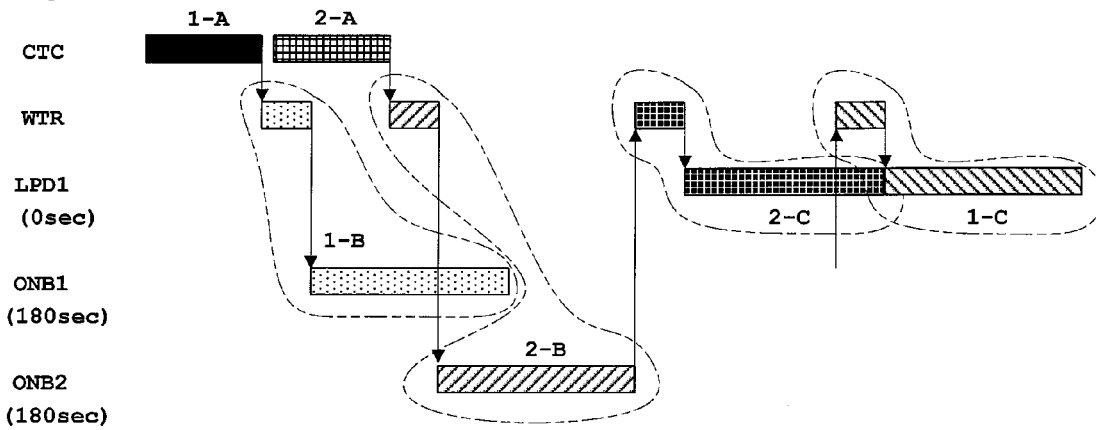
Fig.10C  Step 12
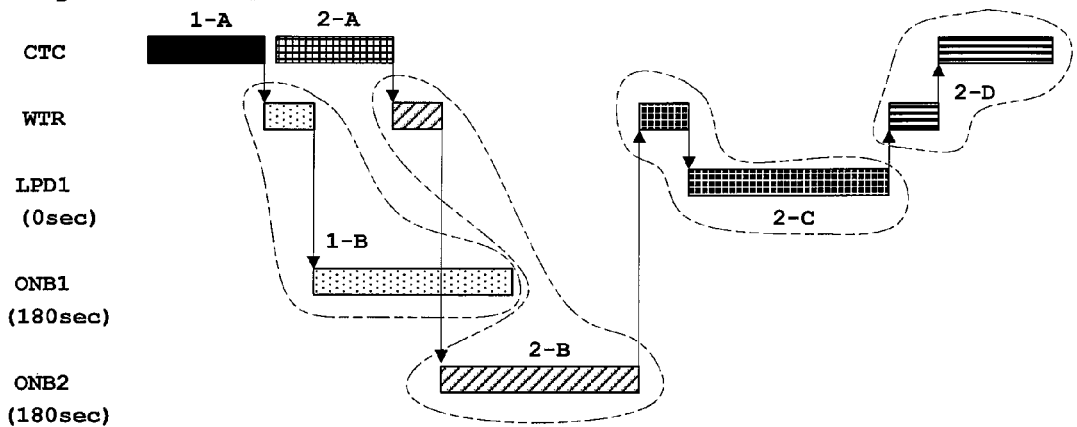

Fig.11A    Step 13
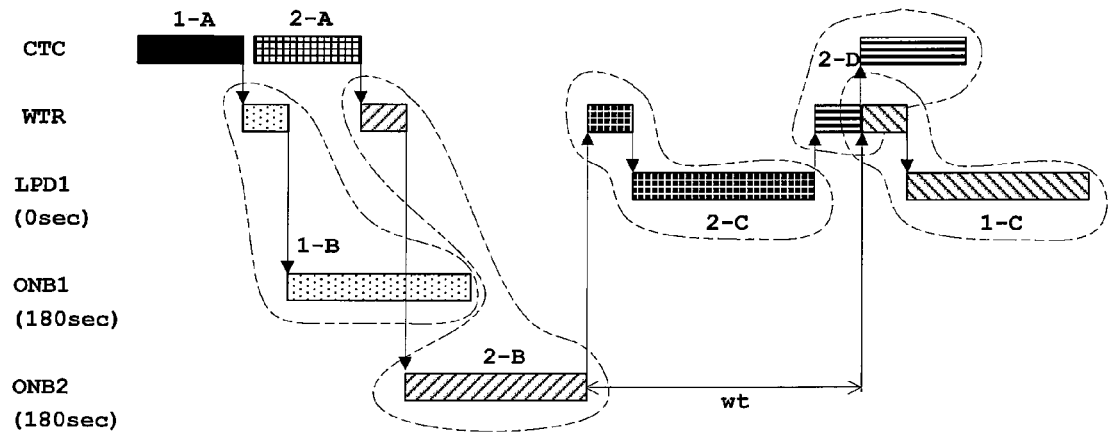
Fig.11B    Step 14
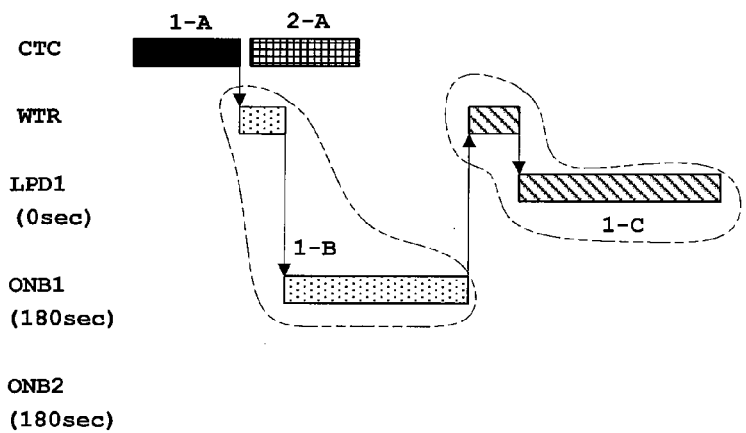
Step 15
Fig.11C    Step 15
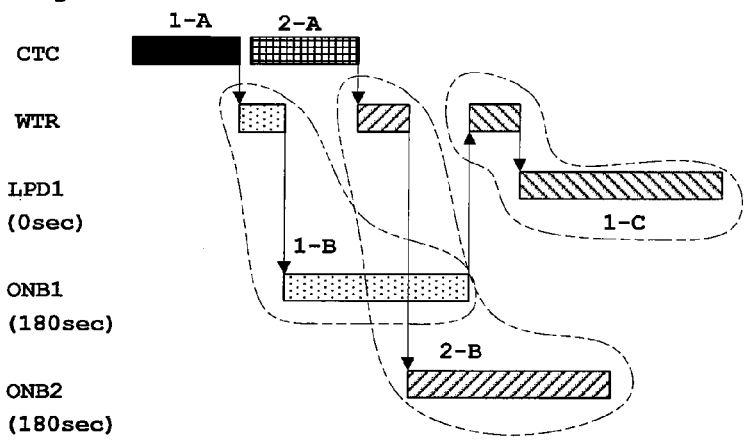

Fig.12A    Step 16
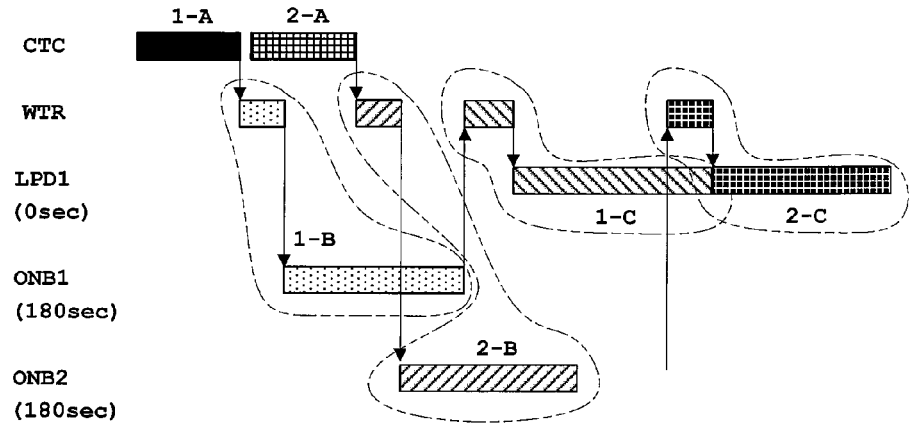
Fig.12B    Step 17
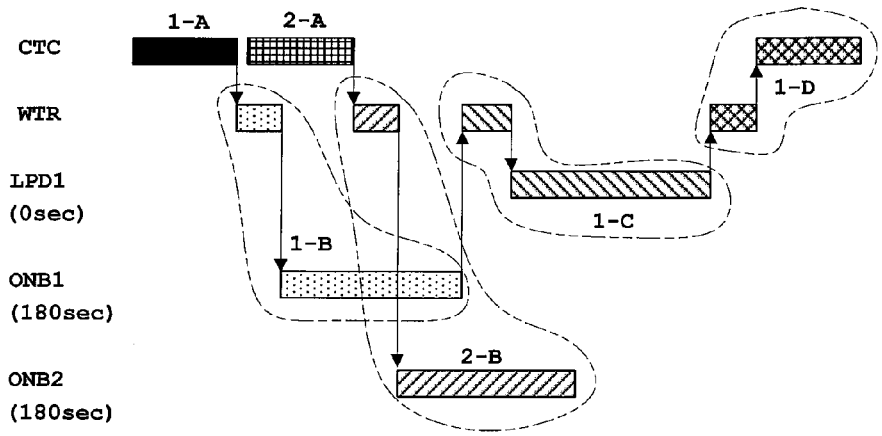
Fig.12C    Step 18
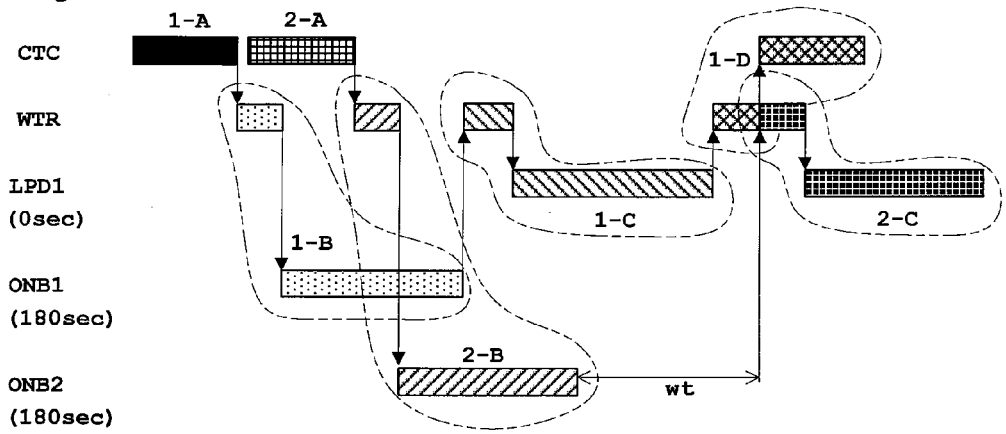

Fig.13A  Step 19
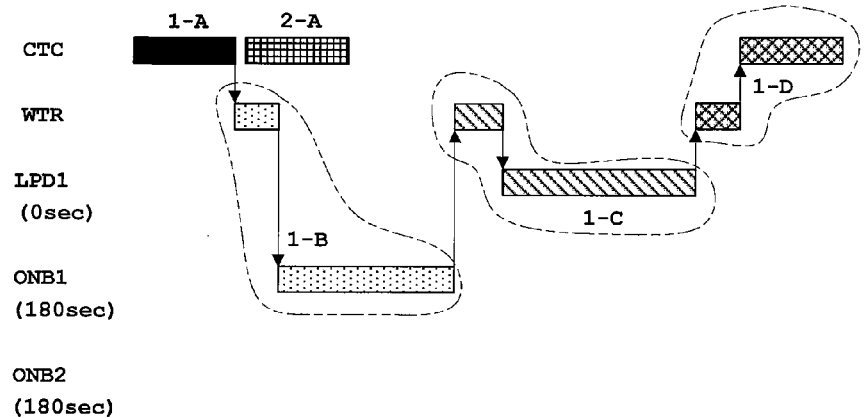
Fig.13B  Step 20
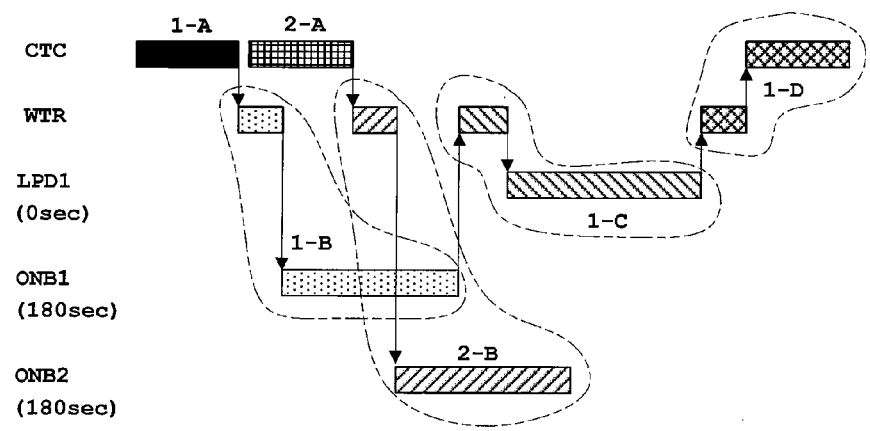
Fig.13C  Step 21
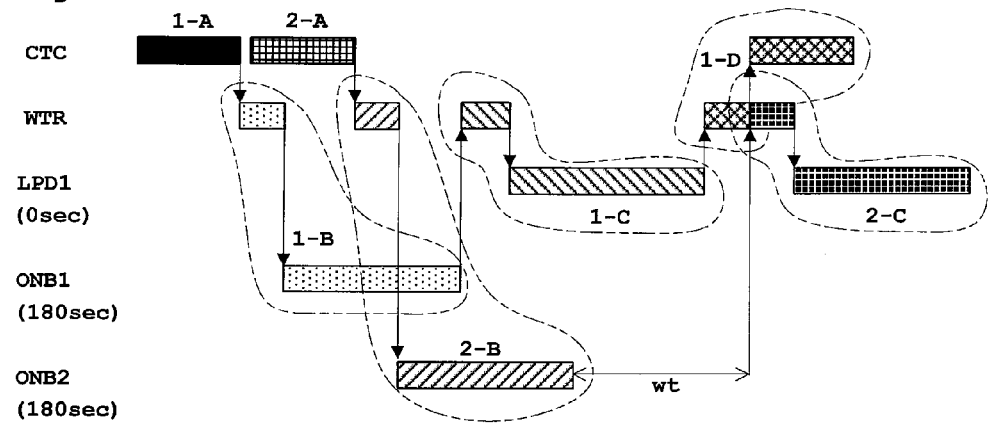

Fig.14A   Step 22
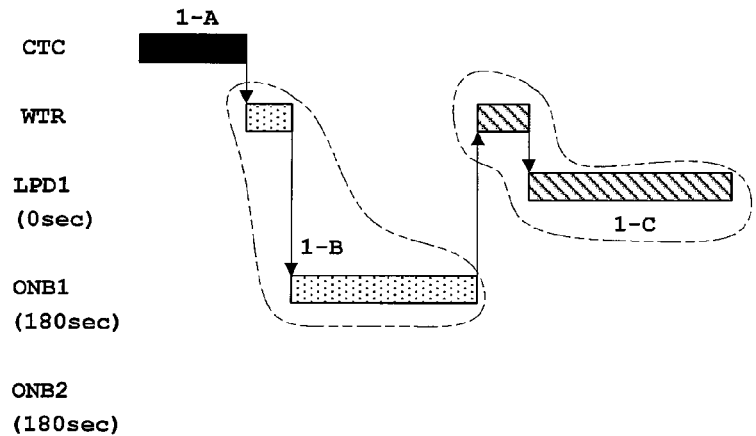
Fig.14B   Step 23
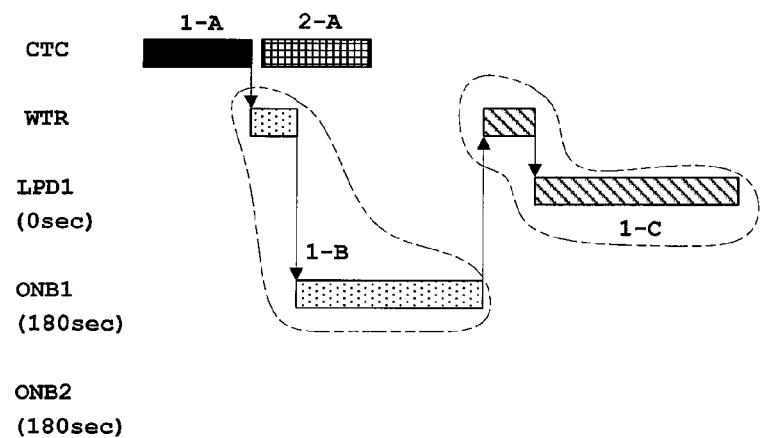
Fig.14C   Step 24
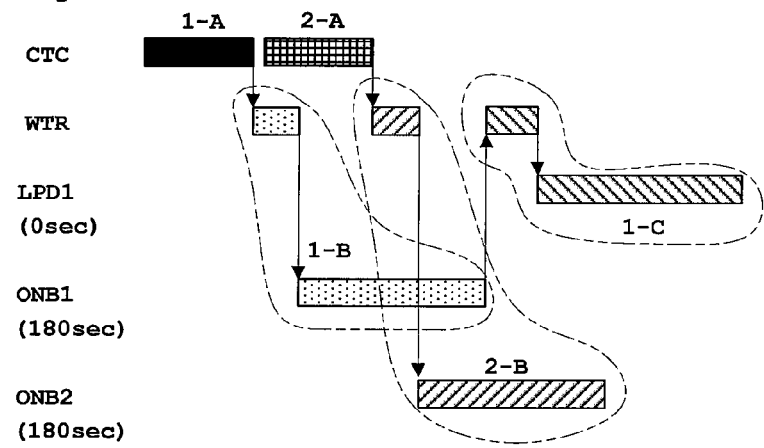

Fig. 15A   Step 25
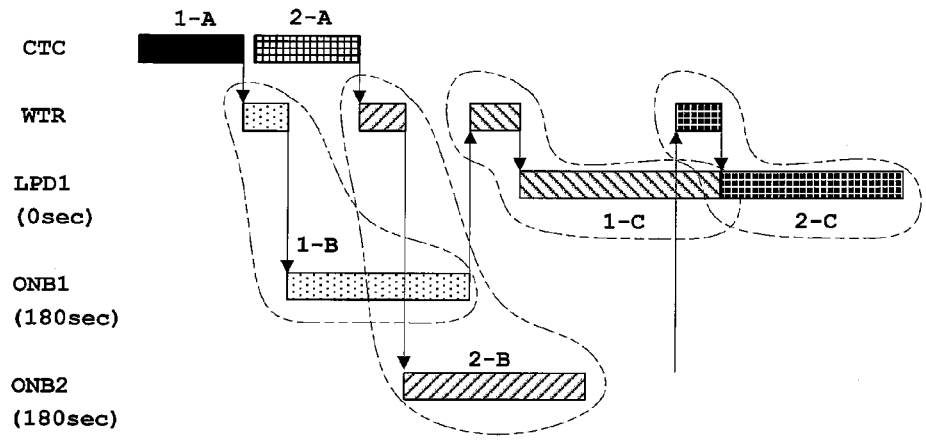
Fig. 15B   Step 26
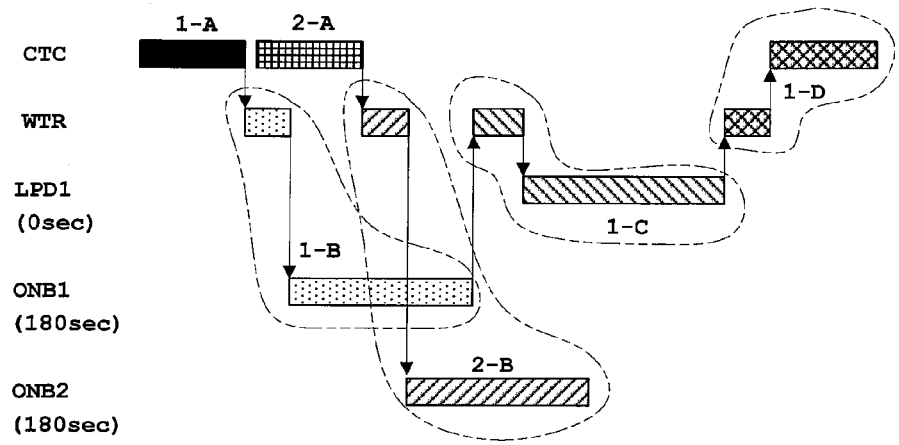
Fig. 15C   Step 27
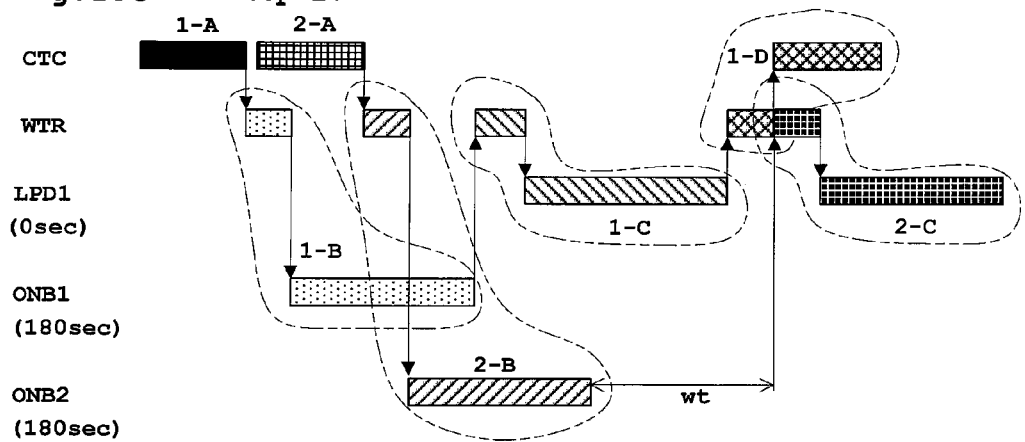

Fig.16A  Step 28
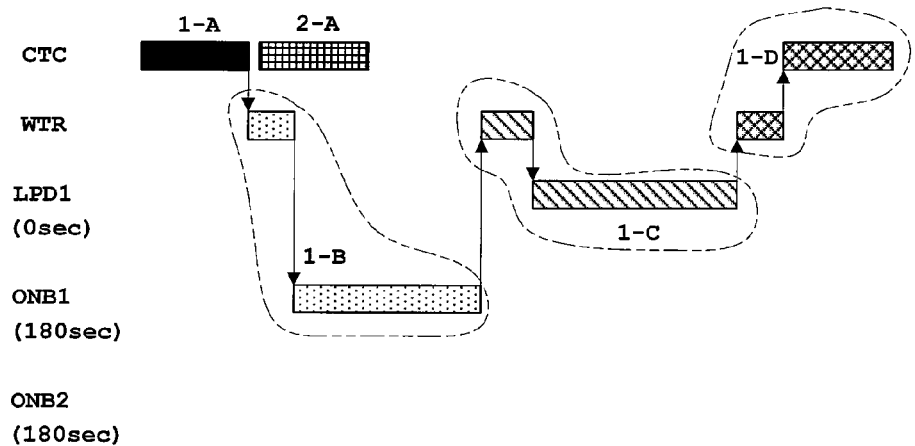
Fig.16B  Step 29
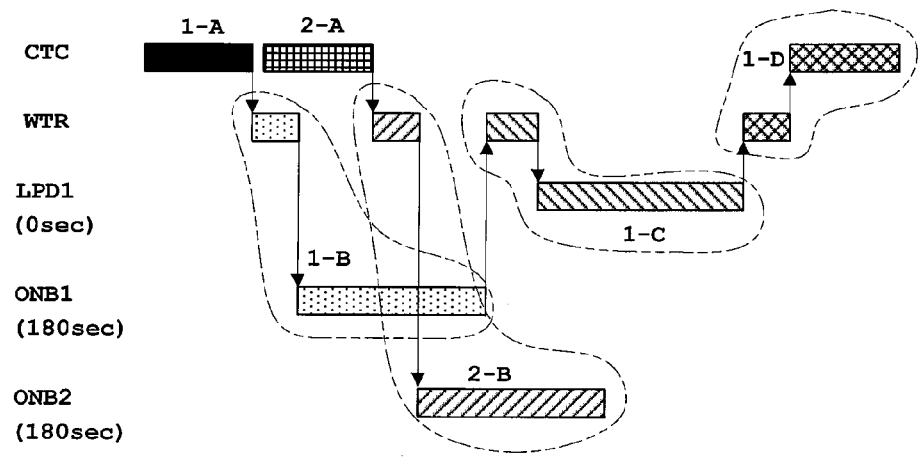
Fig.16C  Step 30
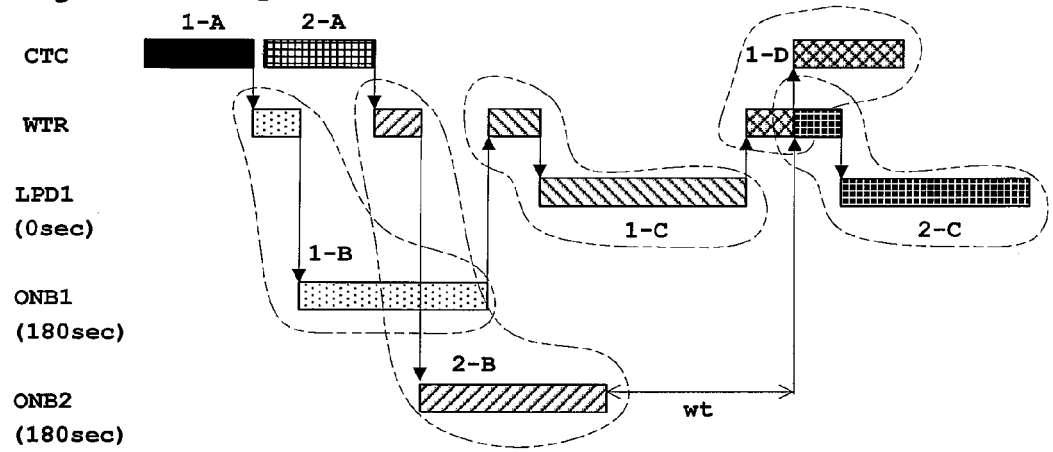

Fig. 17A    Step 31
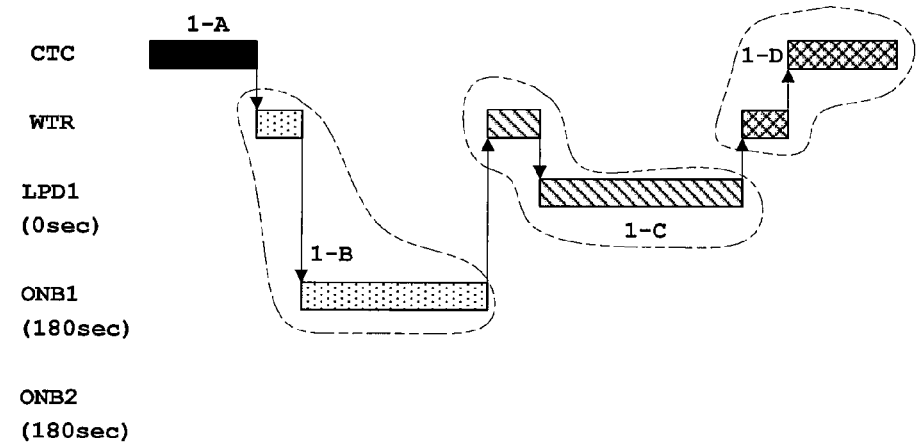
Fig. 17B    Step 32
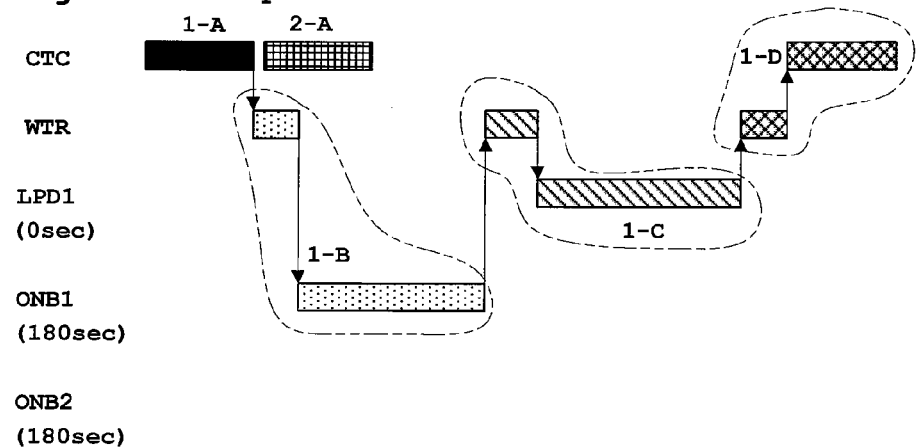
Fig. 17C    Step 33
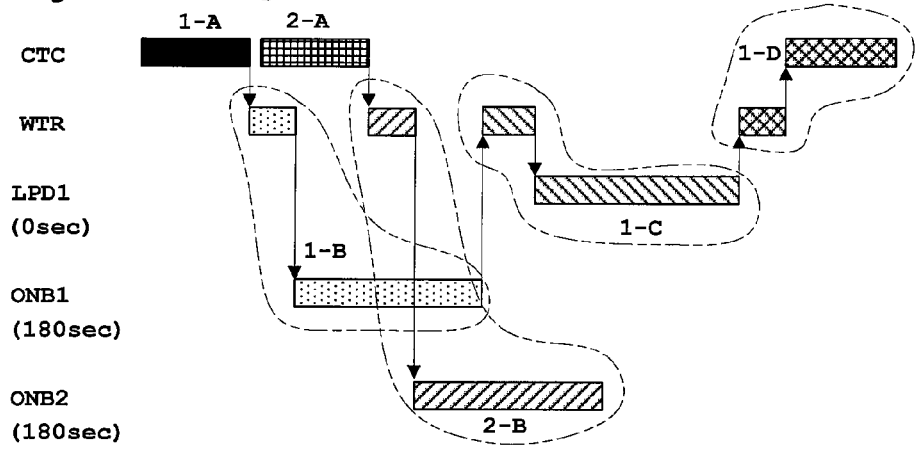

Fig.18A  Step 34
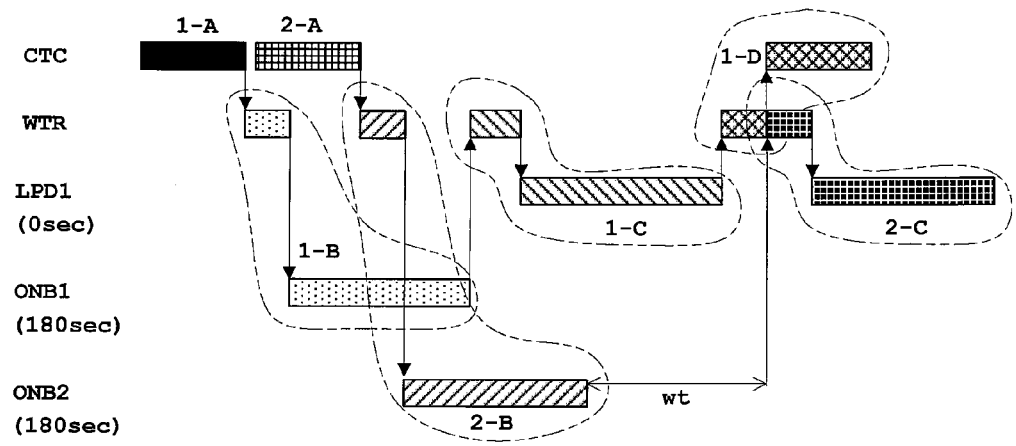
Fig.18B  Step 35
Lot 1 start
Lot 2 start
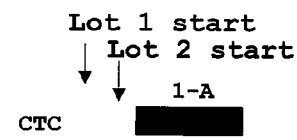
CTC    1-A
WTR
LPD1
(0sec)
ONB1
(0sec)
ONB2
(180sec)
Fig.18C  Step 36
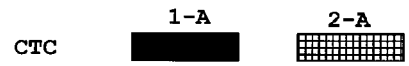
CTC    1-A    2-A
WTR
LPD1
(0sec)
ONB1
(180sec)
ONB2
(180sec)

Fig.19A   Step 37
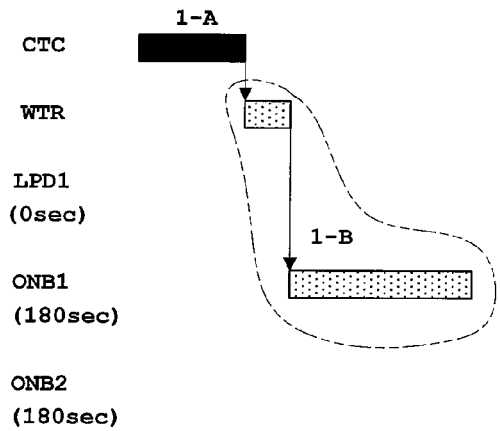
Fig.19B   Step 38
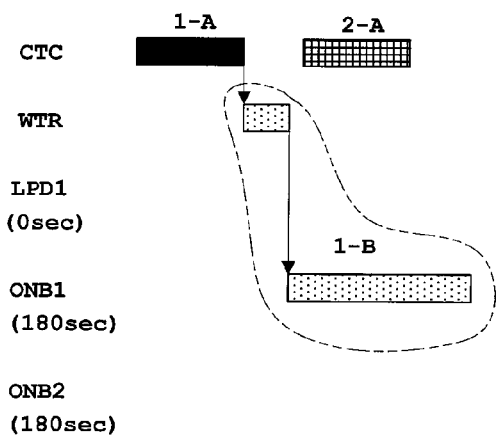
Fig.19C   Step 39
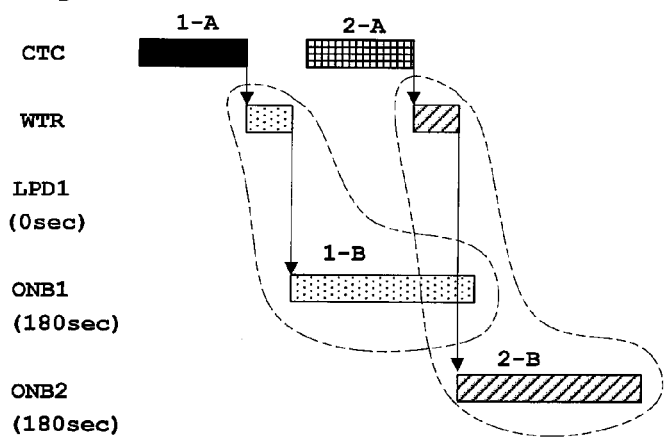

Fig.20A    Step 40
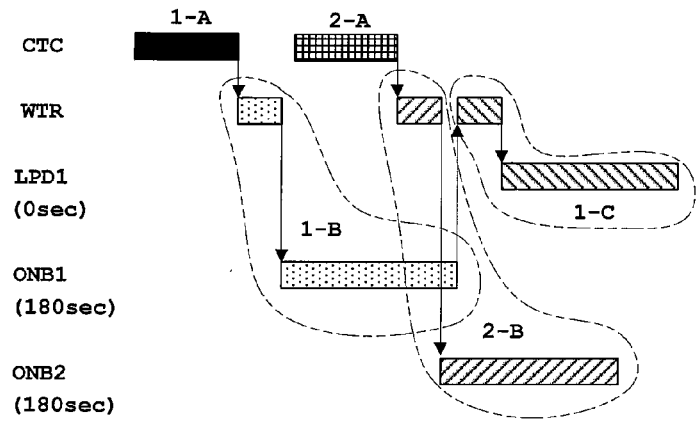
Fig.20B    Step 41
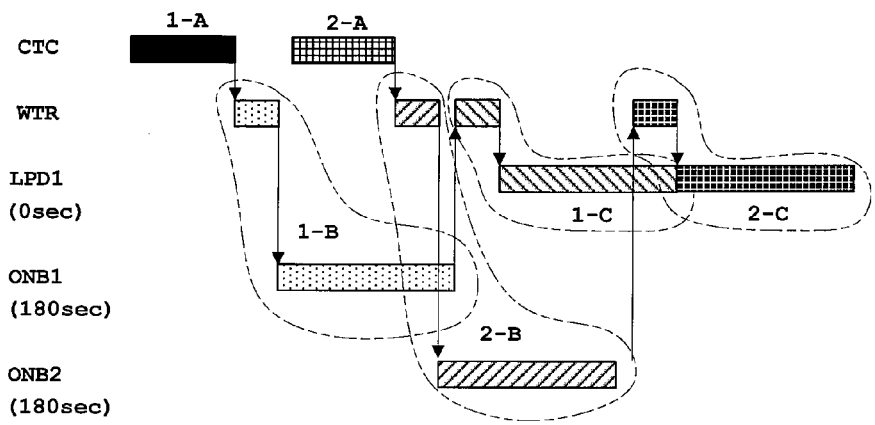
Fig.20C    Step 42
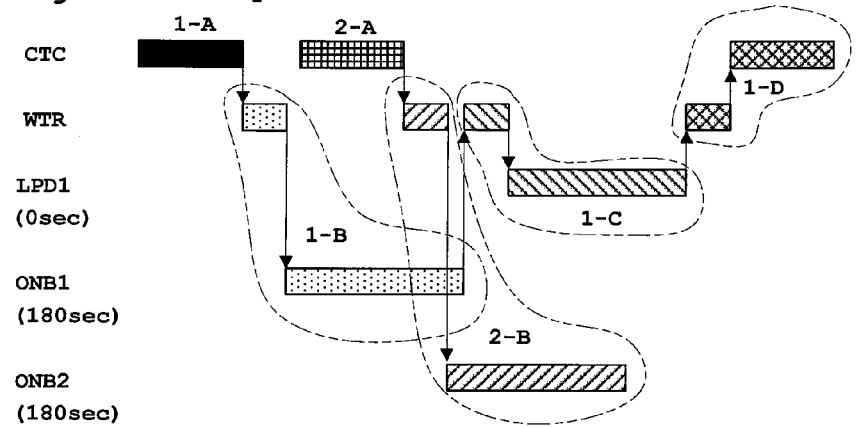

Fig.21A    Step 43
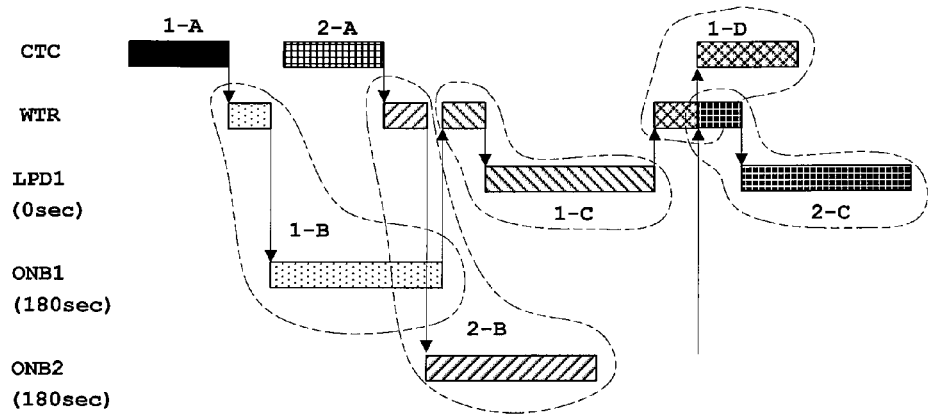
Fig.21B    Step 44
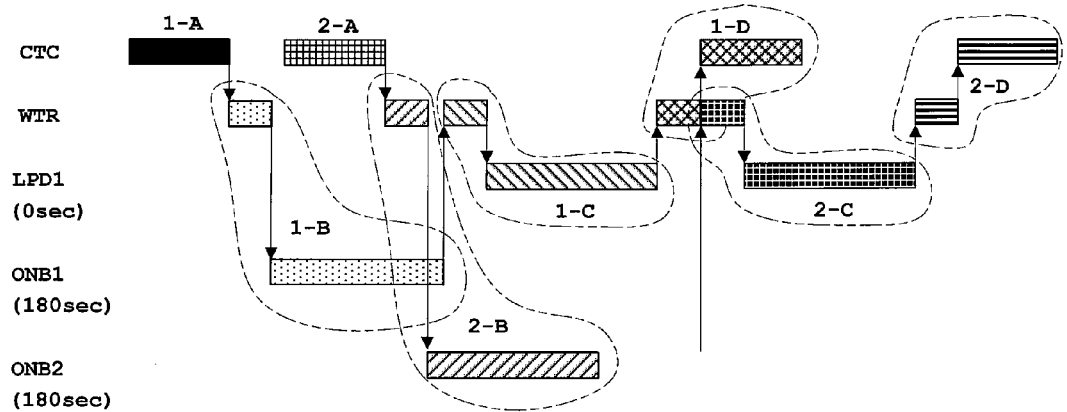

Fig.24A Step 1
Lot 1 start
Lot 2 start
1-A
CTC 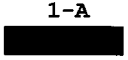
WTR
LPD1
(0sec)
ONB1
(180sec)
ONB2
(180sec)
Fig.24B Step 2
1-A    2-A
CTC 
WTR
LPD1
(0sec)
ONB1
(180sec)
ONB2
(180sec)
Fig.24C Step 3
1-A
CTC 
WTR 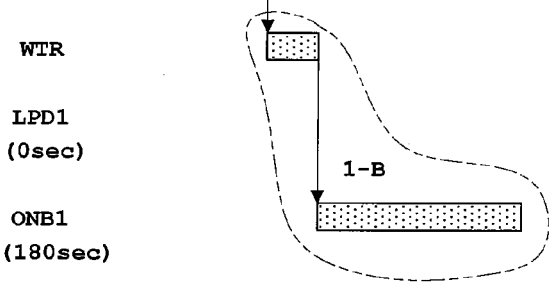
LPD1
(0sec)
1-B
ONB1
(180sec)
ONB2
(180sec)

Fig. 25A Step 4
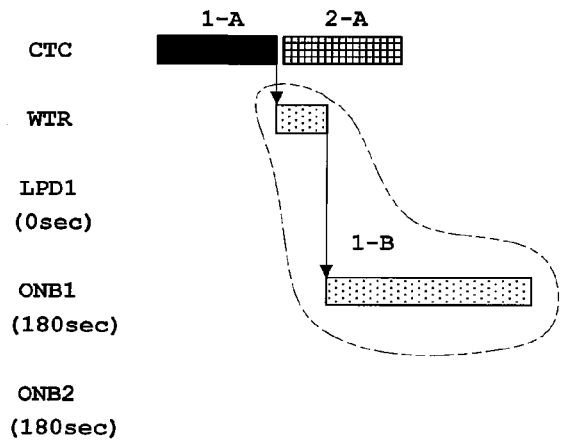
Fig. 25B Step 5
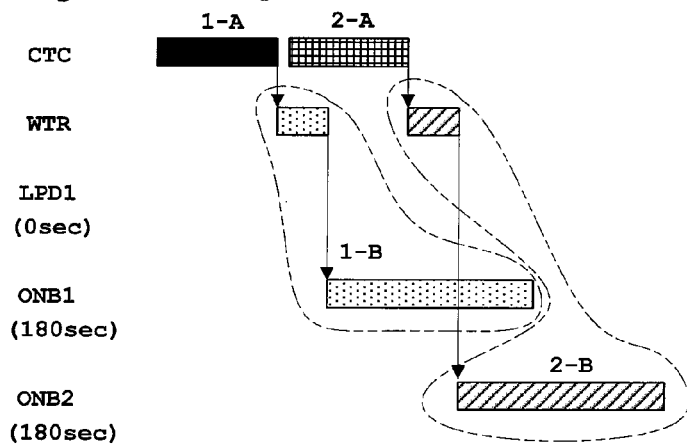
Fig. 25C Step 6
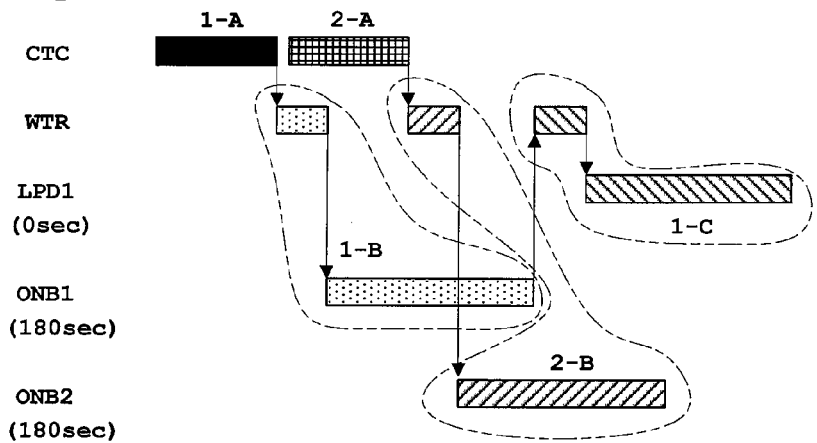

Fig. 26A Step 7
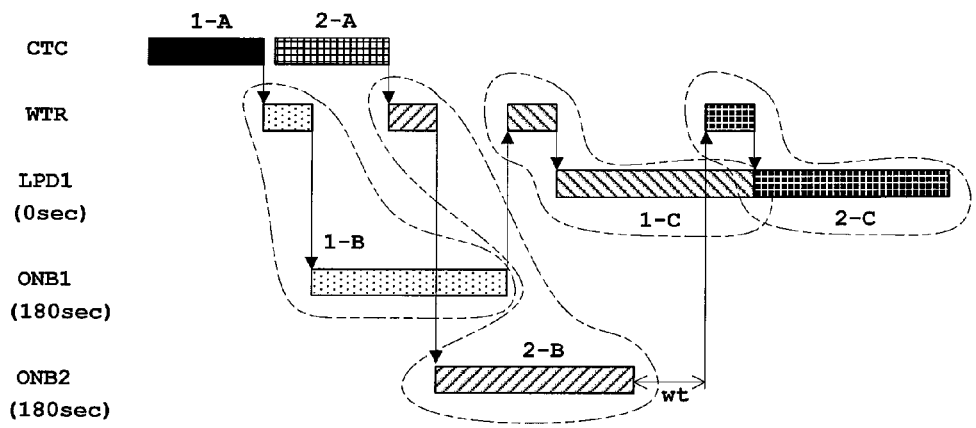
Fig. 26B Step 8
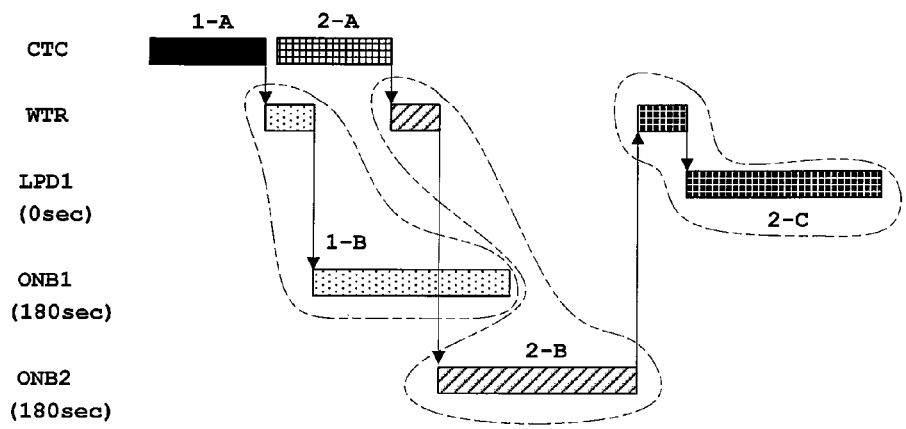
Fig. 26C Step 9
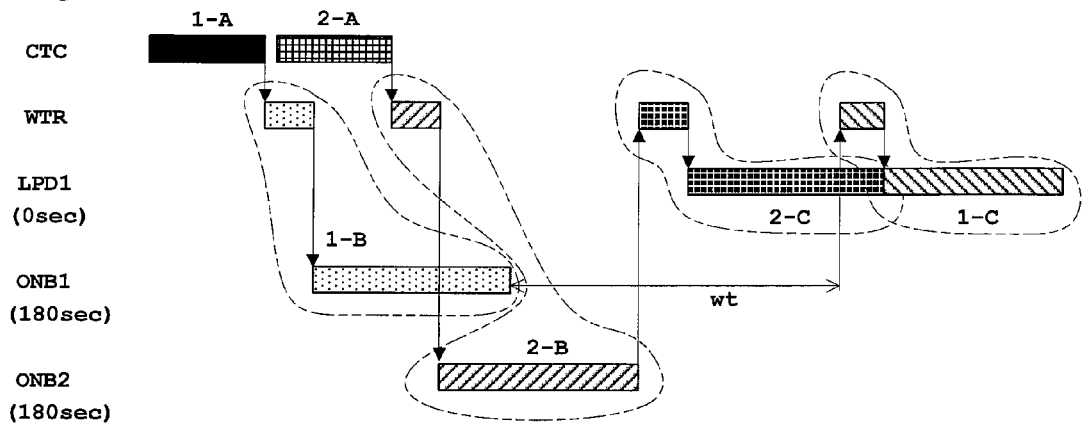

Fig.27A   Step 10
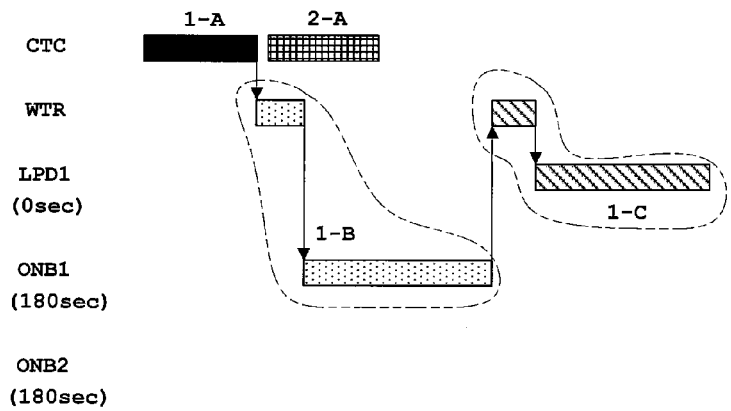
Fig.27B   Step 11
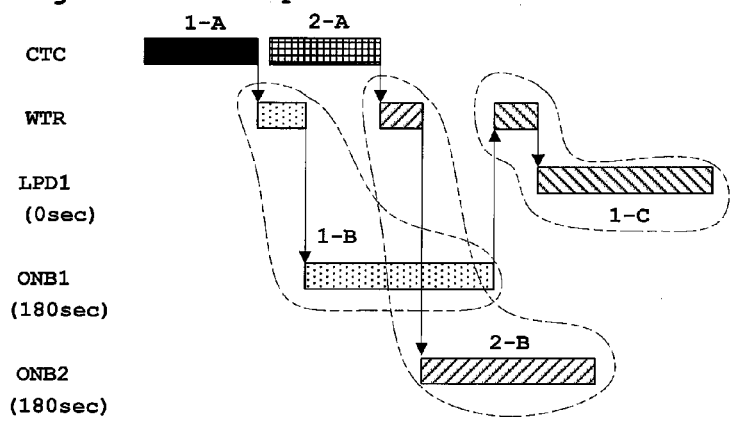
Fig.27C   Step 12
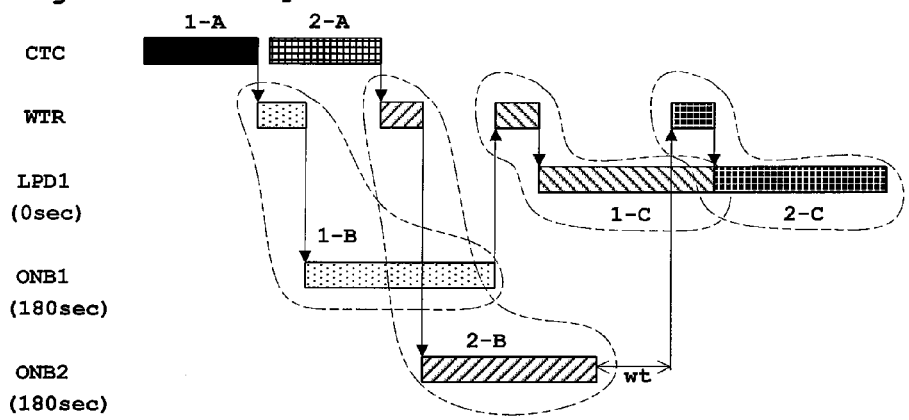

Fig.28A    Step 13
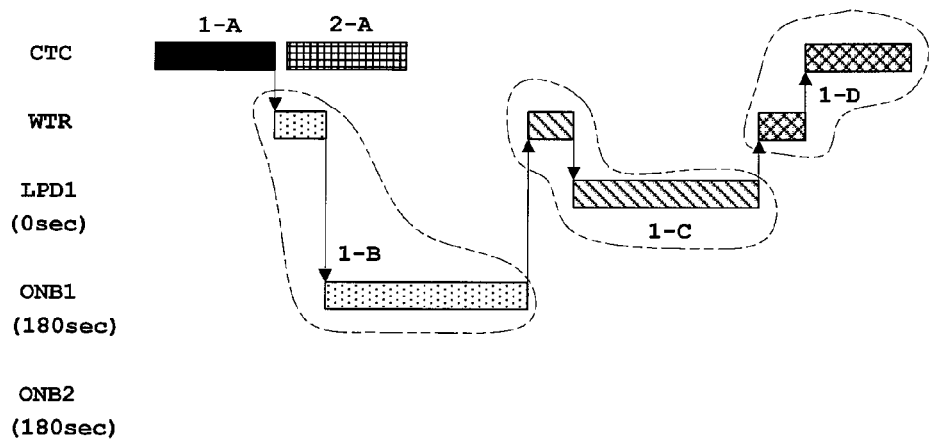
Fig.28B    Step 14
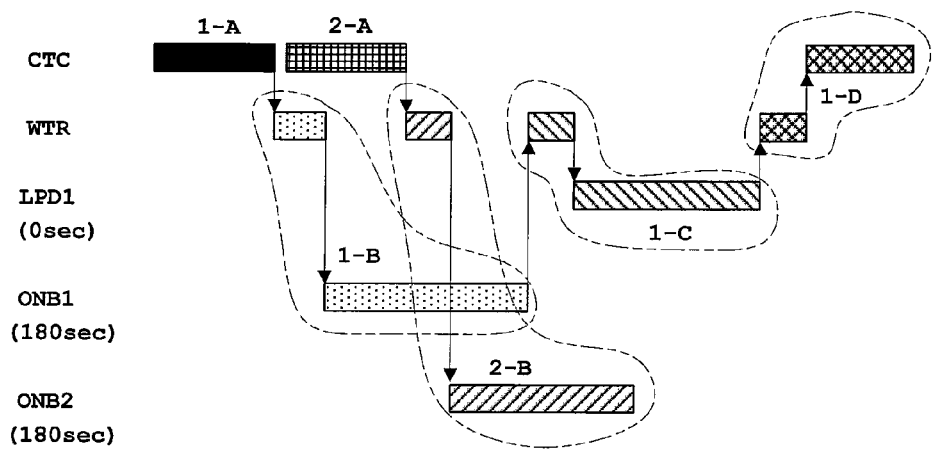
Fig.28C    Step 15
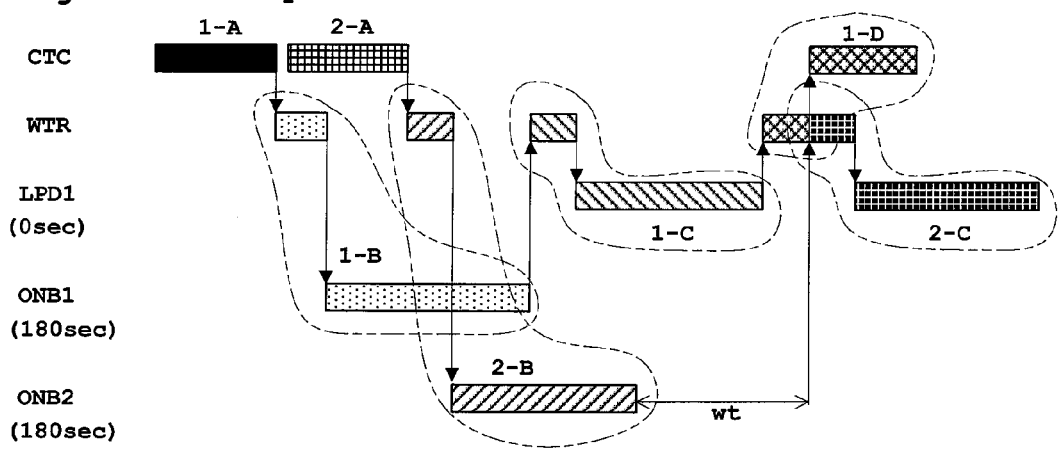

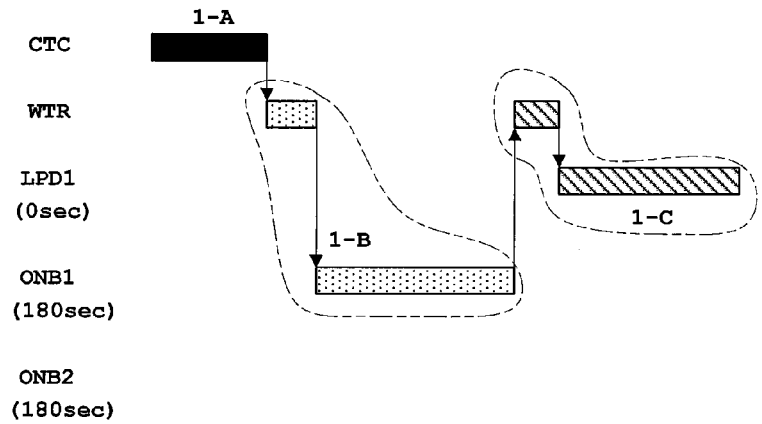
Fig.29A   Step 16
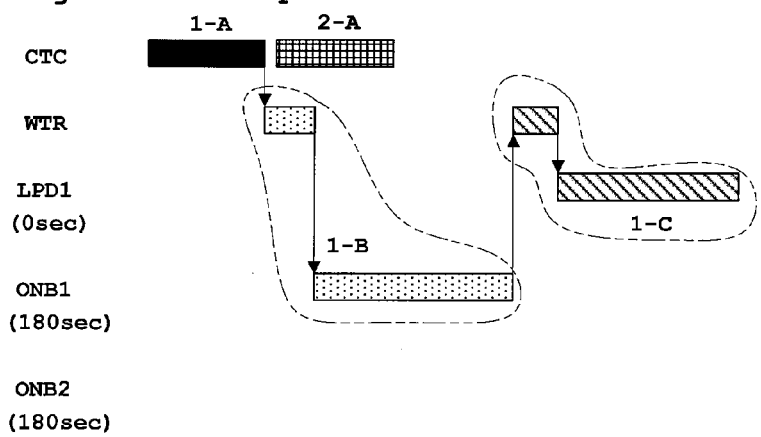
Fig.29B   Step 17
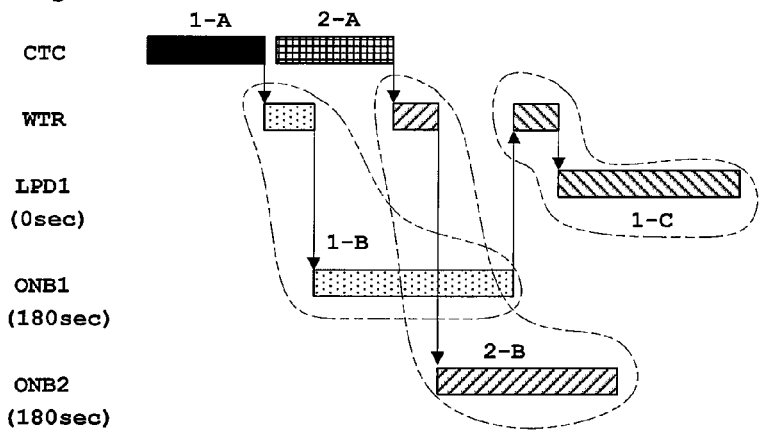
Fig.29C   Step 18

Fig. 30A  Step 19
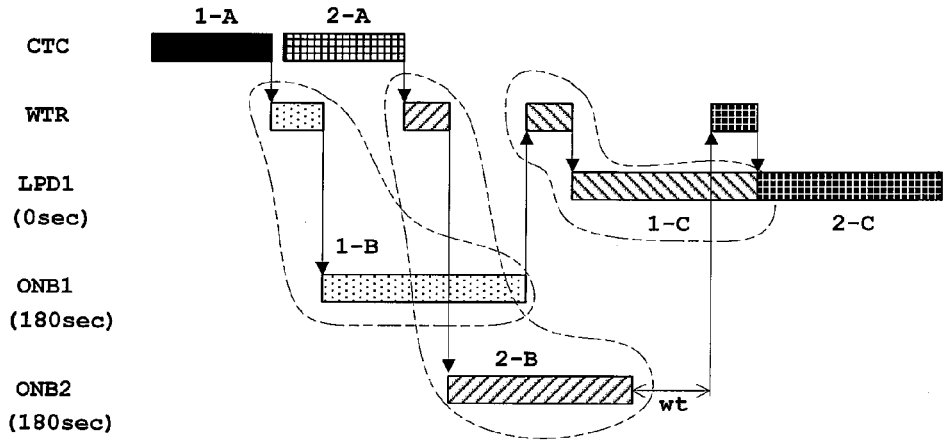
Fig. 30B  Step 20
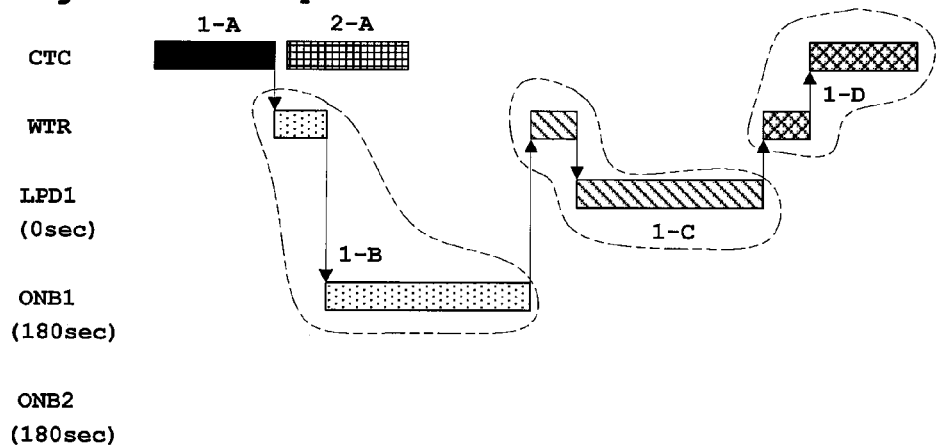
Fig. 30C  Step 21
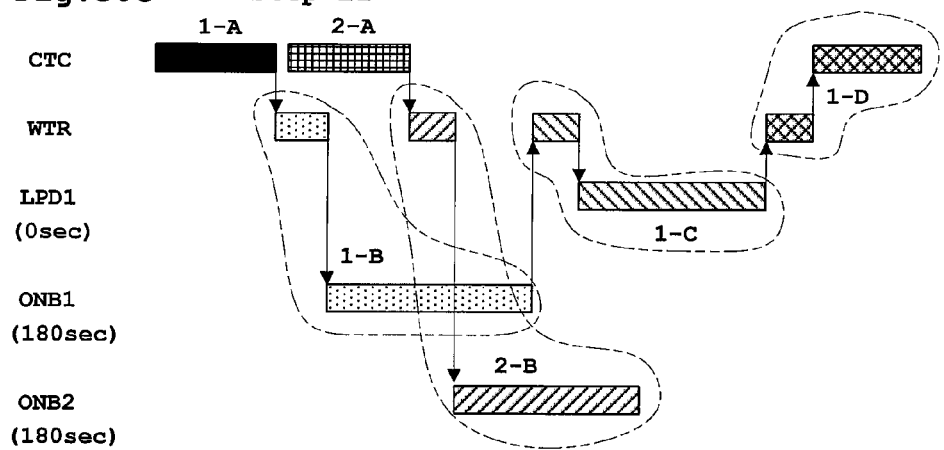

Fig.31A Step 22
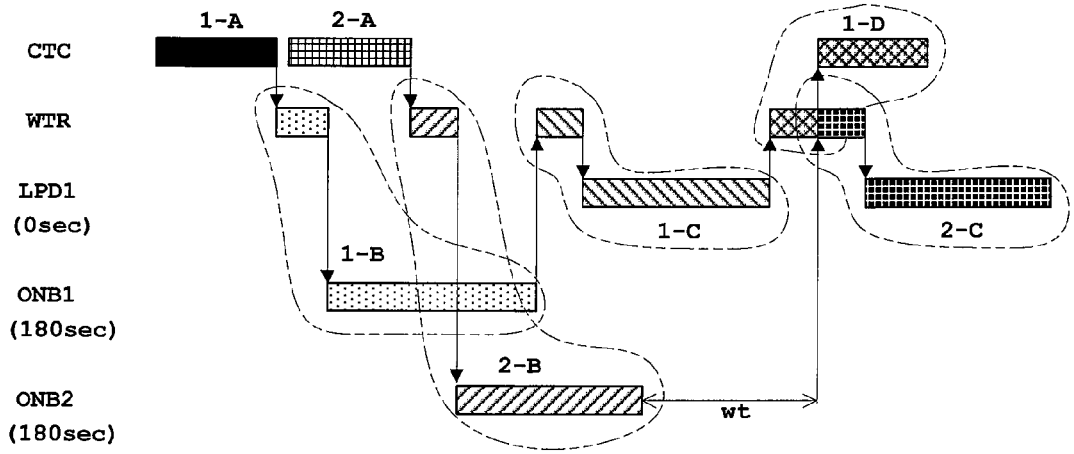
Fig.31B Step 23
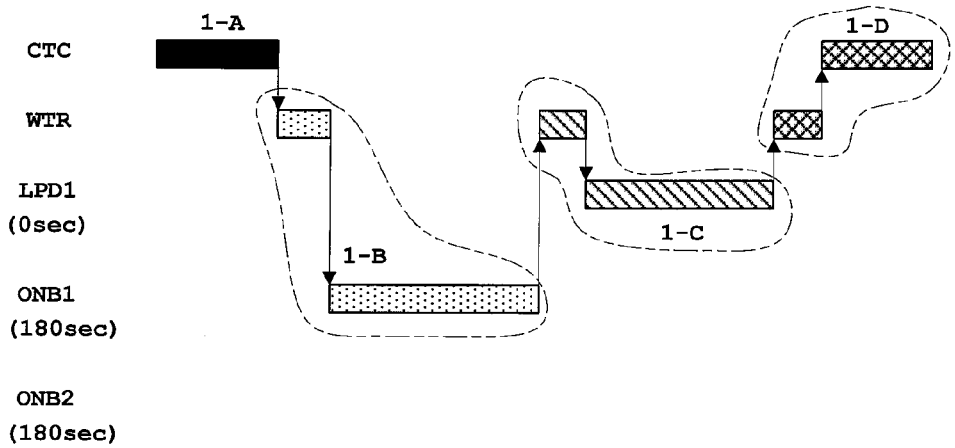
Fig.31C Step 24
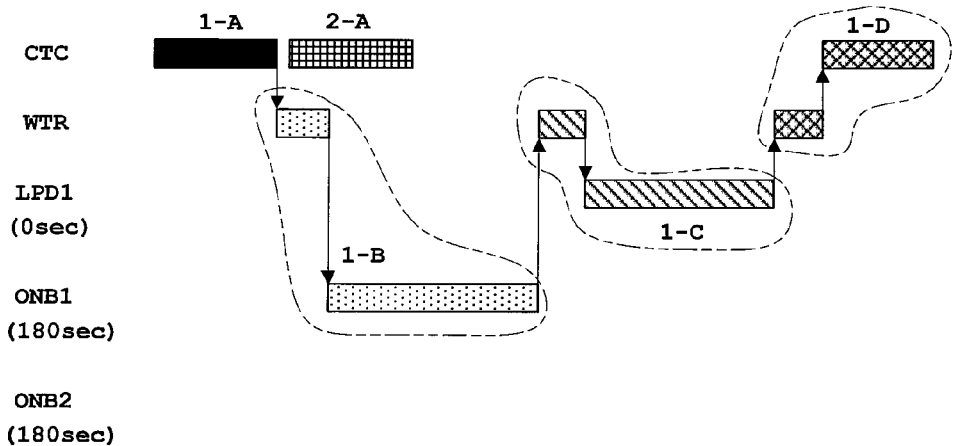

Fig.32A  Step 25
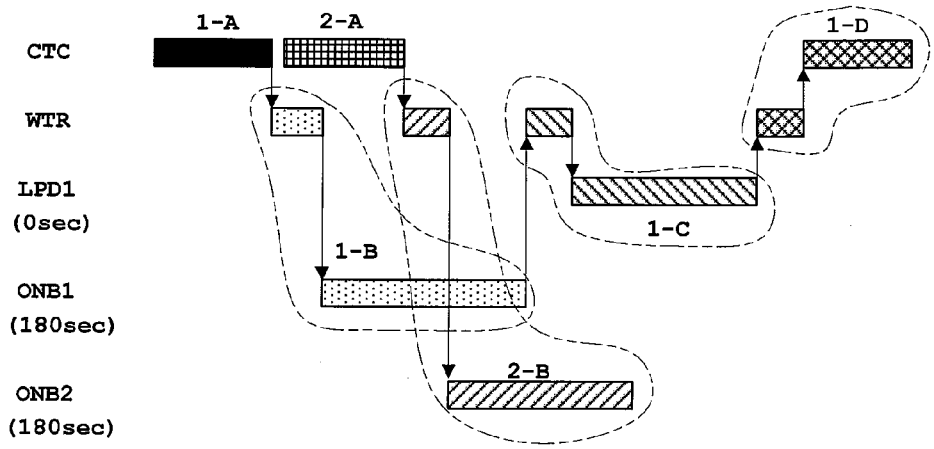
Fig.32B  Step 26
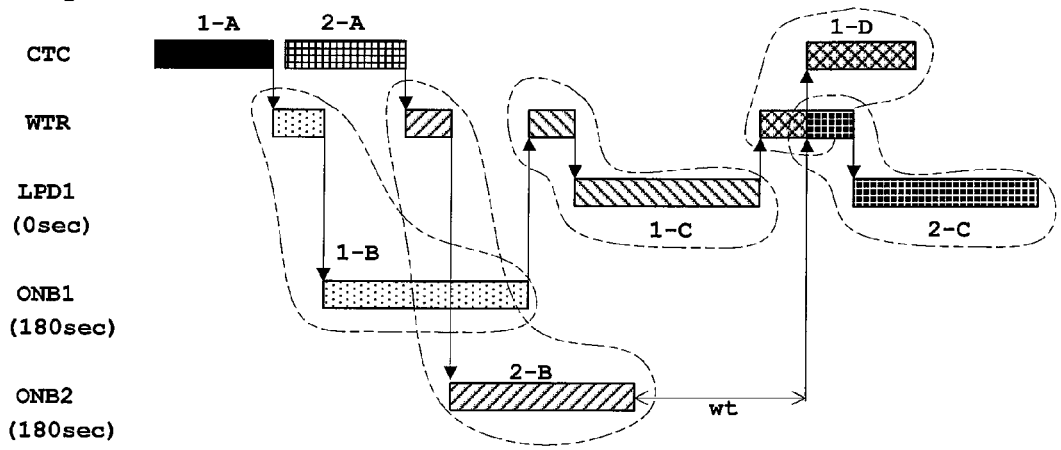
Fig.32C  Step 27
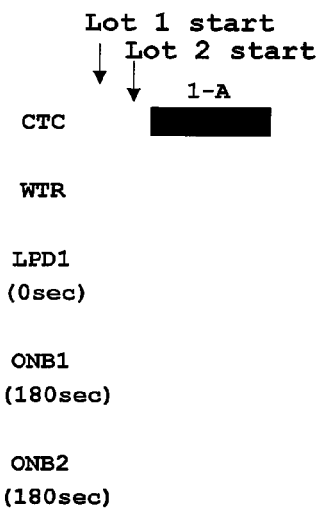

Fig.33A  Step 28
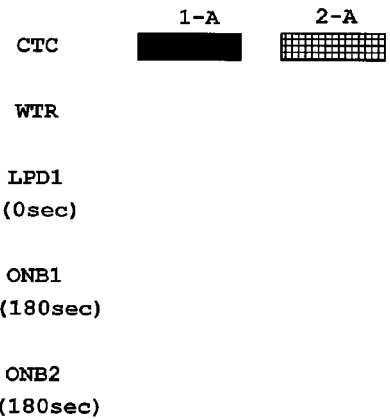
Fig.33B  Step 29
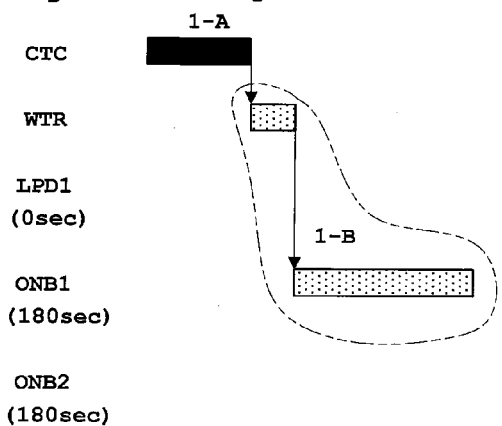
Fig.33C  Step 30
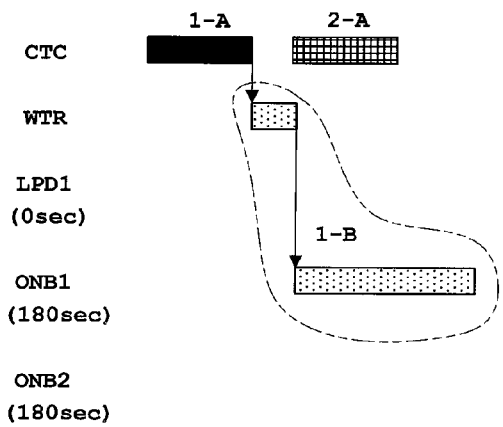

Fig.34A  Step 31
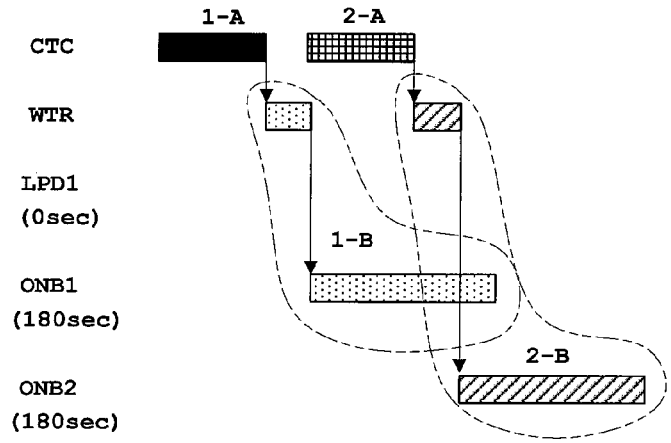
Fig.34B  Step 32
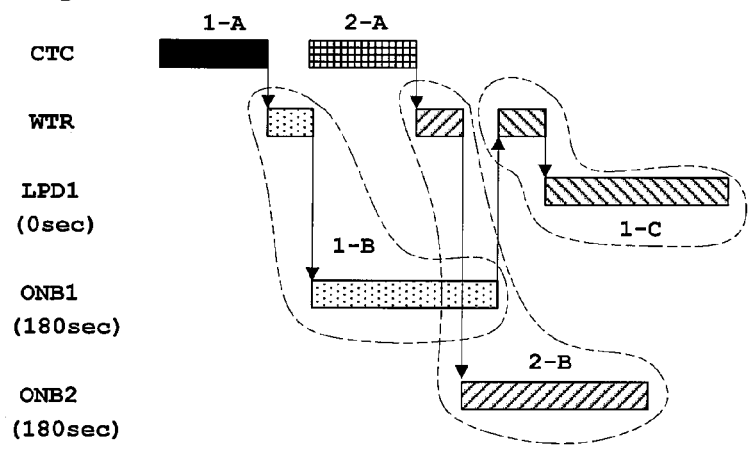
Fig.34C  Step 33
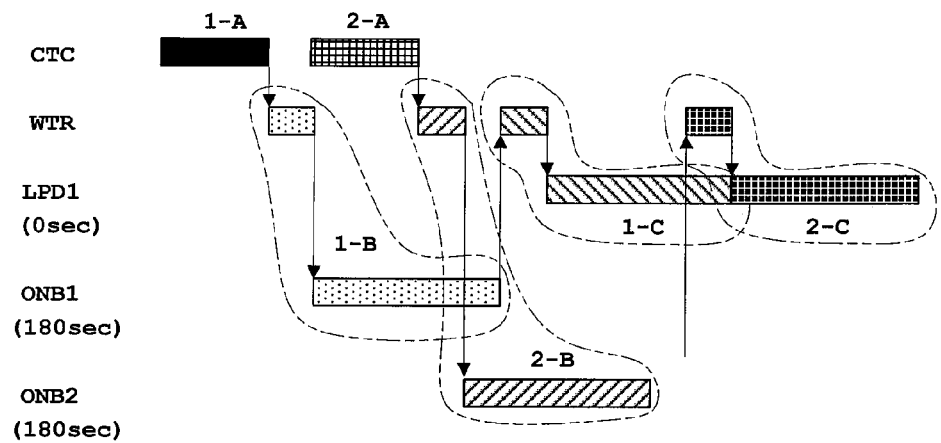

Fig.35A    Step 34
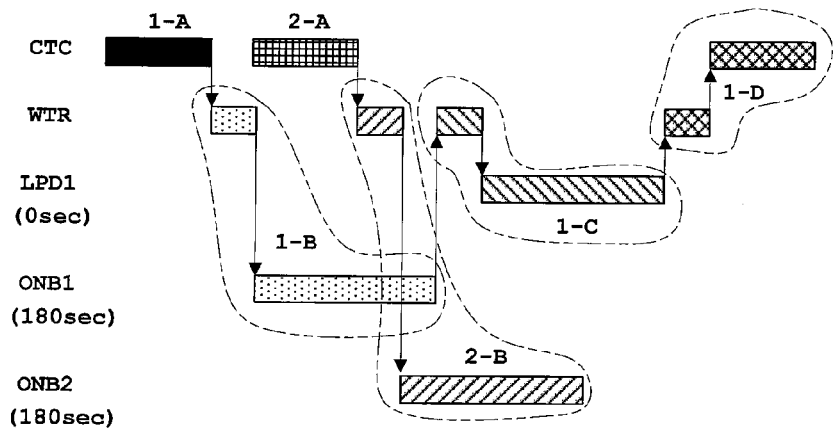
Fig.35B    Step 35
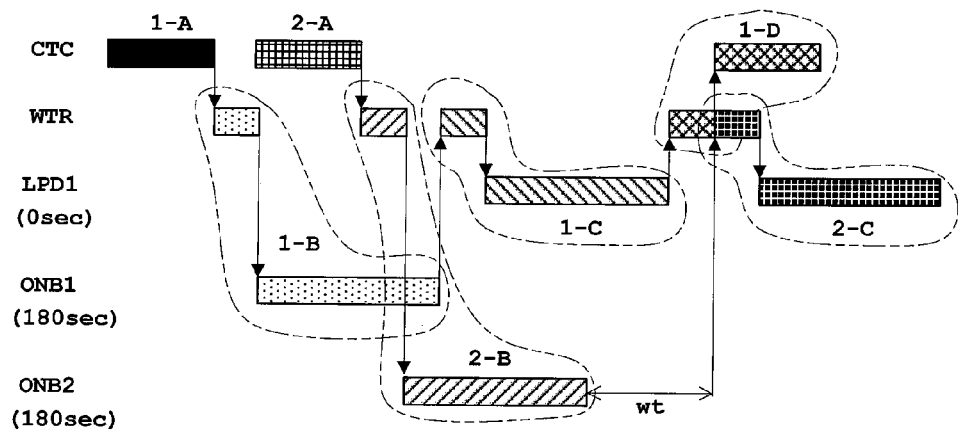
Fig.35C    Step 36
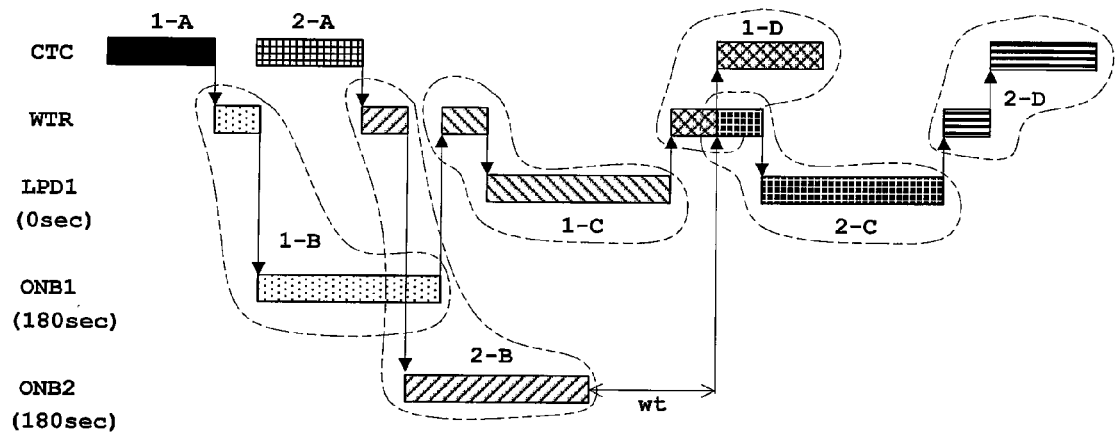

<Second Allocation Method>

Fig.38A    Step 1
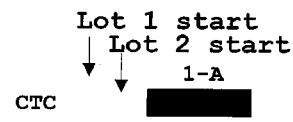
Fig.38B    Step 2
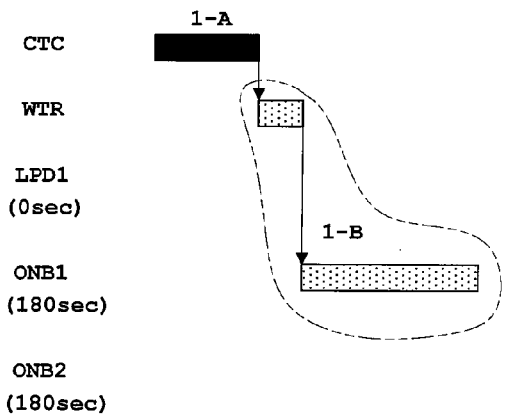
Fig.38C    Step 3
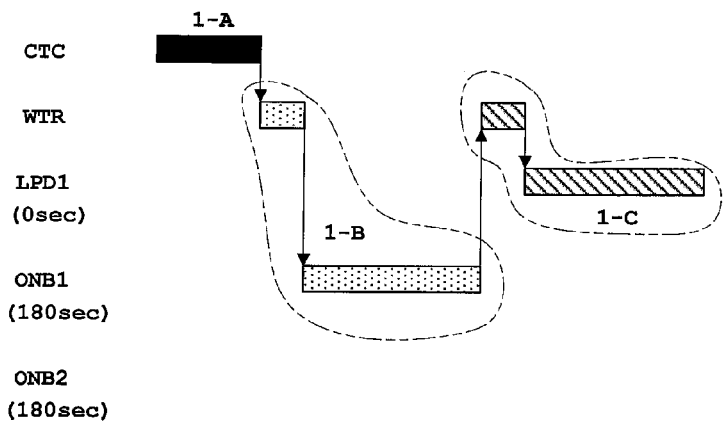

Fig.39A    Step 4
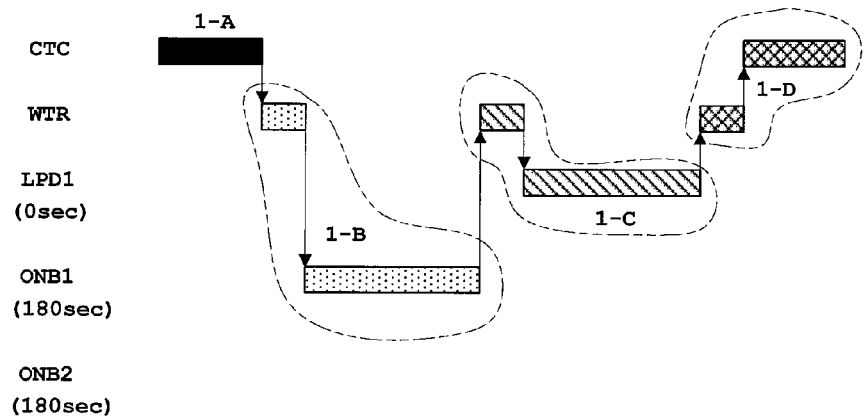
Fig.39B    Step 5
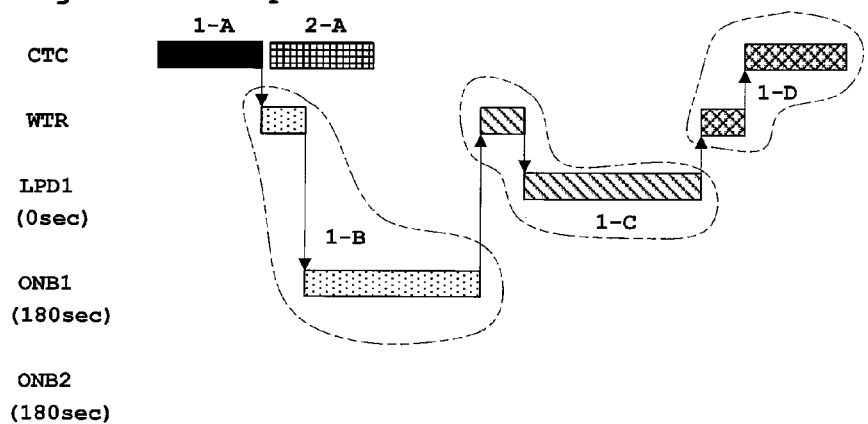
Fig.39C    Step 6
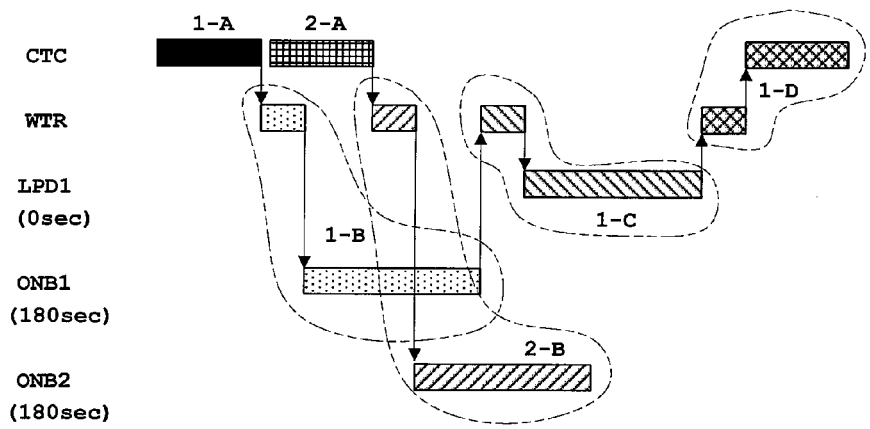

Fig.40A Step 7
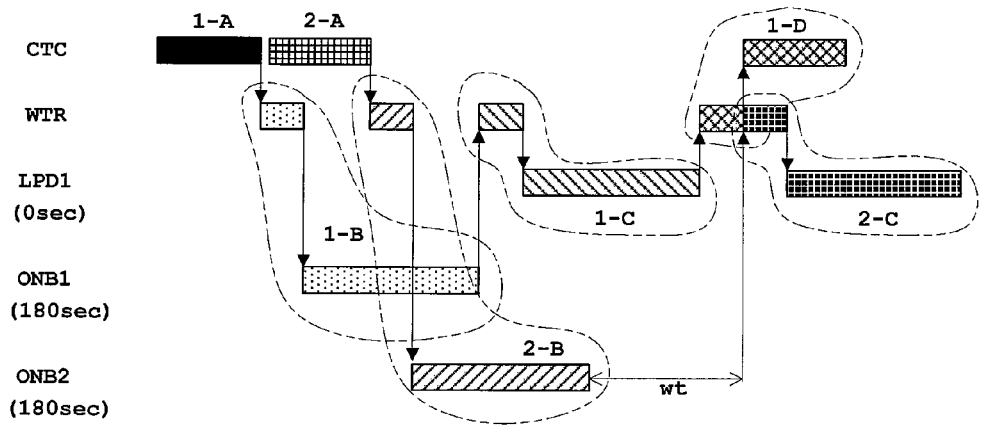
Fig.40B Step 8
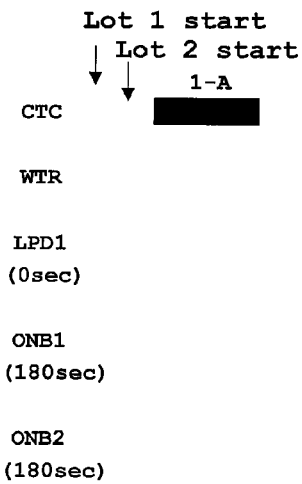
Fig.40C Step 9
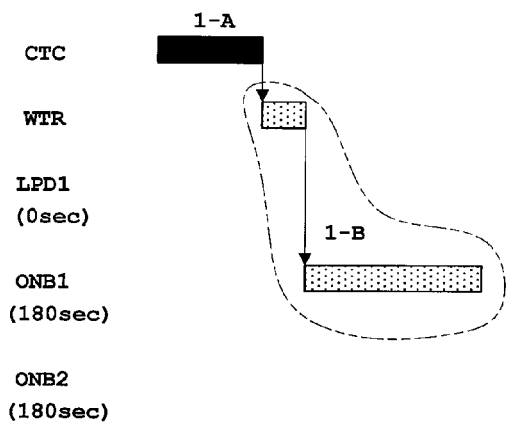

Fig. 41A    Step 10
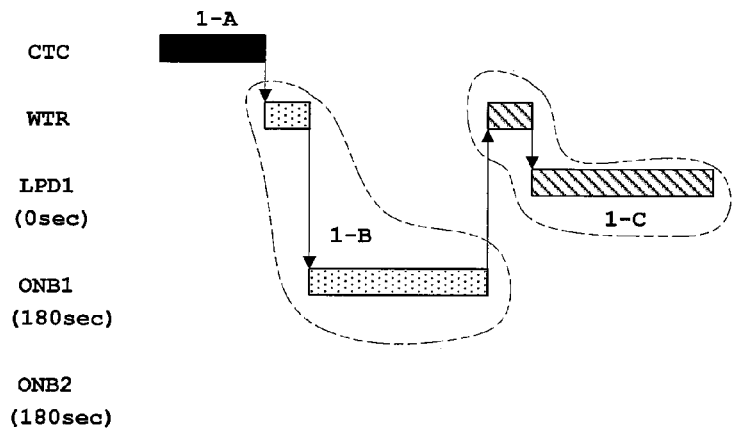
Fig. 41B    Step 11
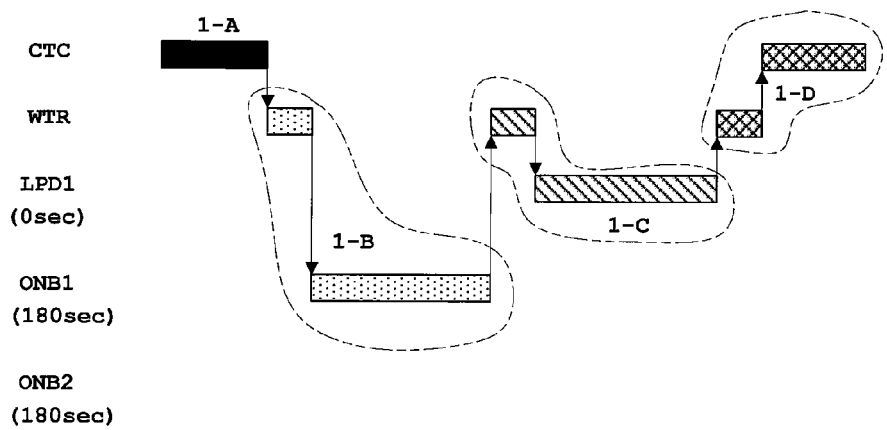
Fig. 41C    Step 12
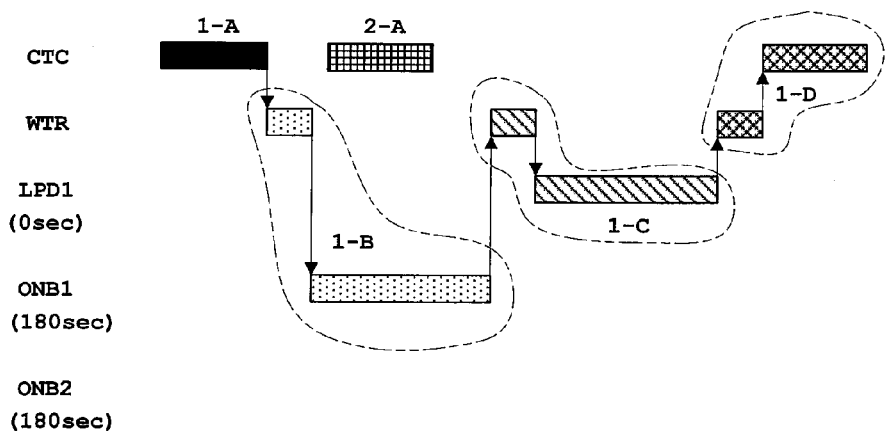

Fig.42A   Step 13
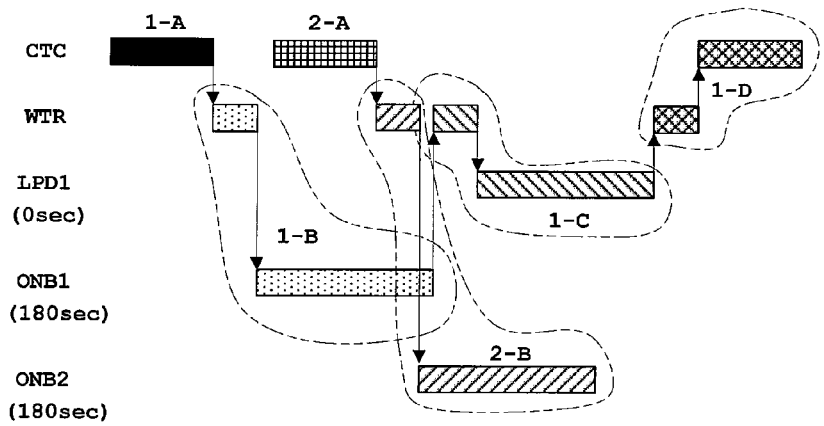
Fig.42B   Step 14
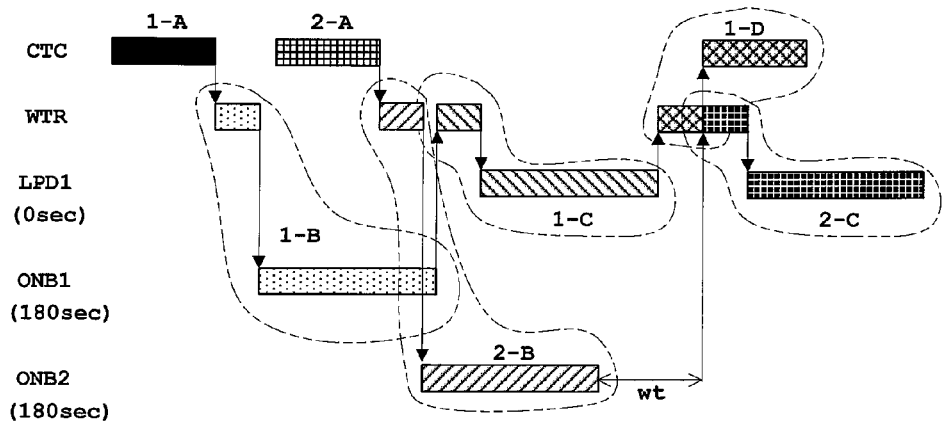
Fig.42C   Step 15
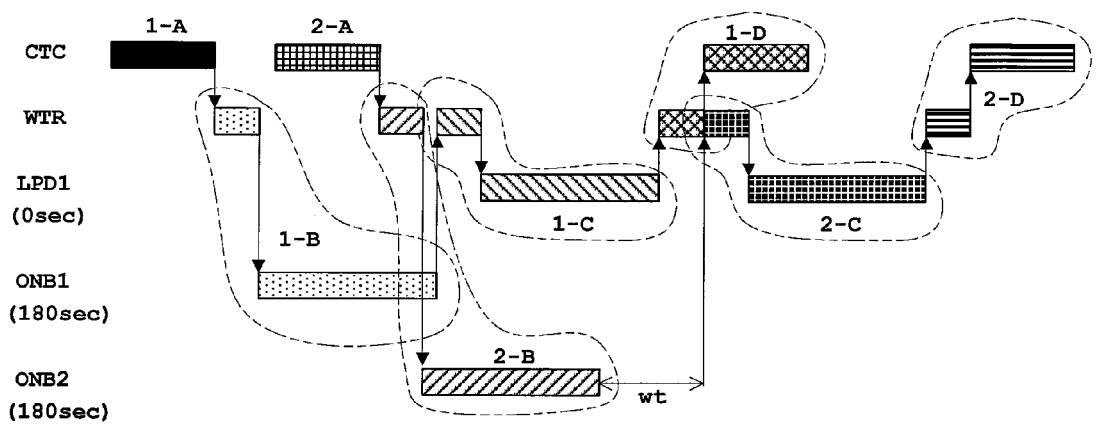

Fig. 43A    Lot 1
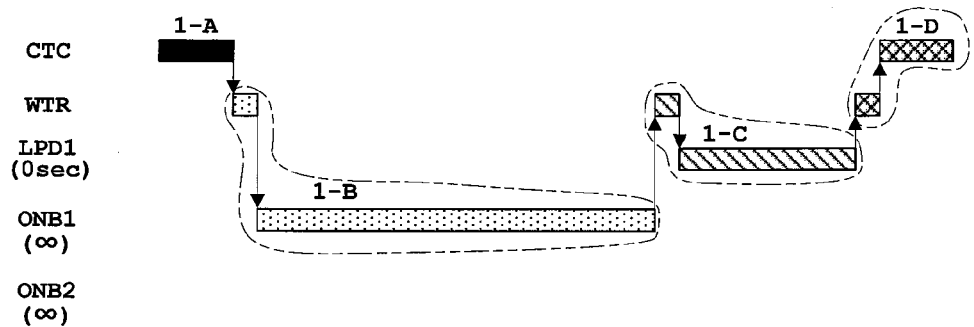
Fig. 43B    Lot 2
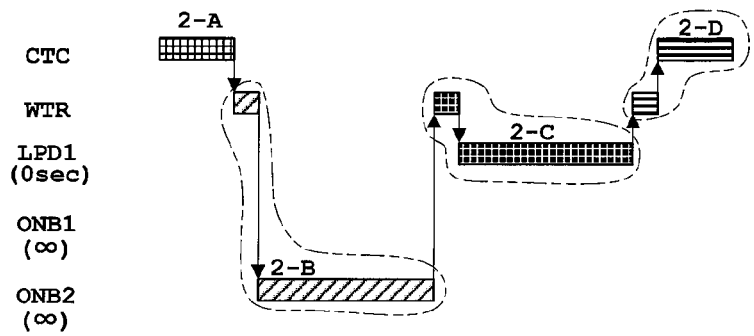
Fig. 43C    Lot 3
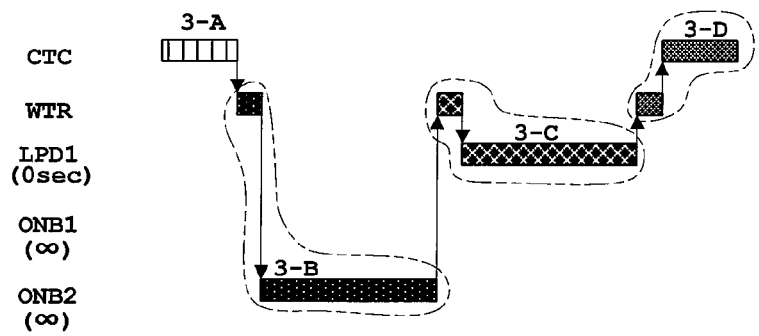

Fig. 46A
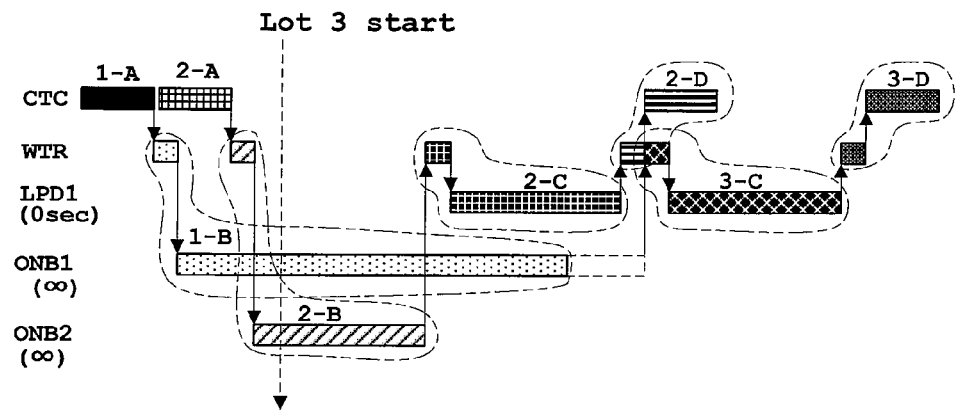
Fig. 46B
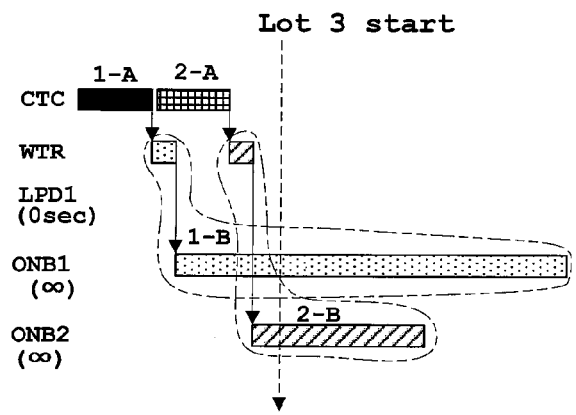
Fig. 46C  Step 1
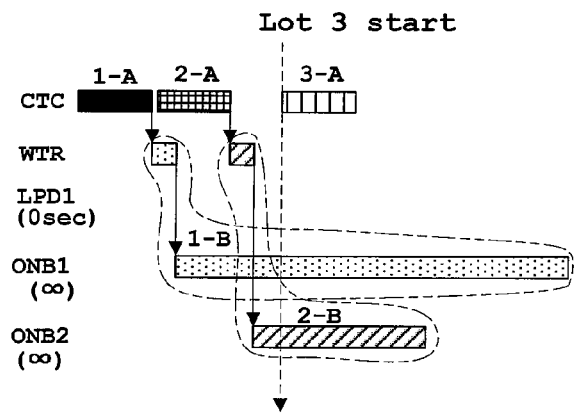

Fig.47A  Step 2
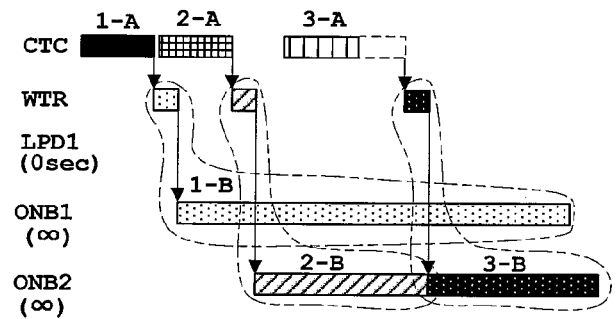
Fig.47B  Step 3
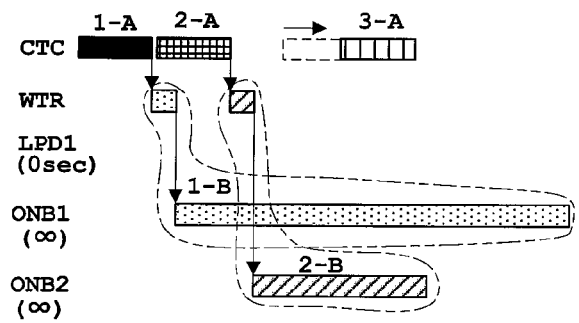
Fig.47C  Step 4
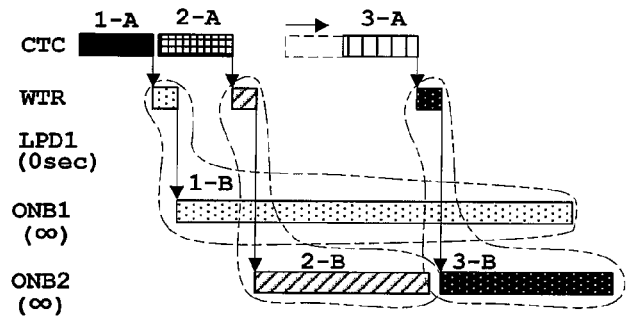

Fig. 48A   Step 5
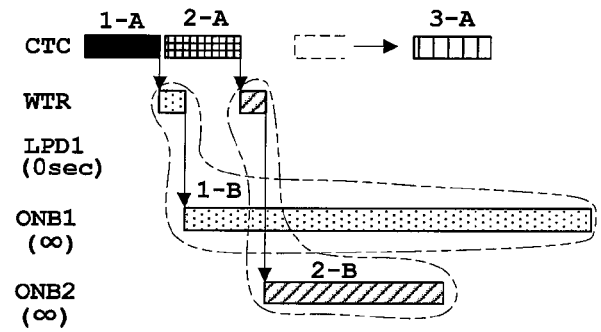
Fig. 48B   Step 6
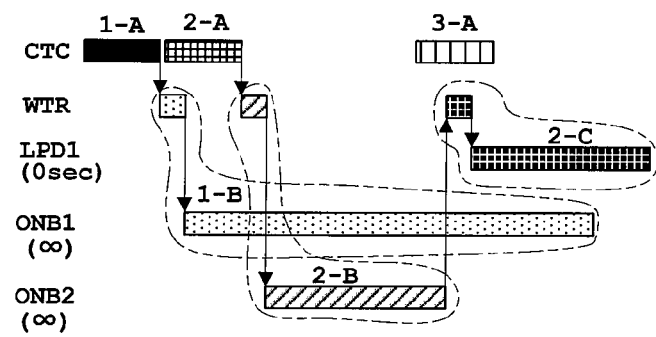
Fig. 48C   Step 7
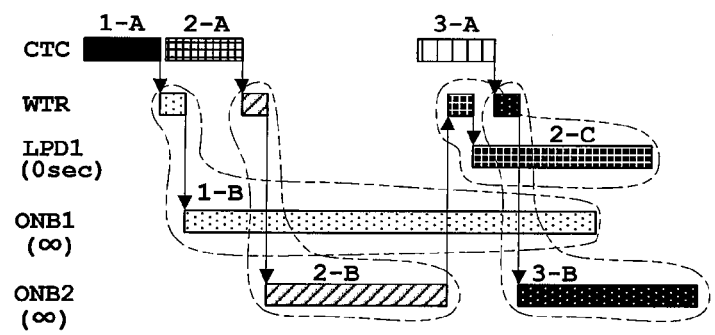

Fig.49A Step 8
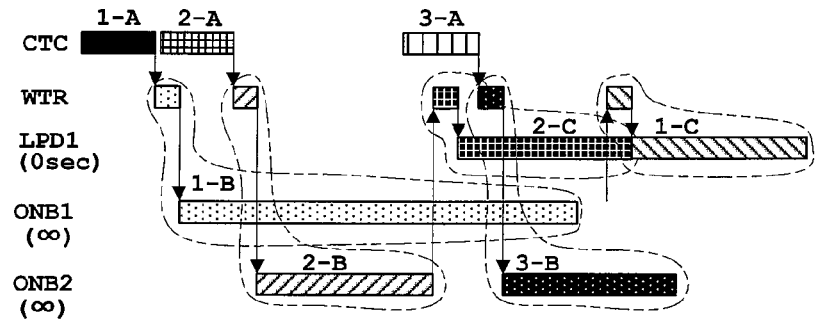
Fig.49B Step 9
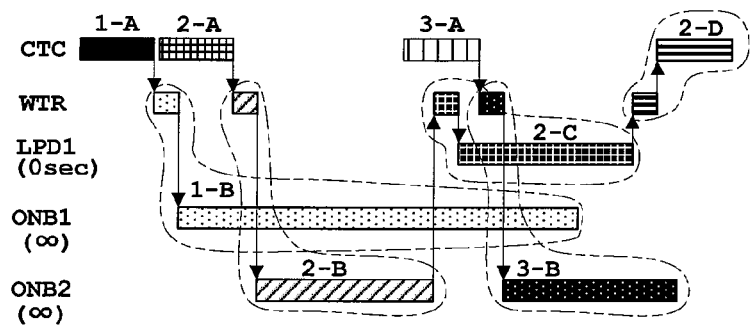
Fig.49C Step 10
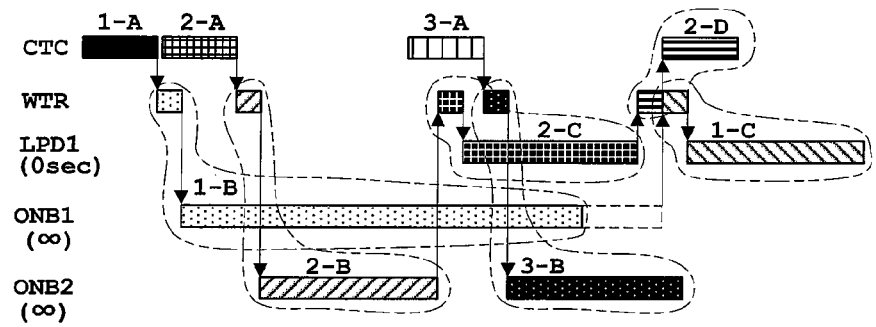

Fig. 50A    Step 11
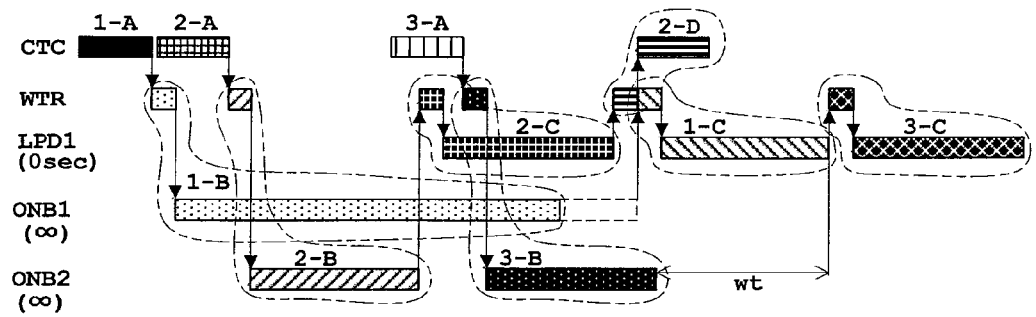
Fig. 50B    Step 12
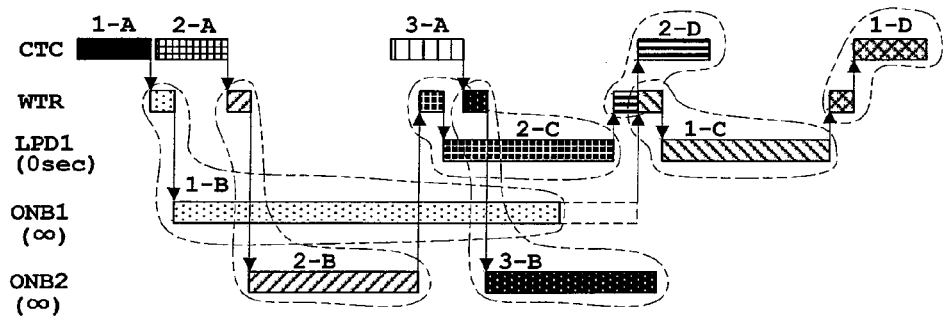
Fig. 50C    Step 13
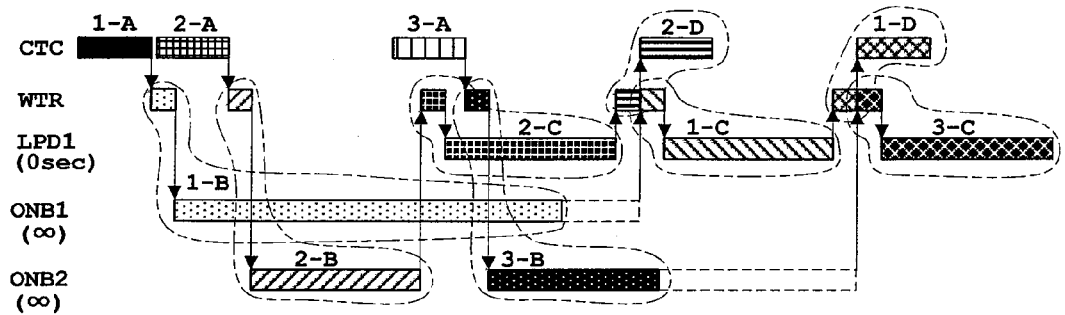

Fig.51  Step 14
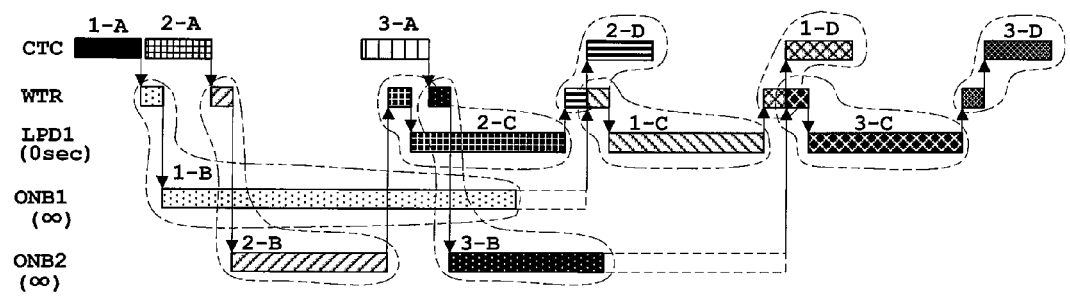

<Third Allocation Method>

Fig.55A
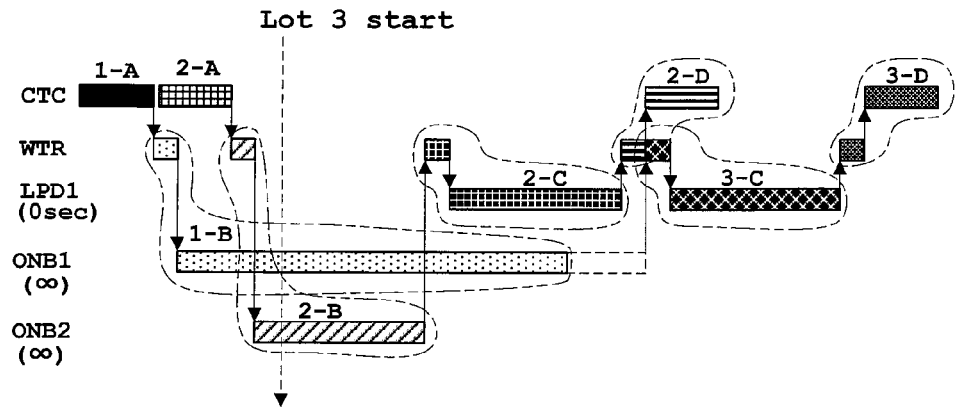
Fig.55B
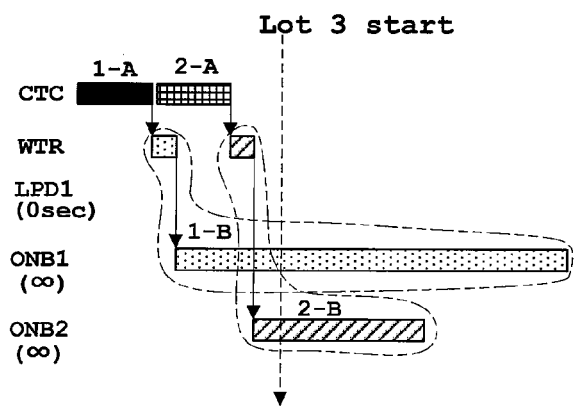
Fig.55C  Step 1
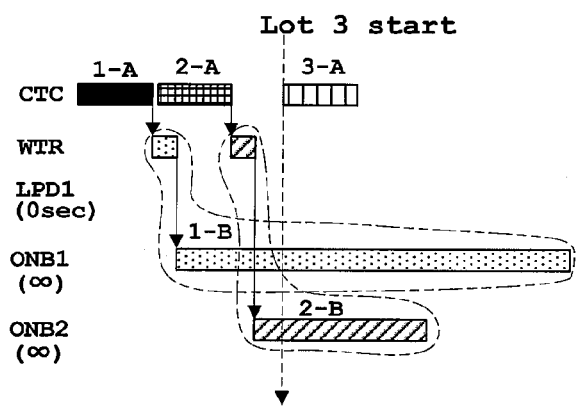

Fig.56A    Step 2
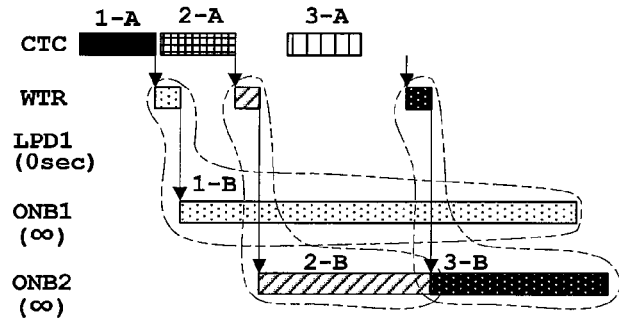
Fig.56B    Step 3
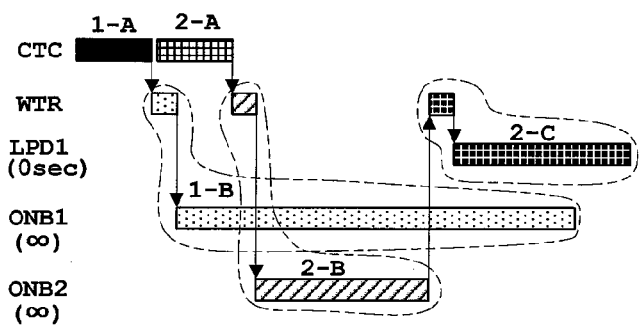
Fig.56C    Step 4
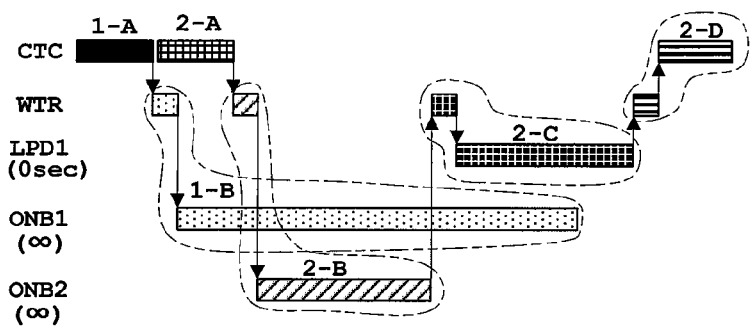

Fig.57A Step 5
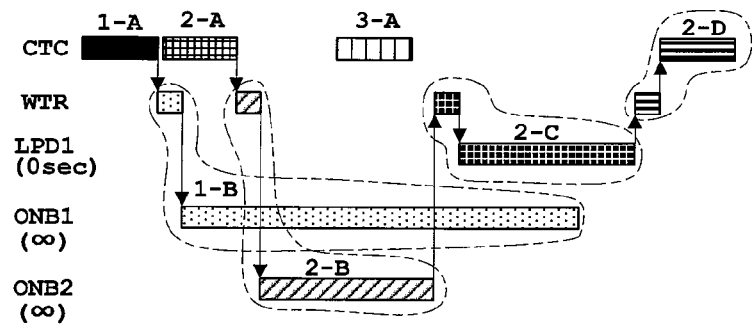
Fig.57B Step 6
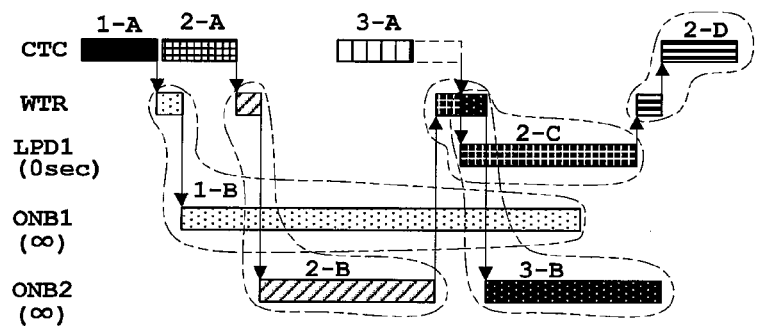
Fig.57C Step 7
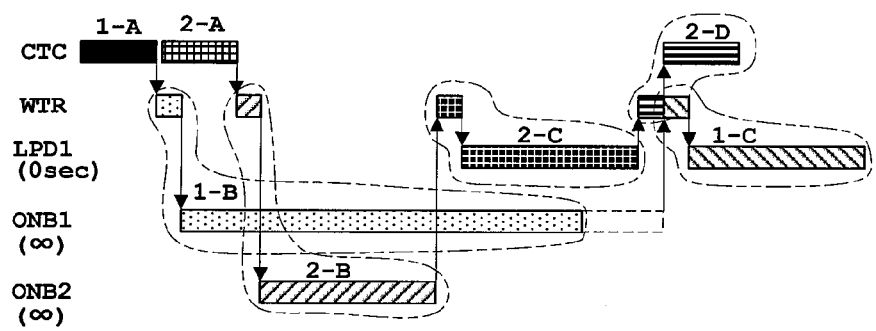

Fig.58A    Step 8
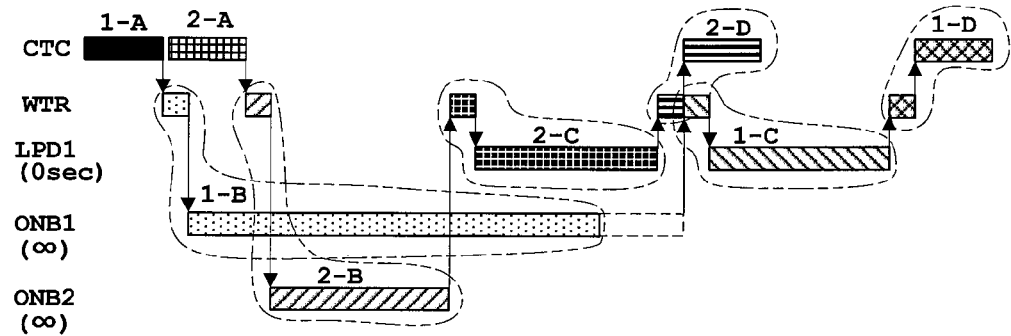
Fig.58B    Step 9
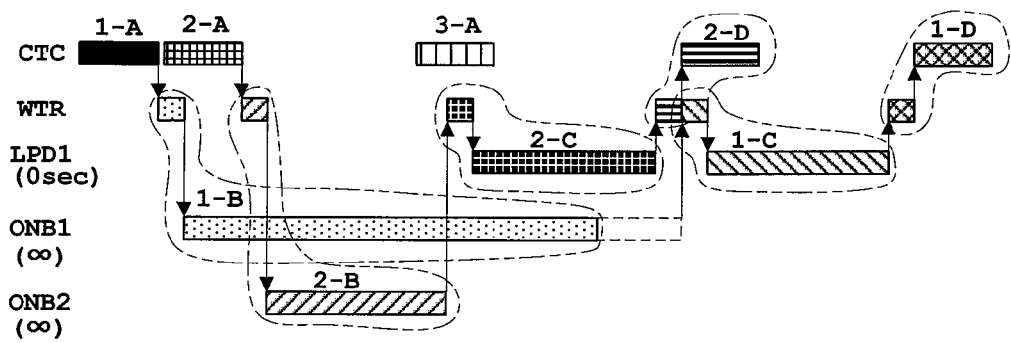
Fig.58C    Step 10
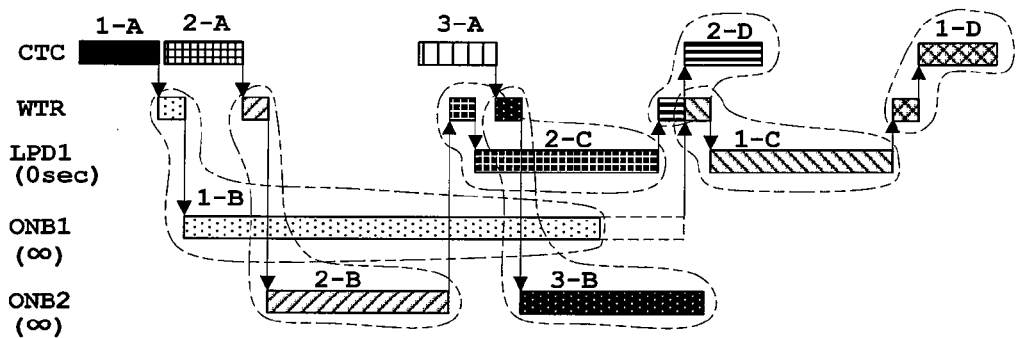

Fig.59A    Step 11
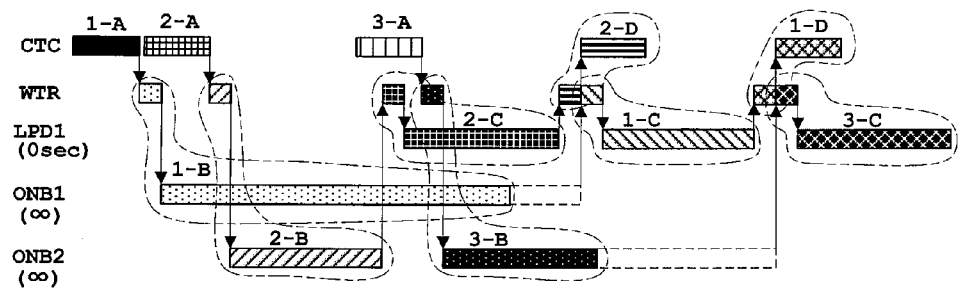
Fig.59B    Step 12
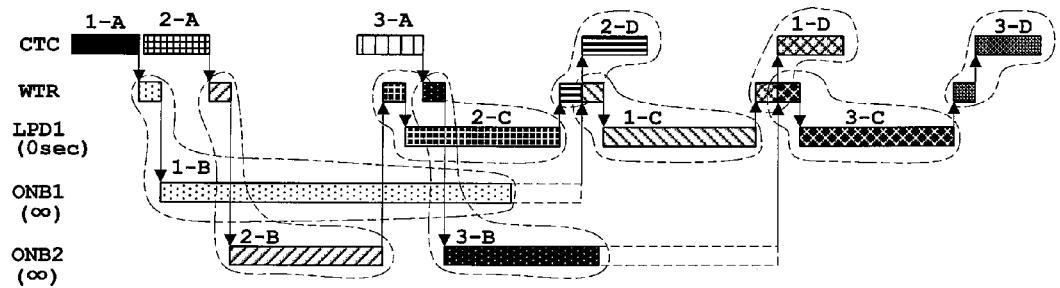

Fig. 62A    Step 1
Lot 1 start
　↓　Lot 2 start
　　↓　1-A
CTC
(0sec)
WTR
LPD1
(∞)
ONB1
(180sec)
ONB2
(180sec)
Fig. 62B    Step 2
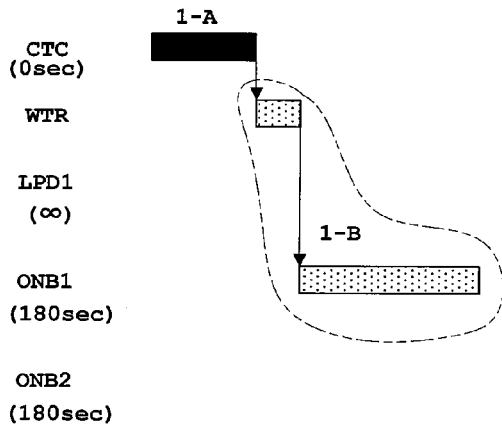
1-A
CTC
(0sec)
WTR
LPD1
(∞)
1-B
ONB1
(180sec)
ONB2
(180sec)
Fig. 62C    Step 3
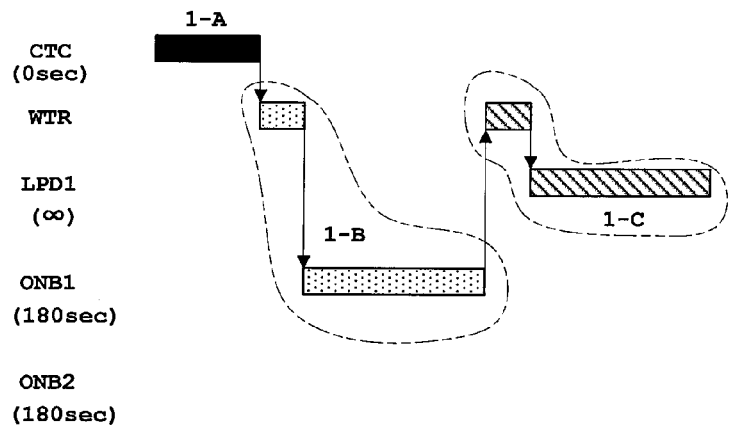
1-A
CTC
(0sec)
WTR
LPD1
(∞)
1-B            1-C
ONB1
(180sec)
ONB2
(180sec)

Fig. 63A    Step 4
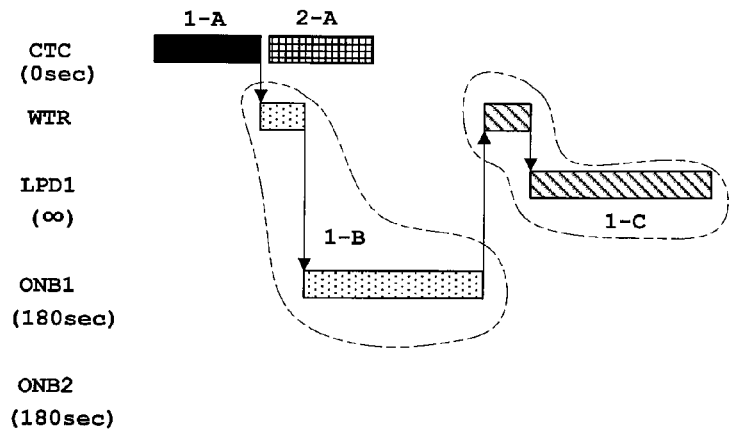
Fig. 63B    Step 5
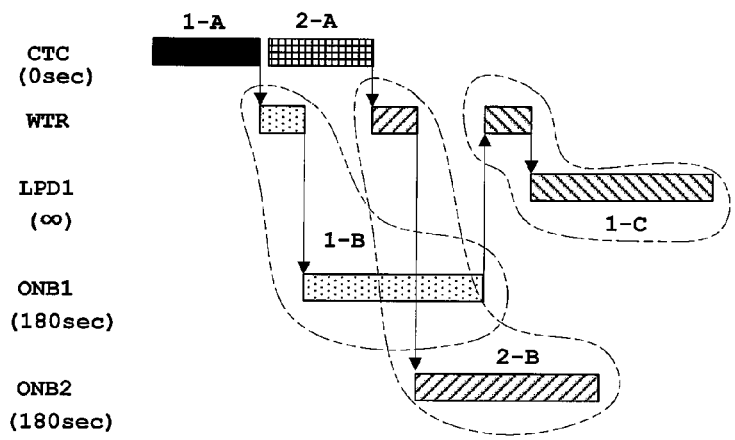
Fig. 63C    Step 6
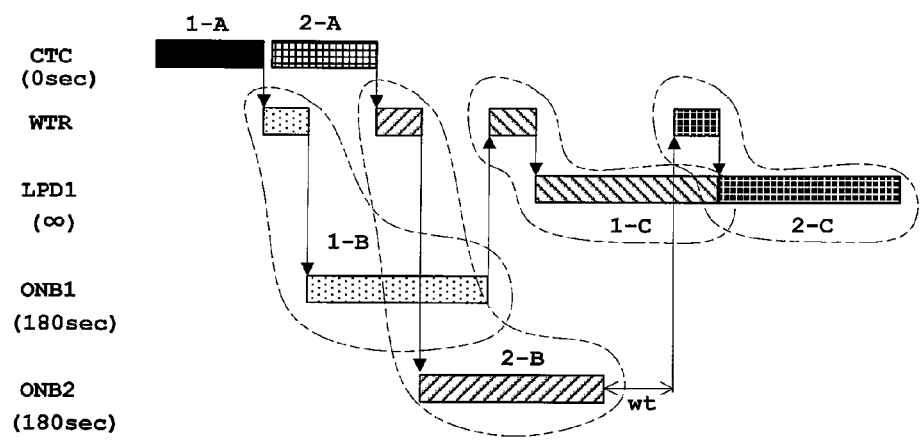

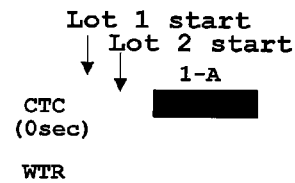
Fig. 64A    Step 7
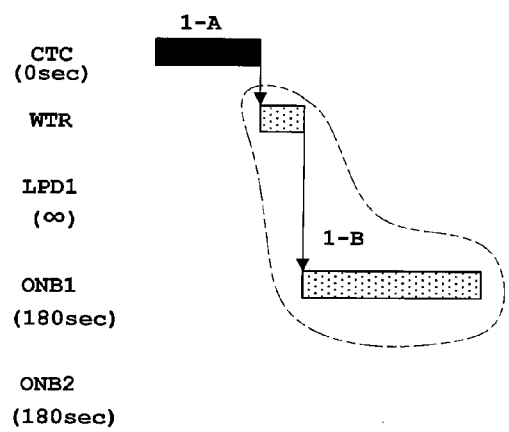
Fig. 64B    Step 8
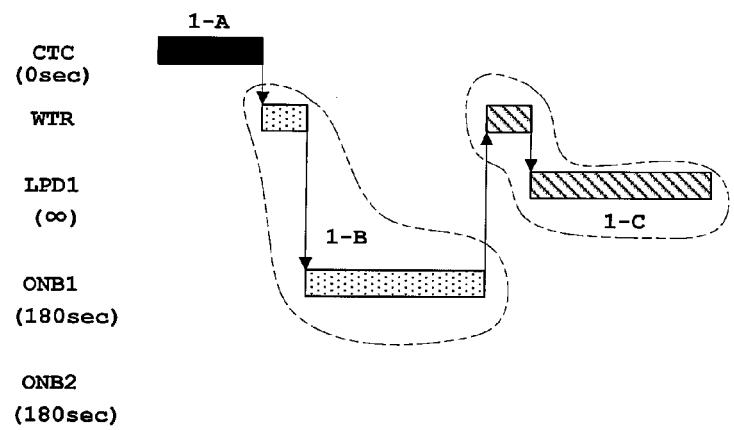
Fig. 64C    Step 9

Fig. 66A    Step 13
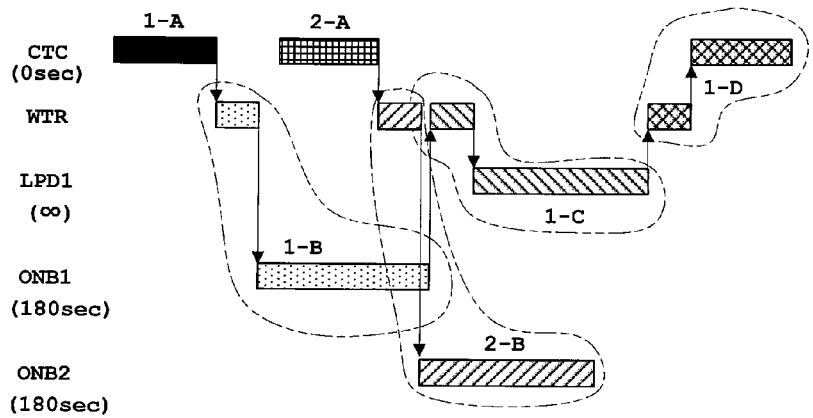
Fig. 66B    Step 14
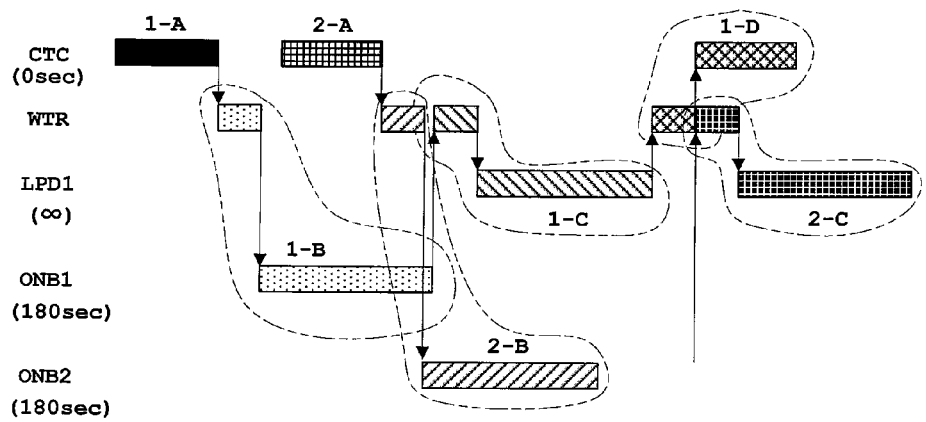
Fig. 66C    Step 15
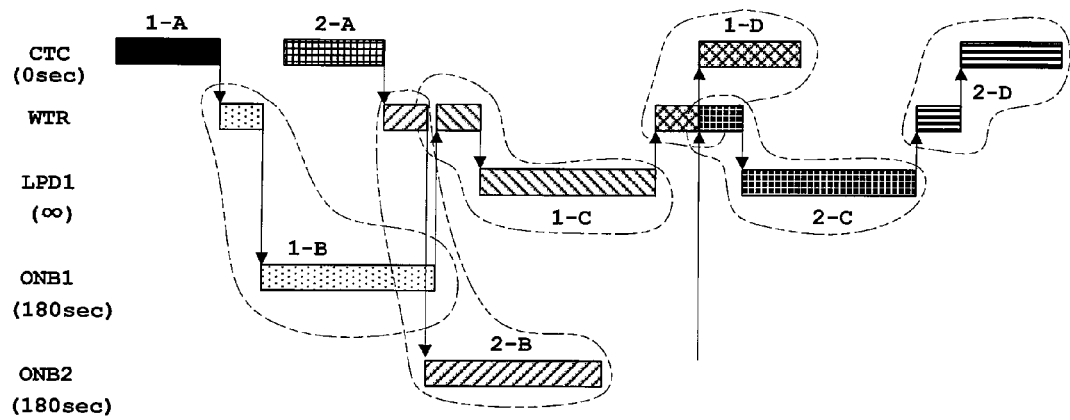

SCHEDULING METHOD AND PROGRAM FOR A SUBSTRATE TREATING APPARATUS

BACKGROUND OF THE INVENTION (1) Field of the Invention

This invention relates to a scheduling method and program for a substrate treating apparatus that performs predetermined treatment such as cleaning, etching and drying on semiconductor wafers or glass substrates for liquid crystal displays (which will be referred to hereinafter simply as substrates).

(2) Description of the Related Art

In treating a plurality of lots with a substrate treating apparatus having a plurality of treating sections, a conventional method of this type, for example, causes a controller to determine beforehand, based on a recipe including a plurality of treating steps, an order of treating a plurality of lots successively in the treating sections. The lots are transported and treated successively according to a schedule prepared in this way.

Specifically, based on a systematic chart showing combinations according to procedures in varied treating steps for each lot, a first treating step for one of the lots is allocated first. Then, following the systematic chart on the basis of that treating step, the next treating step to be selected from among next treating steps for the lots is a treating step for a lot having an earliest expected completion time of all preceding treating steps (see Japanese Unexamined Patent Publications No. 2003-241818 and No. 2003-243274, for example).

The above scheduling method for a substrate treating apparatus determines, before actually starting treatment of the lots, which lot is to be treated in which treating section at which time. Thus, different treating steps for the lots can be allocated efficiently, to improve the operating rate of the substrate treating apparatus.

In order to deal with a case of taking a long time in the schedule preparation as noted above, a comparison is made between a time consumed in the schedule preparation and a predetermined reference time. When the reference time is exceeded, a predetermined time is added to the reference time to make a new reference time. In this way, even when a schedule preparation takes a long time, a scheduling completion time will not be later than a scheduled time (see Japanese Patent No. 3712370).

The conventional method noted above has the following drawback.

In the conventional scheduling method for a substrate treating apparatus, a long time may be required for schedule preparation when an attempt is made to improve the operating rate of the apparatus by reducing standby periods. Problems arising from the long scheduling time may be avoided only by moving back the positions of subsequent treating steps to be allocated. But this will result only in an increase in standby time to inhibit improved operating rate. The lots for scheduling will decrease in number, and hence a problem of a flexible schedule preparation becoming impossible. There is also a problem that the reduced number of lots for scheduling will lower the operating rate.

SUMMARY OF THE INVENTION

This invention has been made having regard to the state of the art noted above, and its object is to provide a scheduling method and program for a substrate treating apparatus, which offer a plurality of allocating methods, thereby to avoid an extended scheduling time and to improve operating rate.

Another object of this invention is to provide a scheduling method and program for a substrate treating apparatus, which try a block arrangement according to reasons for allocation impossibility, thereby to avoid an extended scheduling time and to improve operating rate.

A further object of this invention is to provide a scheduling method and program for a substrate treating apparatus, which allocate, on a priority basis, blocks of lots earlier in the order of treatment starts, thereby to avoid an extended scheduling time and to improve operating rate.

A still further object of this invention is to provide a scheduling method and program for a substrate treating apparatus, which allocate, on a priority basis, a treating step for the same lot as a lot allocated earlier, thereby to avoid an extended scheduling time and to improve operating rate.

A still further object of this invention is to provide a scheduling method and program for a substrate treating apparatus, which allocate, on a priority basis, a treating step for a lot with a treating step having a short standby time, thereby to avoid an extended scheduling time and to improve operating rate.

The above objects are fulfilled, according to the present invention, by a scheduling method for a substrate treating apparatus having a plurality of treating units for treating substrates, wherein, based on a procedure including a plurality of treating steps, a controller determines an order of treating a plurality of lots successively in the treating units, the method comprising the steps of preparing a plurality of schedules through execution of a basic allocating method, based on a systematic chart representing combinations of the treating steps for the respective lots, for allocating a first treating step of one of the lots, and thereafter, while following the systematic chart from the treating step, for searching and allocating as a next treating step a treating step selected from among succeeding treating steps in the lots, whose preceding treating step has an earliest expected completion time of all preceding treating steps; and a first allocating method for allocating treating steps based on the basic allocating method, and when a waiting time occurring with one of the treating steps exceeds an allowed time for enabling a standby at one of the treating units, for avoiding allocation of the one of the treating steps and restarting a search at one branching point before a branching point upstream of the one of the treating steps; and selecting one schedule having been completed within a specified time, from the plurality of schedules prepared.

According to this invention, the controller prepares schedules beforehand, based on a systematic chart representing combinations of the treating steps for the respective lots, by allocating a first treating step of one of the lots, and thereafter, while following the systematic chart from the treating step, searching and allocating as a next treating step a treating step selected from among succeeding treating steps in the lots, whose preceding treating step has an earliest expected completion time of all preceding treating steps (basic allocating method). Meanwhile, the controller prepares schedules by allocating treating steps based on the basic allocating method, and when a waiting time occurring with one of the treating steps exceeds an allowed time for enabling a standby at one of the treating units, avoids allocation of this treating step and restarts a search at one branching point before a branching point upstream of this treating step in the systematic chart (first allocating method).

It is therefore possible, by preparing schedules beforehand by the basic allocating method, to allocate the lots such that a later operation of a preceding treating step and an early operation of a succeeding treating step overlap each other. A treating step, with its preceding treating step in the same lot expected to complete early, is selected and allocated with priority as the next treating step, thereby shortening time until completion of the next treating step. Further, in the first allocating method, treating steps down-stream in the systematic chart of the treating steps having a reason for being unallocable are not subjected to trial and error, which means a reduced number of times of trial. As a result, scheduling time can be shortened as compared with the basic allocating method. Thus, a plurality of schedules are simultaneously prepared by the basic allocating method and first allocating method having different characteristics, and one schedule completed within a specified time is selected. This prevents an extended scheduling time and a futile waiting time, thereby improving operating rate.

In another aspect of the invention, there is provided a scheduling method for a substrate treating apparatus having a plurality of treating units for treating substrates, wherein, based on a procedure including a plurality of treating steps, a controller determines an order of treating a plurality of lots successively in the treating units, the method comprising the steps of preparing a plurality of schedules through execution of a basic allocating method, based on a systematic chart representing combinations of the treating steps for the respective lots, for allocating a first treating step of one of the lots, and thereafter, while following the systematic chart from the treating step, for searching and allocating as a next treating step a treating step selected from among succeeding treating steps in the lots, whose preceding treating step has an earliest expected completion time of all preceding treating steps; and a second allocating method executed, when allocating treating steps based on the basic allocating method, for allocating a first treating step of each of first designated lots according to an order of starting treatment of the lots, and thereafter allocating a next treating step of one of the lots earlier in the order of starting treatment, with priority over next treating steps of the other lots; and selecting one schedule having been completed within a specified time, from the plurality of schedules prepared.

According to this invention, the controller prepares schedules beforehand, based on a systematic chart representing combinations of the treating steps for the respective lots, by allocating a first treating step of one of the lots, and thereafter, while following the systematic chart from the treating step, searches and allocates as a next treating step a treating step selected from among succeeding treating steps in the lots, whose preceding treating step has an earliest expected completion time of all preceding treating steps (basic allocating method). Meanwhile, the controller, in allocating treating steps based on the basic allocating method, allocates a first treating step of each of first designated lots according to an order of starting treatment of the lots, and thereafter allocates a next treating step of one of the lots earlier in the order of starting treatment, with priority over next treating steps of the other lots (second allocating method).

It is therefore possible, by preparing schedules beforehand by the basic allocating method, to allocate the lots such that a later operation of a preceding treating step and an early operation of a succeeding treating step overlap each other. A treating step, with its preceding treating step in the same lot expected to complete early, is selected and allocated with priority as the next treating step, thereby shortening time until completion of the next treating step. Further, the second allocating method can inhibit backtracking in allocation of the treating steps such as tracing back the systematic chart when a physical restriction makes the allocation impossible. Consequently, scheduling time can be shortened, and can be shortened as compared with the basic allocating method.

Thus, a plurality of schedules are simultaneously prepared by the basic allocating method and second allocating method having different characteristics, and one schedule completed within a specified time is selected. This prevents an extended scheduling time and a futile waiting time, thereby improving operating rate.

In a further aspect of the invention, there is provided a scheduling method for a substrate treating apparatus having a plurality of treating units for treating substrates, wherein, based on a procedure including a plurality of treating steps, a controller determines an order of treating a plurality of lots successively in the treating units, the method comprising the steps of preparing a plurality of schedules through execution of a basic allocating method, based on a systematic chart representing combinations of the treating steps for the respective lots, for allocating a first treating step of one of the lots, and thereafter, while following the systematic chart from the treating step, for searching and allocating as a next treating step a treating step selected from among succeeding treating steps in the lots, whose preceding treating step has an earliest expected completion time of all preceding treating steps; and a third allocating method executed, when allocating treating steps based on the basic allocating method, and when one of the lots includes an allocable treating step following a treating step allocated previously, for allocating the allocable treating step of the one of the lots with priority; and selecting one schedule having been completed within a specified time, from the plurality of schedules prepared.

According to this invention, the controller prepares schedules beforehand, based on a systematic chart representing combinations of the treating steps for the respective lots, by allocating a first treating step of one of the lots, and thereafter, while following the systematic chart from the treating step, searching and allocating as a next treating step a treating step selected from among succeeding treating steps in the lots, whose preceding treating step has an earliest expected completion time of all preceding treating steps (basic allocating method). Meanwhile, the controller allocates treating steps based on the basic allocating method, and when one of the lots includes an allocable treating step following a treating step allocated previously, allocates the allocable treating step of this lot with priority (third allocating method).

It is therefore possible, by preparing schedules beforehand by the basic allocating method, to allocate the lots such that a later operation of a preceding treating step and an early operation of a succeeding treating step overlap each other. A treating step, with its preceding treating step in the same lot expected to complete early, is selected and allocated with priority as the next treating step, thereby shortening time until completion of the next treating step. Further, in the third allocating method, the treating steps in the same lot as the treating step allocated previously are allocated with priority. Therefore, this method can shorten scheduling time in scheduling treatment resumed after the apparatus is stopped. Thus, a plurality of schedules are simultaneously prepared by the basic allocating method and third allocating method having different characteristics, and one schedule completed within a specified time is selected. This prevents an extended scheduling time and a futile waiting time, thereby improving operating rate.

In a still further aspect of the invention, there is provided a scheduling method for a substrate treating apparatus having a plurality of treating units for treating substrates, wherein, based on a procedure including a plurality of treating steps, a controller determines an order of treating a plurality of lots successively in the treating units, the method comprising the steps of preparing a plurality of schedules through execution of a basic allocating method, based on a systematic chart representing combinations of the treating steps for the respective lots, for allocating a first treating step of one of the lots, and thereafter, while following the systematic chart from the treating step, for searching and allocating as a next treating step a treating step selected from among succeeding treating steps in the lots, whose preceding treating step has an earliest expected completion time of all preceding treating steps; and a fourth allocating method executed, when allocating treating steps based on the basic allocating method, for allocating, with priority, treating steps of a lot having a treating step with a short allowed time for enabling a standby at one of the treating units; and selecting one schedule having been completed within a specified time, from the plurality of schedules prepared.

According to this invention, the controller prepares schedules beforehand, based on a systematic chart representing combinations of the treating steps for the respective lots, by allocating a first treating step of one of the lots, and thereafter, while following the systematic chart from the treating step, searching and allocating as a next treating step a treating step selected from among succeeding treating steps in the lots, whose preceding treating step has an earliest expected completion time of all preceding treating steps (basic allocating method). Meanwhile, the controller, in allocating treating steps based on the basic allocating method, allocates, with priority, treating steps of a lot having a treating step with a short allowed time for enabling a standby at one of the treating units (fourth allocating method).

It is therefore possible, by preparing schedules beforehand by the basic allocating method, to allocate the lots such that a later operation of a preceding treating step and an early operation of a succeeding treating step overlap each other. A treating step, with its preceding treating step in the same lot expected to complete early, is selected and allocated with priority as the next treating step, thereby shortening time until completion of the next treating step. Even though treating steps with a short allowed time can be allocated physically, a failure in observing the allowed time could make allocation impossible. This often results in backtracking in the systematic chart. Thus, the fourth allocating method allocates treating steps with a short allowed time with priority, to facilitate avoidance of allocating impossibility due to the allowed time, thereby shortening scheduling time. As a result, this method can shorten scheduling time compared with the basic allocating method. Thus, a plurality of schedules are simultaneously prepared by the basic allocating method and fourth allocating method having different characteristics, and one schedule completed within a specified time is selected. This prevents an extended scheduling time and a futile waiting time, thereby improving operating rate.

In a still further aspect of the invention, there is provided a scheduling method for a substrate treating apparatus having a plurality of treating units for treating substrates, wherein, based on a procedure including a plurality of treating steps, a controller determines an order of treating a plurality of lots successively in the treating units, the method comprising the steps of preparing a plurality of schedules through execution of a first allocating method for allocating treating steps based on a basic allocating method which, based on a systematic chart representing combinations of the treating steps for the respective lots, allocates a first treating step of one of the lots, and thereafter, while following the systematic chart from the treating step, searches and allocates as a next treating step a treating step selected from among succeeding treating steps in the lots, whose preceding treating step has an earliest expected completion time of all preceding treating steps, and when a waiting time occurring with one of the treating steps exceeds an allowed time for enabling a standby at one of the treating units, for avoiding allocation of the one of the treating steps and restarting a search at one branching point before a branching point upstream of the one of the treating steps; and a second allocating method executed, when allocating treating steps based on the basic allocating method, for allocating a first treating step of each of first designated lots according to an order of starting treatment of the lots, and thereafter allocating a next treating step of one of the lots earlier in the order of starting treatment, with priority over next treating steps of the other lots; and selecting one schedule having been completed within a specified time, from the plurality of schedules prepared.

According to this invention, the controller, in allocating treating steps based on the basic allocating method, when a waiting time occurring with one of the treating steps exceeds an allowed time for enabling a standby at one of the treating units, avoids allocation of this treating step and restarts a search at one branching point before a branching point upstream of this treating step in the systematic chart (first allocating method). Meanwhile, the controller, in allocating treating steps based on the basic allocating method, allocates a first treating step of each of first designated lots according to an order of starting treatment of the lots, and thereafter allocates a next treating step of one of the lots earlier in the order of starting treatment, with priority over next treating steps of the other lots (second allocating method).

Thus, schedules are prepared by the first allocating method while using the basic allocating method. Treating steps downstream in the systematic chart of the treating steps having a reason for being unallocable are not subjected to trial and error, which can reduce the number of times of trial. As a result, scheduling time can be shortened as compared with the basic allocating method. Further, the second allocating method can inhibit backtracking in allocation of the treating steps such as tracing back the systematic chart when a physical restriction makes the allocation impossible. Consequently, scheduling time can be shortened, and can be shortened as compared with the basic allocating method. Thus, a plurality of schedules are simultaneously prepared by the first allocating method and second allocating method having different characteristics, and one schedule completed within a specified time is selected. This prevents an extended scheduling time and a futile waiting time, thereby improving operating rate.

In a still further aspect of the invention, there is provided a scheduling method for a substrate treating apparatus having a plurality of treating units for treating substrates, wherein, based on a procedure including a plurality of treating steps, a controller determines an order of treating a plurality of lots successively in the treating units, the method comprising the steps of preparing a plurality of schedules through execution of a first allocating method for allocating treating steps based on a basic allocating method which, based on a systematic chart representing combinations of the treating steps for the respective lots, allocates a first treating step of one of the lots, and thereafter, while following the systematic chart from the treating step, searches and allocates as a next treating step a treating step selected from among succeeding treating steps in the lots, whose preceding treating step has an earliest expected completion time of all preceding treating steps, and when a waiting time occurring with one of the treating steps exceeds an allowed time for enabling a standby at one of the treating units, for avoiding allocation of the one of the treating steps and restarting a search at one branching point before a branching point upstream of the one of the treating steps; and a third allocating method executed, when allocating treating steps based on the basic allocating method, and when one of the lots includes an allocable treating step following a treating step allocated previously, for allocating the allocable treating step of the one of the lots with priority; and selecting one schedule having been completed within a specified time, from the plurality of schedules prepared.

According to this invention, the controller, in allocating treating steps based on the basic allocating method, when a waiting time occurring with one of the treating steps exceeds an allowed time for enabling a standby at one of the treating units, avoids allocation of this treating step and restarts a search at one branching point before a branching point upstream of this treating step in the systematic chart (first allocating method). Meanwhile, the controller allocates treating steps based on the basic allocating method, and when one of the lots includes an allocable treating step following a treating step allocated previously, allocates the allocable treating step of this lot with priority (third allocating method).

Thus, schedules are prepared by the first allocating method while using the basic allocating method. Treating steps downstream in the systematic chart of the treating steps having a reason for being unallocable are not subjected to trial and error, which can reduce the number of times of trial. As a result, scheduling time can be shortened as compared with the basic allocating method. Further, in the third allocating method, the treating steps in the same lot as the treating step allocated previously are allocated with priority. Therefore, this method can shorten scheduling time in scheduling treatment resumed after the apparatus is stopped. Thus, a plurality of schedules are simultaneously prepared by the basic allocating method and third allocating method having different characteristics, and one schedule completed within a specified time is selected. This prevents an extended scheduling time and a futile waiting time, thereby improving operating rate.

In a still further aspect of the invention, there is provided a scheduling method for a substrate treating apparatus having a plurality of treating units for treating substrates, wherein, based on a procedure including a plurality of treating steps, a controller determines an order of treating a plurality of lots successively in the treating units, the method comprising the steps of preparing a plurality of schedules through execution of a first allocating method for allocating treating steps based on a basic allocating method which, based on a systematic chart representing combinations of the treating steps for the respective lots, allocates a first treating step of one of the lots, and thereafter, while following the systematic chart from the treating step, searches and allocates as a next treating step a treating step selected from among succeeding treating steps in the lots, whose preceding treating step has an earliest expected completion time of all preceding treating steps, and when a waiting time occurring with one of the treating steps exceeds an allowed time for enabling a standby at one of the treating units, for avoiding allocation of the one of the treating steps and restarting a search at one branching point before a branching point upstream of the one of the treating steps; and a fourth allocating method executed, when allocating treating steps based on the basic allocating method, for allocating, with priority, treating steps of a lot having a treating step with a short allowed time for enabling a standby at one of the treating units; and selecting one schedule having been completed within a specified time, from the plurality of schedules prepared.

According to this invention, the controller, in allocating treating steps based on the basic allocating method, when a waiting time occurring with one of the treating steps exceeds an allowed time for enabling a standby at one of the treating units, avoids allocation of this treating step and restarts a search at one branching point before a branching point upstream of this treating step in the systematic chart (first allocating method). Meanwhile, the controller, in allocating treating steps based on the basic allocating method, allocates, with priority, treating steps of a lot having a treating step with a short allowed time for enabling a standby at one of the treating units (fourth allocating method).

Thus, schedules are prepared by the first allocating method while using the basic allocating method. Treating steps downstream in the systematic chart of the treating steps having a reason for being unallocable are not subjected to trial and error, which can reduce the number of times of trial. As a result, scheduling time can be shortened as compared with the basic allocating method. Even though treating steps with a short allowed time can be allocated physically, a failure in observing the allowed time could make allocation impossible. This often results in backtracking in the systematic chart. Thus, the fourth allocating method allocates treating steps with a short allowed time with priority, to facilitate avoidance of allocating impossibility due to the allowed time, thereby shortening scheduling time. As a result, this method can shorten scheduling time compared with the basic allocating method. Thus, a plurality of schedules are simultaneously prepared by the first allocating method and fourth allocating method having different characteristics, and one schedule completed within a specified time is selected. This prevents an extended scheduling time and a futile waiting time, thereby improving operating rate.

In a still further aspect of the invention, there is provided a scheduling method for a substrate treating apparatus having a plurality of treating units for treating substrates, wherein, based on a procedure including a plurality of treating steps, a controller determines an order of treating a plurality of lots successively in the treating units, the method comprising the steps of preparing a plurality of schedules through execution of a second allocating method for allocating treating steps based on a basic allocating method which, based on a systematic chart representing combinations of the treating steps for the respective lots, allocates a first treating step of one of the lots, and thereafter, while following the systematic chart from the treating step, searches and allocates as a next treating step a treating step selected from among succeeding treating steps in the lots, whose preceding treating step has an earliest expected completion time of all preceding treating steps, and for allocating a first treating step of each of first designated lots according to an order of starting treatment of the lots, and thereafter allocating a next treating step of one of the lots earlier in the order of starting treatment, with priority over next treating steps of the other lots; and a third allocating method executed, when allocating treating steps based on the basic allocating method, and when one of the lots includes an allocable treating step following a treating step allocated previously, for allocating the allocable treating step of the one of the lots with priority; and selecting one schedule having been completed within a specified time, from the plurality of schedules prepared.

According to this invention, the controller, in allocating treating steps based on the basic allocating method, allocates a first treating step of each of first designated lots according to an order of starting treatment of the lots, and thereafter allocates a next treating step of one of the lots earlier in the order of starting treatment, with priority over next treating steps of the other lots (second allocating method). Meanwhile, the controller allocates treating steps based on the basic allocating method, and when one of the lots includes an allocable treating step following a treating step allocated previously, allocates the allocable treating step of this lot with priority (third allocating method).

Thus, schedules are prepared by the second allocating method while using the basic allocating method. This can inhibit backtracking in allocation of the treating steps such as tracing back the systematic chart when a physical restriction makes the allocation impossible. Consequently, scheduling time can be shortened. Further, in the third allocating method, the treating steps in the same lot as the treating step allocated previously are allocated with priority. Therefore, this method can shorten scheduling time in scheduling treatment resumed after the apparatus is stopped. Thus, a plurality of schedules are simultaneously prepared by the second allocating method and third allocating method having different characteristics, and one schedule completed within a specified time is selected. This prevents an extended scheduling time and a futile waiting time, thereby improving operating rate.

In a still further aspect of the invention, there is provided a scheduling method for a substrate treating apparatus having a plurality of treating units for treating substrates, wherein, based on a procedure including a plurality of treating steps, a controller determines an order of treating a plurality of lots successively in the treating units, the method comprising the steps of preparing a plurality of schedules through execution of a second allocating method for allocating treating steps based on a basic allocating method which, based on a systematic chart representing combinations of the treating steps for the respective lots, allocates a first treating step of one of the lots, and thereafter, while following the systematic chart from the treating step, searches and allocates as a next treating step a treating step selected from among succeeding treating steps in the lots, whose preceding treating step has an earliest expected completion time of all preceding treating steps, and for allocating a first treating step of each of first designated lots according to an order of starting treatment of the lots, and thereafter allocating a next treating step of one of the lots earlier in the order of starting treatment, with priority over next treating steps of the other lots; and a fourth allocating method executed, when allocating treating steps based on the basic allocating method, for allocating, with priority, treating steps of a lot having a treating step with a short allowed time for enabling a standby at one of the treating units; and selecting one schedule having been completed within a specified time, from the plurality of schedules prepared.

According to this invention, the controller, in allocating treating steps based on the basic allocating method, allocates a first treating step of each of first designated lots according to an order of starting treatment of the lots, and thereafter allocates a next treating step of one of the lots earlier in the order of starting treatment, with priority over next treating steps of the other lots (second allocating method). Meanwhile, the controller, in allocating treating steps based on the basic allocating method, allocates, with priority, treating steps of a lot having a treating step with a short allowed time for enabling a standby at one of the treating units (fourth allocating method).

Thus, schedules are prepared by the second allocating method while using the basic allocating method. This can inhibit backtracking in allocation of the treating steps such as tracing back the systematic chart when a physical restriction makes the allocation impossible. Consequently, scheduling time can be shortened. Even though treating steps with a short allowed time can be allocated physically, a failure in observing the allowed time could make allocation impossible. This often results in backtracking in the systematic chart. Thus, the fourth allocating method allocates treating steps with a short allowed time with priority, to facilitate avoidance of allocating impossibility due to the allowed time, thereby shortening scheduling time. As a result, this method can shorten scheduling time compared with the basic allocating method. Thus, a plurality of schedules are simultaneously prepared by the second allocating method and fourth allocating method having different characteristics, and one schedule completed within a specified time is selected. This prevents an extended scheduling time and a futile waiting time, thereby improving operating rate.

In a still further aspect of the invention, there is provided a scheduling method for a substrate treating apparatus having a plurality of treating units for treating substrates, wherein, based on a procedure including a plurality of treating steps, a controller determines an order of treating a plurality of lots successively in the treating units, the method comprising the steps of preparing a plurality of schedules through execution of a third allocating method for allocating treating steps based on a basic allocating method which, based on a systematic chart representing combinations of the treating steps for the respective lots, allocates a first treating step of one of the lots, and thereafter, while following the systematic chart from the treating step, searches and allocates as a next treating step a treating step selected from among succeeding treating steps in the lots, whose preceding treating step has an earliest expected completion time of all preceding treating steps, and when one of the lots includes an allocable treating step following a treating step allocated previously, for allocating the allocable treating step of the one of the lots with priority; and a fourth allocating method executed, when allocating treating steps based on the basic allocating method, for allocating, with priority, treating steps of a lot having a treating step with a short allowed time for enabling a standby at one of the treating units; and selecting one schedule having been completed within a specified time, from the plurality of schedules prepared.

According to this invention, the controller allocates treating steps based on the basic allocating method, and when one of the lots includes an allocable treating step following a treating step allocated previously, allocates the allocable treating step of this lot with priority (third allocating method). Meanwhile, the controller, in allocating treating steps based on the basic allocating method, allocates, with priority, treating steps of a lot having a treating step with a short allowed time for enabling a standby at one of the treating units (fourth allocating method).

Thus, the third allocating method can shorten scheduling time in scheduling treatment resumed after the apparatus is stopped. Even though treating steps with a short allowed time can be allocated physically, a failure in observing the allowed time could make allocation impossible. This often results in backtracking in the systematic chart. Thus, the fourth allocating method allocates treating steps with a short allowed time with priority, to facilitate avoidance of allocating impossibility due to the allowed time, thereby shortening scheduling time. As a result, this method can shorten scheduling time compared with the basic allocating method. Thus, a plurality of schedules are simultaneously prepared by the third allocating method and fourth allocating method having different characteristics, and one schedule completed within a specified time is selected. This prevents an extended scheduling time and a futile waiting time, thereby improving operating rate.

In this invention, the step of selecting one schedule may be executed by the controller to select a single schedule relating a treatment completed earliest, from among schedules completed within the specified time.

When a plurality of schedules are completed in the specified time, the operating rate of the apparatus can be improved by selecting therefrom one relating a treatment completed earliest.

In a still further aspect of the invention, there is provided a scheduling method for a substrate treating apparatus having a plurality of treating units for treating substrates, wherein, based on a procedure including a plurality of treating steps, a controller determines an order of treating a plurality of lots successively in the treating units, the method comprising the steps of allocating the treating steps by a basic allocating method which, based on a systematic chart representing combinations of the treating steps for the respective lots, allocates a first treating step of one of the lots, and thereafter, while following the systematic chart from the treating step, and searches and allocates as a next treating step a treating step selected from among succeeding treating steps in the lots, whose preceding treating step has an earliest expected completion time of all preceding treating steps; and preparing schedules by using also a special allocating method executed, when allocating the treating steps based on the basic allocating method and a waiting time occurring with one of the treating steps exceeds an allowed time for enabling a standby at one of the treating units, for avoiding allocation of the one of the treating steps and restarting a search at one branching point before a branching point upstream of the one of the treating steps.

According to this invention, the controller prepares schedules beforehand, based on a systematic chart representing combinations of the treating steps for the respective lots, by allocating a first treating step of one of the lots, and thereafter, while following the systematic chart from the treating step, searching and allocating as a next treating step a treating step selected from among succeeding treating steps in the lots, whose preceding treating step has an earliest expected completion time of all preceding treating steps (basic allocating method). Meanwhile, the controller uses also a method for preparing schedules (special allocating method) which, when a waiting time occurring with one of the treating steps exceeds an allowed time for enabling a standby at one of the treating units, avoids allocation of this treating step and restarts a search at one branching point before a branching point upstream of this treating step in the systematic chart.

It is therefore possible to prepare schedules beforehand by the basic allocating method to allocate the lots such that a later operation of a preceding treating step and an early operation of a succeeding treating step overlap each other. A treating step, with its preceding treating step in the same lot expected to complete early, is selected and allocated with priority as the next treating step, thereby shortening time until completion of the next treating step. Further, in the special allocating method, treating steps downstream in the systematic chart of the treating steps having a reason for being unallocable are not subjected to trial and error, which means a reduced number of times of trial. As a result, scheduling time can be shortened as compared with the case of preparing schedules by the basic allocating method alone. This prevents a futile waiting time, thereby improving operating rate.

In a still further aspect of the invention, there is provided a scheduling method for a substrate treating apparatus having a plurality of treating units for treating substrates, wherein, based on a procedure including a plurality of treating steps, a controller determines an order of treating a plurality of lots successively in the treating units, the method comprising the steps of allocating the treating steps, based on a systematic chart representing combinations according to the order of treatment of the treating steps for the respective lots, by allocating a first treating step of one of the lots, and thereafter, while following the systematic chart from the treating step, searching and allocating a next treating step of each lot; and preparing schedules such that, in searching and allocating the next treating step, after allocating the first treating step of each of first designated lots according to an order of starting treatment of the lots, a next treating step of one of the lots earlier in the order of starting treatment is allocated with priority over next treating steps of the other lots.

According to this invention, the controller allocates a first treating step of one of the lots based on a systematic chart representing combinations of the treating steps for the respective lots, and thereafter, while following the systematic chart from this treating step, searches and allocates a next treating step of each lot. In searching and allocating the next treating step, after allocating the first treating step of each of first designated lots according to an order of starting treatment of the lots, a next treating step of one of the lots earlier in the order of starting treatment is allocated with priority over next treating steps of the other lots.

By preparing schedules in advance of treatment, it is possible to allocate the lots such that a later operation of a preceding treating step and an early operation of a succeeding treating step overlap each other, thereby shortening time until completion of the next treating step. Further, by allocating, with priority, treating steps of the lot earlier in the order of starting treatment, it is possible to inhibit backtracking in allocation of the treating steps such as tracing back the systematic chart when a physical restriction makes the allocation impossible in time of allocating a treating step of a certain lot after a treating step of a different lot. This shortens scheduling time and prevents a futile waiting time, thereby improving operating rate.

In a still further aspect of the invention, there is provided a scheduling method for a substrate treating apparatus having a plurality of treating units for treating substrates, wherein, based on a procedure including a plurality of treating steps, a controller determines an order of treating a plurality of lots successively in the treating units, the method comprising the steps of allocating the treating steps, based on a systematic chart representing combinations according to the order of treatment of the treating steps for the respective lots, by allocating a first treating step of one of the lots, and thereafter, while following the systematic chart from the treating step, searching and allocating a next treating step of each lot; and preparing schedules such that, in searching and allocating the next treating step, when one of the lots includes an allocable treating step following a treating step allocated previously, the allocable treating step of the one of the lots is allocated with priority.

According to this invention, the controller allocates a first treating step of one of the lots based on a systematic chart representing combinations of the treating steps for the respective lots, and thereafter, while following the systematic chart from this treating step, searches and allocates a next treating step of each lot. In searching and allocating the next treating step, when one of the lots includes an allocable treating step following a treating step allocated previously, this allocable treating step is allocated with priority.

By preparing schedules in advance of treatment, it is possible to allocate the lots such that a later operation of a preceding treating step and an early operation of a succeeding treating step overlap each other, thereby shortening time until completion of the next treating step. Further, the treating steps in the same lot as the treating step allocated previously are allocated with priority. This shortens scheduling time and prevents a futile waiting time, thereby improving operating rate.

In a still further aspect of the invention, there is provided a scheduling method for a substrate treating apparatus having a plurality of treating units for treating substrates, wherein, based on a procedure including a plurality of treating steps, a controller determines an order of treating a plurality of lots successively in the treating units, the method comprising the steps of allocating the treating steps, based on a systematic chart representing combinations according to the order of treatment of the treating steps for the respective lots, by allocating a first treating step of one of the lots, and thereafter, while following the systematic chart from the treating step, searching and allocating a next treating step of each lot; and preparing schedules such that, in searching and allocating the next treating step, treating steps of a lot having a treating step with a short allowed time for enabling a standby at one of the treating units are allocated with priority.

According to this invention, the controller allocates a first treating step of one of the lots based on a systematic chart representing combinations of the treating steps for the respective lots, and thereafter, while following the systematic chart from this treating step, searches and allocates a next treating step of each lot. In searching and allocating the next treating step, treating steps of a lot having a treating step with a short allowed time for enabling a standby at one of the treating units are allocated with priority.

By preparing schedules in advance of treatment, it is possible to allocate the lots such that a later operation of a preceding treating step and an early operation of a succeeding treating step overlap each other, thereby shortening time until completion of the next treating step. However, although treating steps with a short allowed time can be allocated physically, a failure in observing the allowed time could make allocation impossible. This often results in backtracking in the systematic chart. Thus, treating steps with a short allowed time are allocated with priority, to facilitate avoidance of allocating impossibility due to the allowed time, thereby shortening scheduling time. This prevents an extended scheduling time and a futile waiting time, thereby improving operating rate.

BRIEF DESCRIPTION OF THE DRAWINGS

For the purpose of illustrating the invention, there are shown in the drawings several forms which are presently preferred, it being understood, however, that the invention is not limited to the precise arrangement and instrumentalities shown.

FIG. 5A shows a specific example of time chart for lot 1 in a single batch;

FIG. 5B shows a specific example of time chart for lot 2 in the single batch;

FIG. 7A is a time chart of step 1 showing an allocating process according to the basic allocating method;

FIG. 7B is a time chart of step 2 showing an allocating process according to the basic allocating method;

FIG. 7C is a time chart of step 3 showing an allocating process according to the basic allocating method;

FIG. 8A is a time chart of step 4 showing an allocating process according to the basic allocating method;

FIG. 8B is a time chart of step 5 showing an allocating process according to the basic allocating method;

FIG. 8C is a time chart of step 6 showing an allocating process according to the basic allocating method;

FIG. 9A is a time chart of step 7 showing an allocating process according to the basic allocating method;

FIG. 9B is a time chart of step 8 showing an allocating process according to the basic allocating method;

FIG. 9C is a time chart of step 9 showing an allocating process according to the basic allocating method;

FIG. 10A is a time chart of step 10 showing an allocating process according to the basic allocating method;

FIG. 10B is a time chart of step 11 showing an allocating process according to the basic allocating method;

FIG. 10C is a time chart of step 12 showing an allocating process according to the basic allocating method;

FIG. 11A is a time chart of step 13 showing an allocating process according to the basic allocating method;

FIG. 11B is a time chart of step 14 showing an allocating process according to the basic allocating method;

FIG. 11C is a time chart of step 15 showing an allocating process according to the basic allocating method;

FIG. 12A is a time chart of step 16 showing an allocating process according to the basic allocating method;

FIG. 12B is a time chart of step 17 showing an allocating process according to the basic allocating method;

FIG. 12C is a time chart of step 18 showing an allocating process according to the basic allocating method;

FIG. 13A is a time chart of step 19 showing an allocating process according to the basic allocating method;

FIG. 13B is a time chart of step 20 showing an allocating process according to the basic allocating method;

FIG. 13C is a time chart of step 21 showing an allocating process according to the basic allocating method;

FIG. 14A is a time chart of step 22 showing an allocating process according to the basic allocating method;

FIG. 14B is a time chart of step 23 showing an allocating process according to the basic allocating method;

FIG. 14C is a time chart of step 24 showing an allocating process according to the basic allocating method;

FIG. 15A is a time chart of step 25 showing an allocating process according to the basic allocating method;

FIG. 15B is a time chart of step 26 showing an allocating process according to the basic allocating method;

FIG. 15C is a time chart of step 27 showing an allocating process according to the basic allocating method;

FIG. 16A is a time chart of step 28 showing an allocating process according to the basic allocating method;

FIG. 16B is a time chart of step 29 showing an allocating process according to the basic allocating method;

FIG. 16C is a time chart of step 30 showing an allocating process according to the basic allocating method;

FIG. 17A is a time chart of step 31 showing an allocating process according to the basic allocating method;

FIG. 17B is a time chart of step 32 showing an allocating process according to the basic allocating method;

FIG. 17C is a time chart of step 33 showing an allocating process according to the basic allocating method;

FIG. 18A is a time chart of step 34 showing an allocating process according to the basic allocating method;

FIG. 18B is a time chart of step 35 showing an allocating process according to the basic allocating method;

FIG. 18C is a time chart of step 36 showing an allocating process according to the basic allocating method;

FIG. 19A is a time chart of step 37 showing an allocating process according to the basic allocating method;

FIG. 19B is a time chart of step 38 showing an allocating process according to the basic allocating method;

FIG. 19C is a time chart of step 39 showing an allocating process according to the basic allocating method;

FIG. 20A is a time chart of step 40 showing an allocating process according to the basic allocating method;

FIG. 20B is a time chart of step 41 showing an allocating process according to the basic allocating method;

FIG. 20C is a time chart of step 42 showing an allocating process according to the basic allocating method;

FIG. 21A is a time chart of step 43 showing an allocating process according to the basic allocating method;

FIG. 21B is a time chart of step 44 showing an allocating process according to the basic allocating method;

FIG. 24A is a time chart of step 1 showing an allocating process according to the first allocating method;

FIG. 24B is a time chart of step 2 showing an allocating process according to the first allocating method;

FIG. 24C is a time chart of step 3 showing an allocating process according to the first allocating method;

FIG. 25A is a time chart of step 4 showing an allocating process according to the first allocating method;

FIG. 25B is a time chart of step 5 showing an allocating process according to the first allocating method;

FIG. 25C is a time chart of step 6 showing an allocating process according to the first allocating method;

FIG. 26A is a time chart of step 7 showing an allocating process according to the first allocating method;

FIG. 26B is a time chart of step 8 showing an allocating process according to the first allocating method;

FIG. 26C is a time chart of step 9 showing an allocating process according to the first allocating method;

FIG. 27A is a time chart of step 10 showing an allocating process according to the first allocating method;

FIG. 27B is a time chart of step 11 showing an allocating process according to the first allocating method;

FIG. 27C is a time chart of step 12 showing an allocating process according to the first allocating method;

FIG. 28A is a time chart of step 13 showing an allocating process according to the first allocating method;

FIG. 28B is a time chart of step 14 showing an allocating process according to the first allocating method;

FIG. 28C is a time chart of step 15 showing an allocating process according to the first allocating method;

FIG. 29A is a time chart of step 16 showing an allocating process according to the first allocating method;

FIG. 29B is a time chart of step 17 showing an allocating process according to the first allocating method;

FIG. 29C is a time chart of step 18 showing an allocating process according to the first allocating method;

FIG. 30A is a time chart of step 19 showing an allocating process according to the first allocating method;

FIG. 30B is a time chart of step 20 showing an allocating process according to the first allocating method;

FIG. 30C is a time chart of step 21 showing an allocating process according to the first allocating method;

FIG. 31A is a time chart of step 22 showing an allocating process according to the first allocating method;

FIG. 31B is a time chart of step 23 showing an allocating process according to the first allocating method;

FIG. 31C is a time chart of step 24 showing an allocating process according to the first allocating method;

FIG. 32A is a time chart of step 25 showing an allocating process according to the first allocating method;

FIG. 32B is a time chart of step 26 showing an allocating process according to the first allocating method;

FIG. 32C is a time chart of step 27 showing an allocating process according to the first allocating method;

FIG. 33A is a time chart of step 28 showing an allocating process according to the first allocating method;

FIG. 33B is a time chart of step 29 showing an allocating process according to the first allocating method;

FIG. 33C is a time chart of step 30 showing an allocating process according to the first allocating method;

FIG. 34A is a time chart of step 31 showing an allocating process according to the first allocating method;

FIG. 34B is a time chart of step 32 showing an allocating process according to the first allocating method;

FIG. 34C is a time chart of step 33 showing an allocating process according to the first allocating method;

FIG. 35A is a time chart of step 34 showing an allocating process according to the first allocating method;

FIG. 35B is a time chart of step 35 showing an allocating process according to the first allocating method;

FIG. 35C is a time chart of step 36 showing an allocating process according to the first allocating method;

FIG. 38A is a time chart of step 1 showing an allocating process according to the second allocating method;

FIG. 38B is a time chart of step 2 showing an allocating process according to the second allocating method;

FIG. 38C is a time chart of step 3 showing an allocating process according to the second allocating method;

FIG. 39A is a time chart of step 4 showing an allocating process according to the second allocating method;

FIG. 39B is a time chart of step 5 showing an allocating process according to the second allocating method;

FIG. 39C is a time chart of step 6 showing an allocating process according to the second allocating method;

FIG. 40A is a time chart of step 7 showing an allocating process according to the second allocating method;

FIG. 40B is a time chart of step 8 showing an allocating process according to the second allocating method;

FIG. 40C is a time chart of step showing an allocating process according to the second allocating method;

FIG. 41A is a time chart of step 10 showing an allocating process according to the second allocating method;

FIG. 41B is a time chart of step 11 showing an allocating process according to the second allocating method;

FIG. 41C is a time chart of step 12 showing an allocating process according to the second allocating method;

FIG. 42A is a time chart of step 13 showing an allocating process according to the second allocating method;

FIG. 42B is a time chart of step 14 showing an allocating process according to the second allocating method;

FIG. 42C is a time chart of step 15 showing an allocating process according to the second allocating method;

FIG. 43A shows a specific example of time chart for lot 1 in a single batch;

FIG. 43B shows a specific example of time chart for lot 2 in the single batch;

FIG. 43C shows a specific example of time chart for lot 3 in the single batch;

FIGS. 46A and 46B are time charts showing an allocating process for treating the three lots according to the basic allocating method, and showing a pre-start state;

FIG. 46C is a time chart of step 1 showing an allocating process for treating the three lots according to the basic allocating method;

FIG. 47A is a time chart of step 2 showing an allocating process for treating the three lots according to the basic allocating method;

FIG. 47B is a time chart of step 3 showing an allocating process for treating the three lots according to the basic allocating method;

FIG. 47C is a time chart of step 4 showing an allocating process for treating the three lots according to the basic allocating method;

FIG. 48A is a time chart of step 5 showing an allocating process for treating the three lots according to the basic allocating method;

FIG. 48B is a time chart of step 6 showing an allocating process for treating the three lots according to the basic allocating method;

FIG. 48C is a time chart of step 7 showing an allocating process for treating the three lots according to the basic allocating method;

FIG. 49A is a time chart of step 8 showing an allocating process for treating the three lots according to the basic allocating method;

FIG. 49B is a time chart of step 9 showing an allocating process for treating the three lots according to the basic allocating method;

FIG. 49C is a time chart of step 10 showing an allocating process for treating the three lots according to the basic allocating method;

FIG. 50A is a time chart of step 11 showing an allocating process for treating the three lots according to the basic allocating method;

FIG. 50B is a time chart of step 12 showing an allocating process for treating the three lots according to the basic allocating method;

FIG. 50C is a time chart of step 13 showing an allocating process for treating the three lots according to the basic allocating method;

FIG. 51 is a time chart of step 14 showing an allocating process for treating the three lots according to the basic allocating method;

FIG. 52 is a flow chart showing a sequence of a third allocating method;

FIG. 53 is a schematic view showing an example of combinations of schedules in the third allocating method;

FIG. 54 is a schematic view showing an example of combinations of schedules in the third allocating method;

FIGS. 55A and 55B are time charts showing an allocating process according to the third allocating method, and showing a pre-start state;

Figure 60:
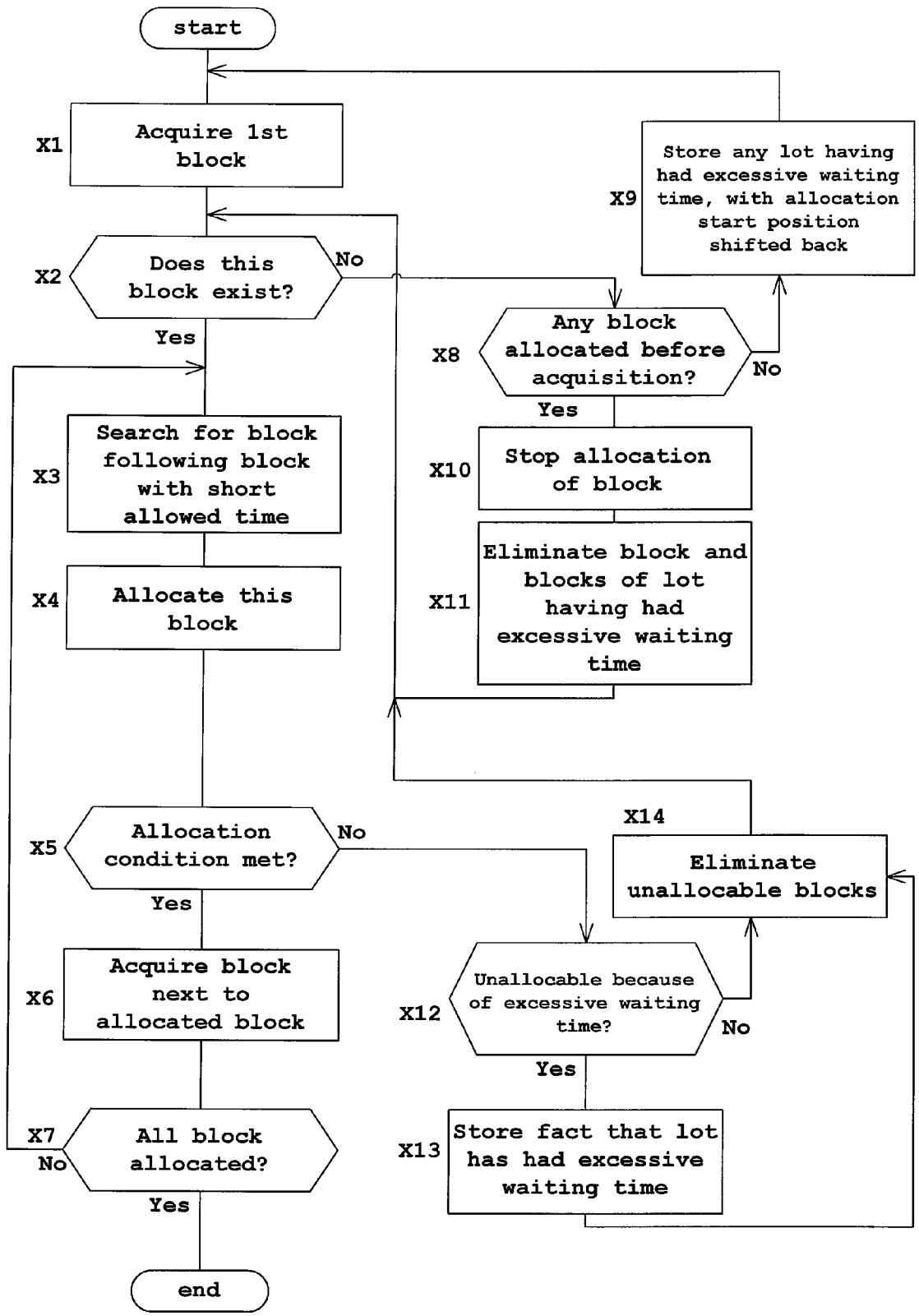
Figure 61:
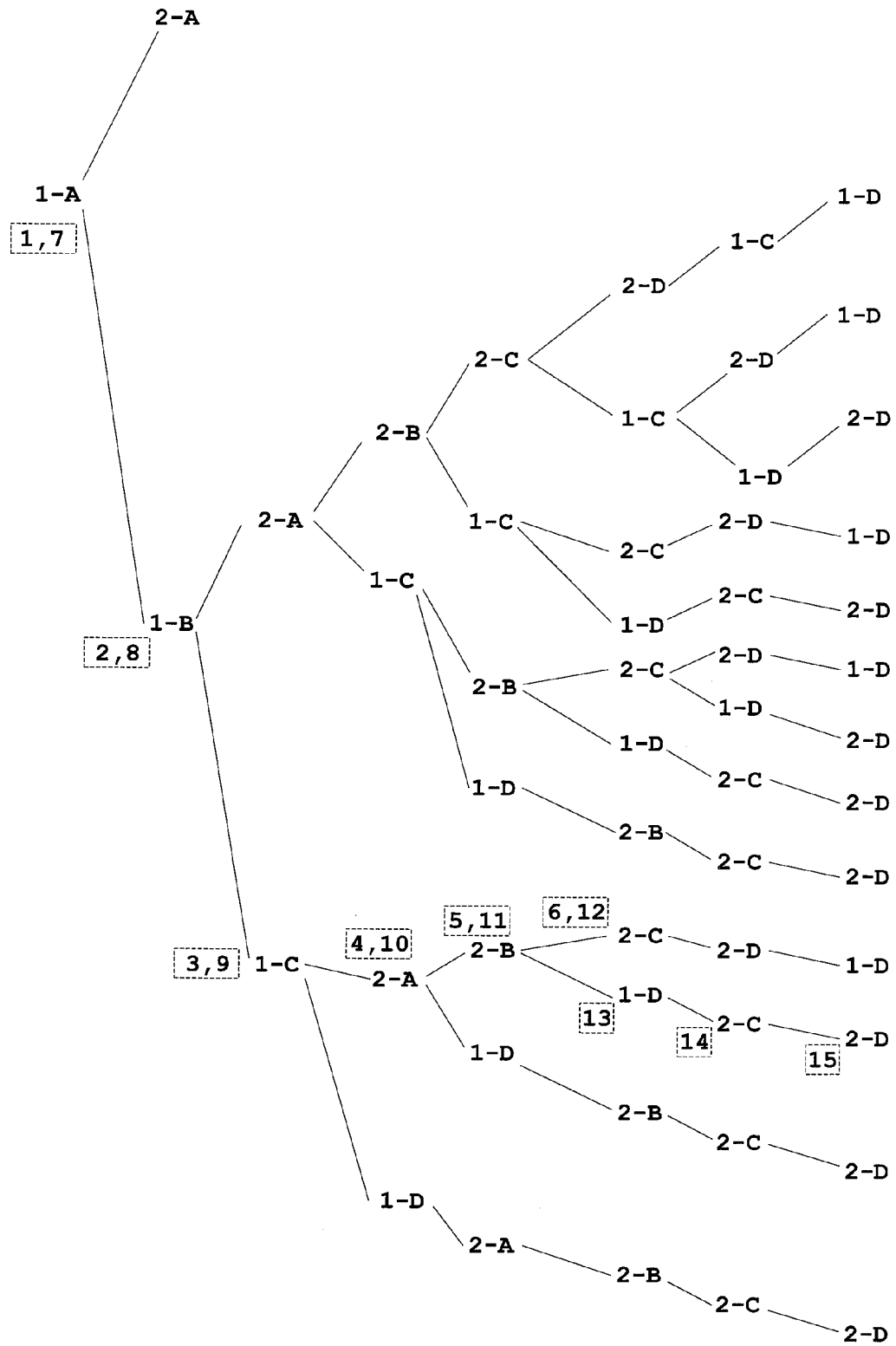
Figure 65A:
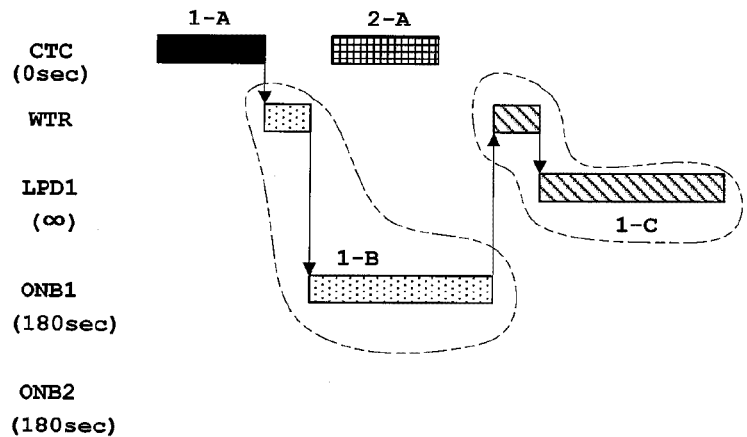
Figure 65B:
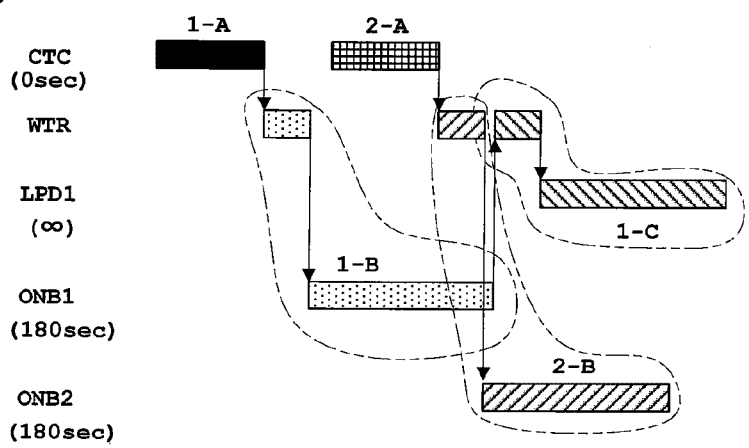
Figure 65C:
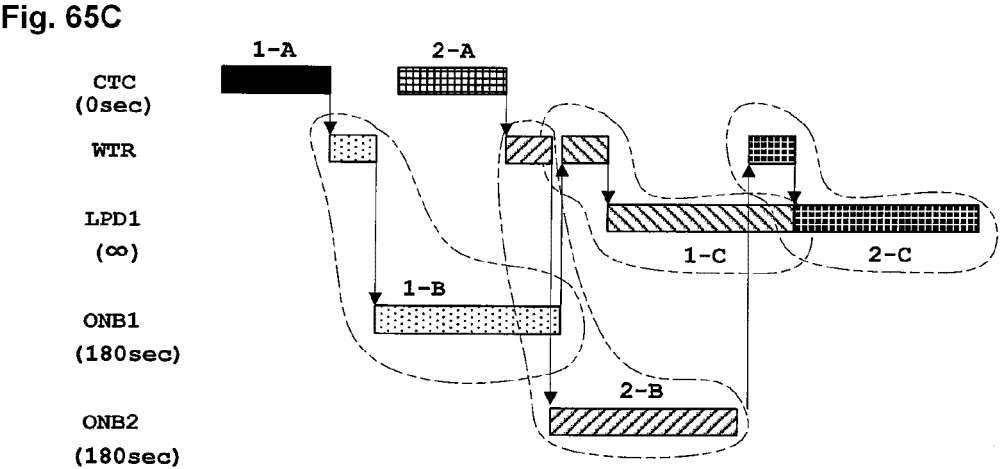

FIG. 55C is a time chart of step 1 showing an allocating process according to the third allocating method;

FIG. 56A is a time chart of step 2 showing an allocating process according to the third allocating method;

FIG. 56B is a time chart of step 3 showing an allocating process according to the third allocating method;

FIG. 56C is a time chart of step 4 showing an allocating process according to the third allocating method;

FIG. 57A is a time chart of step 5 showing an allocating process according to the third allocating method;

FIG. 57B is a time chart of step 6 showing an allocating process according to the third allocating method;

FIG. 57C is a time chart of step 7 showing an allocating process according to the third allocating method;

FIG. 58A is a time chart of step 8 showing an allocating process according to the third allocating method;

FIG. 58B is a time chart of step 9 showing an allocating process according to the third allocating method;

FIG. 58C is a time chart of step 10 showing an allocating process according to the third allocating method;

FIG. 59A is a time chart of step 11 showing an allocating process according to the third allocating method;

FIG. 59B is a time chart of step 12 showing an allocating process according to the third allocating method;

FIG. 60 is a flow chart showing a sequence of a fourth allocating method;

FIG. 61 is a schematic view showing an example of combinations of schedules in the fourth allocating method;

FIG. 62A is a time chart of step 1 showing an allocating process according to the fourth allocating method;

FIG. 62B is a time chart of step 2 showing an allocating process according to the fourth allocating method;

FIG. 62C is a time chart of step 3 showing an allocating process according to the fourth allocating method;

FIG. 63A is a time chart of step 4 showing an allocating process according to the fourth allocating method;

FIG. 63B is a time chart of step 5 showing an allocating process according to the fourth allocating method;

FIG. 63C is a time chart of step 6 showing an allocating process according to the fourth allocating method;

FIG. 64A is a time chart of step 7 showing an allocating process according to the fourth allocating method;

FIG. 64B is a time chart of step 8 showing an allocating process according to the fourth allocating method;

FIG. 64C is a time chart of step 9 showing an allocating process according to the fourth allocating method;

FIG. 65A is a time chart of step 10 showing an allocating process according to the fourth allocating method;

FIG. 65B is a time chart of step 11 showing an allocating process according to the fourth allocating method;

FIG. 65C is a time chart of step 12 showing an allocating process according to the fourth allocating method;

FIG. 66A is a time chart of step 13 showing an allocating process according to the fourth allocating method;

FIG. 66B is a time chart of step 14 showing an allocating process according to the fourth allocating method; and FIG. 66C is a time chart of step 15 showing an allocating process according to the fourth allocating method.

DESCRIPTION OF THE PREFERRED EMBODIMENTS

Preferred embodiments of this invention will be described in detail hereinafter with reference to the drawings.

Figure 1:
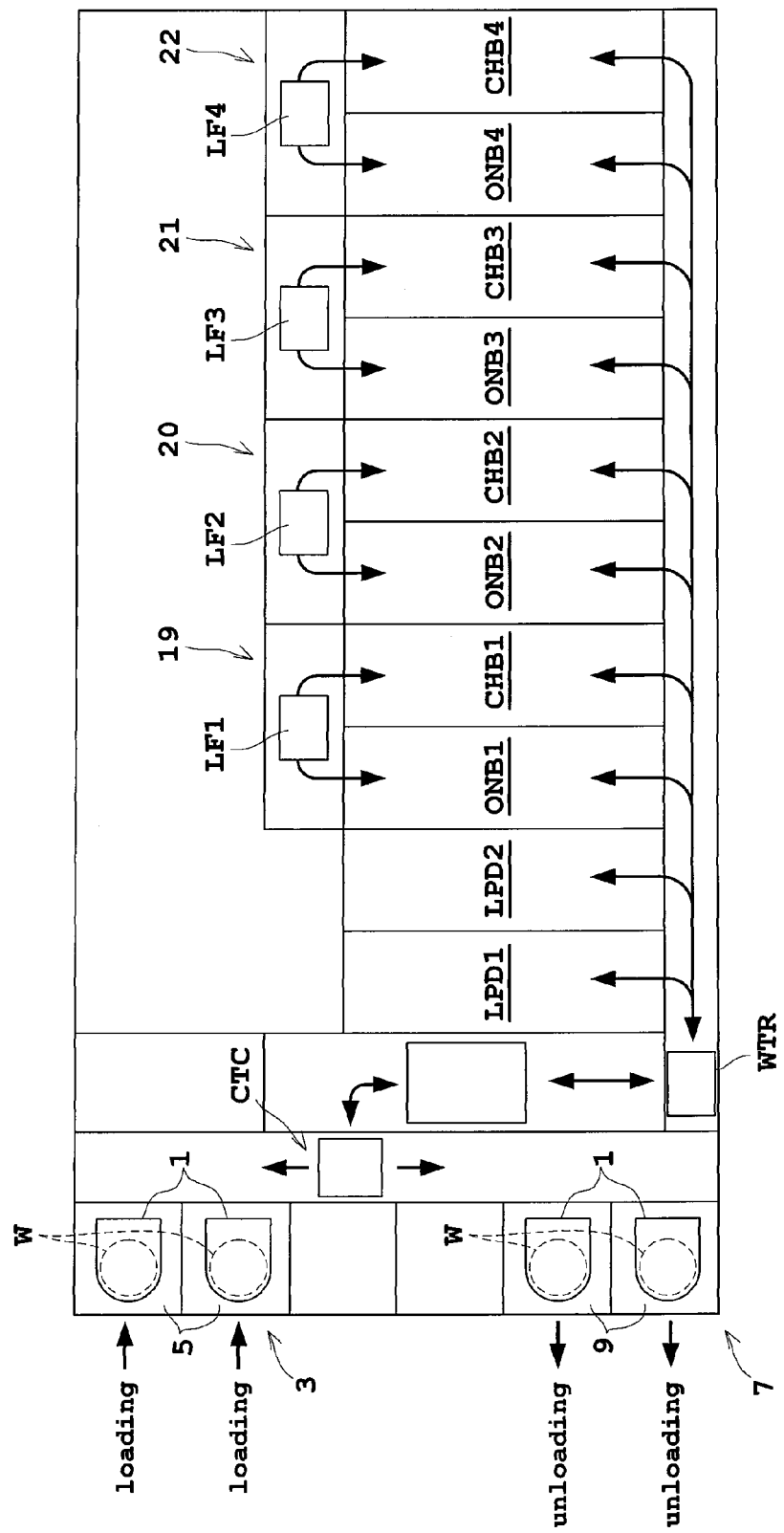
FIG. 1 is a plan view showing an outline of a substrate treating apparatus according to this invention.

FIG. 1 is a plan view showing an outline of a substrate treating apparatus according to this invention.

This substrate treating apparatus performs chemical treatment, cleaning treatment and drying treatment of wafers W, for example. A plurality of (e.g. 25) wafers W are stored in horizontal posture in each FOUP (Front Opening Unified Pod) 1. FOUPs 1 containing wafers W to be treated are placed in a loading section 3. The loading section 3 includes two support tables 5 for receiving the FOUPs 1. An unloading section 7 is disposed opposite the loading section 3 across a middle portion of the substrate treating apparatus. The unloading section 7 is used for delivering treated wafers W as stored in FOUPs 1. As does the loading section 3, the unloading section 7 having the above function includes two support tables 9 for receiving the cassettes 1.

In an area extending along the loading section 3 and unloading section 7 is a first transport mechanism CTC movable between these sections. The first transport mechanism CTC fetches a plurality of wafers W from each FOUP 1 placed on one of the support tables 5 in the loading section 3, and transfers the wafers W to a second transport mechanism WTR after turning the wafers W from horizontal posture to vertical posture. Further, the first transport mechanism CTC receives treated wafers W from the second transport mechanism WTR, turns the wafers W from vertical posture to horizontal posture, and deposits the wafers W in an FOUP 1 in the unloading section 7. The second transport mechanism WTR is constructed movable longitudinally of the substrate treating apparatus.

Two drying units LPD1 and LPD2 are arranged in the most upstream position with respect to the direction of movement of the second transport mechanism WTR, each for drying a plurality of wafers W placed in a low-pressure chamber.

A first treating section 19 is disposed next to the drying unit LPD2 in the direction of movement of the second transport mechanism WTR. The first treating section 19 includes a deionized water cleaning unit ONB1 for cleaning a plurality of wafers W with deionized water, and a chemical treating unit CHB1 for performing chemical treatment of the wafers W with a treating solution. An auxiliary transport mechanism LF1 is provided for transporting the wafers W between these units. The auxiliary transport mechanism LF1, besides transporting the wafers W within the first treating section 19, transfers the wafers W to and from the second transport mechanism WTR.

A second treating section 20 is disposed adjacent the first treating section 19. The second treating section 20 has the same construction as the first treating section 19. That is, the second treating section 20 includes a deionized water cleaning unit ONB2, a chemical treating unit CHB2 and an auxiliary transport mechanism LF2.

A third treating section 21 is disposed adjacent the second treating section 20. The third treating section 21 includes a deionized water cleaning unit ONB3, a chemical treating unit CHB3 and an auxiliary transport mechanism LF3.

Further, a fourth treating section 22 is disposed adjacent the third treating section 21. The fourth treating section 22 includes a deionized water cleaning unit ONB4, a chemical treating unit CHB4 and an auxiliary transport mechanism LF4.

The first transport mechanism CTC, second transport mechanism WTR, drying units LPD1 and LPD2, first treating section 19 (deionized water cleaning unit ONB1, chemical treating unit CHB1 and auxiliary transport mechanism LF1), second treating section 20 (deionized water cleaning unit ONB2, chemical treating unit CHB2 and auxiliary transport mechanism LF2), third treating section 21 (deionized water cleaning unit ONB3, chemical treating unit CHB3 and auxiliary transport mechanism LF3), and fourth treating section 22 (deionized water cleaning unit ONB4, chemical treating unit CHB4 and auxiliary transport mechanism LF4), constitute the "treating section" in this invention.

Figure 2:
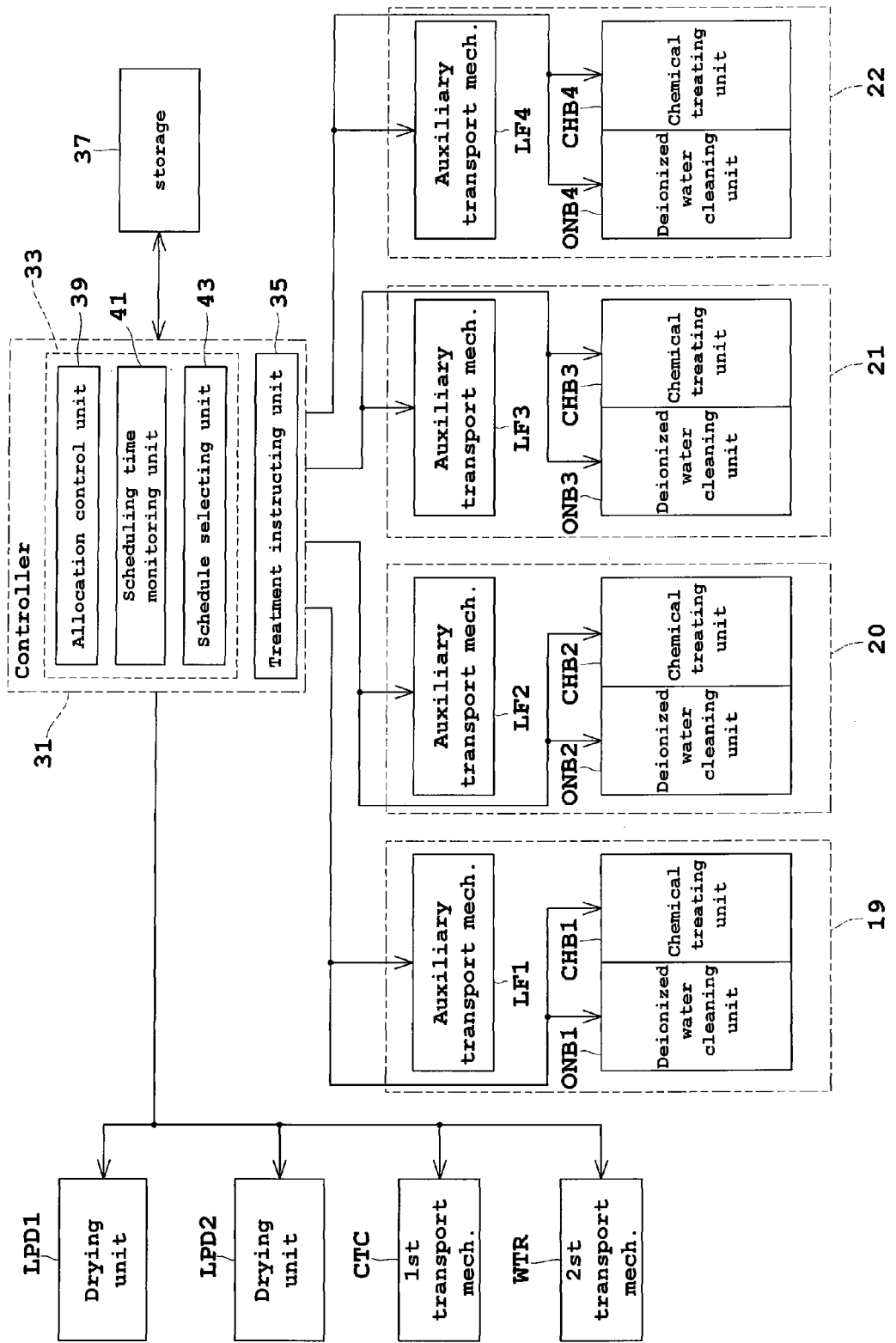
FIG. 2 is a block diagram showing an outline of the substrate treating apparatus.

The substrate treating apparatus having the above construction is controlled overall by a controller 31 as shown in the block diagram of FIG. 2.

The controller 31 is formed of a CPU, a counter/timer and the like, and includes a scheduling operation unit 33 and a treatment instructing unit 35. A storage unit 37 connected to the controller 31 stores a "recipe" (treating procedure) prepared beforehand by the user of this substrate treating apparatus, in the form of a block including one treating step or a plurality of treating steps specifying how substrates should be treated, various "schedule preparation programs", and a "main program for schedule preparation" which controls the various schedule preparation programs, and a processing program for executing schedules prepared. The storage unit 37 stores also a plurality of schedules prepared by the main program for schedule preparation, and one "schedule" selected from the schedules.

Further, the storage unit 37 stores a "specified time" which is equivalent to a time limit for scheduling, an "allowed time" which is a permissible waiting time between a certain block to be allocated and a next block, "allocation start positions" relating to position information for allocating blocks, and data (systematic chart) showing combinations of a plurality of blocks of lots for each schedule.

The scheduling operation unit 33 handles the plurality of wafers W stored in each FOUP 1 placed in the loading section 3 as one lot, and prepares a plurality of schedules, using various scheduling methods to be described hereinafter, to allocate treating steps (block) for each lot efficiently in time series, before actually starting treatment, according to a recipe designated by the operator of the apparatus and stored in the storage unit 37.

The treatment instructing unit 35 instructs operations relating to treatments in the respective treating sections at appropriate times, based on one schedule selected as described hereinafter from the various schedules prepared by the scheduling operation unit 33 and stored in the storage unit 37.

An allocation controller 39 of the scheduling operation unit 33 selects blocks by various scheduling methods, and allocates the blocks through a trial and error process.

A scheduling time monitoring unit 41 of the scheduling operation unit 33 has functions to check, with a timer (not shown), elapsed times from start of execution of various scheduling methods, and measures times left until expiry of the specified time.

A schedule selecting unit 43 of the scheduling operation unit 33 selects a schedule that ends earliest from among schedules completed within the specified time, and reports that schedule to the treatment instructing unit 35.

Figure 3:
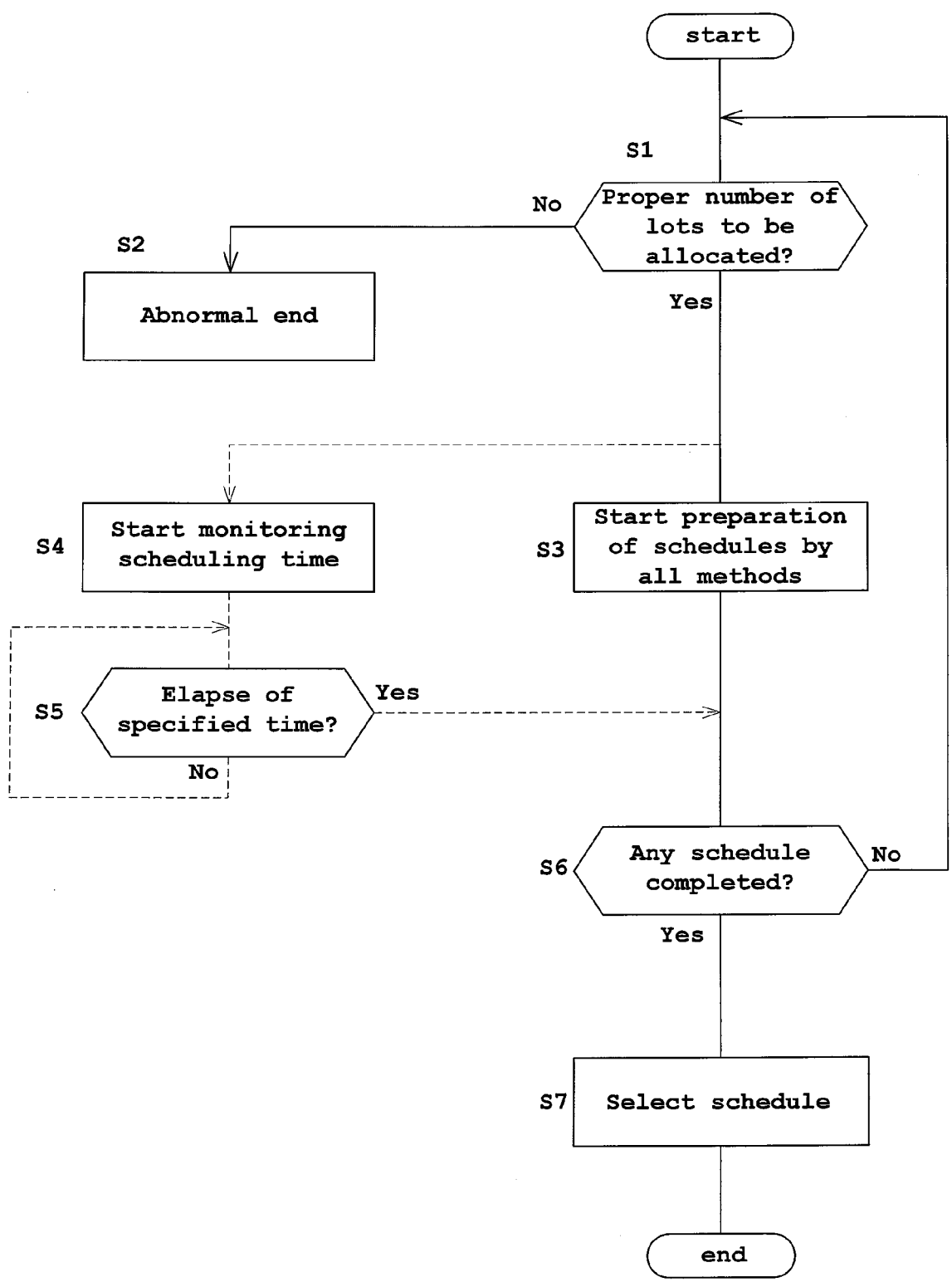
FIG. 3 is a flow chart showing a main program for scheduling.

The scheduling operation unit 33 performs a plurality of scheduling methods including a basic allocating method, a first allocating method, a second allocating method, a third allocating method and a fourth allocating method. These scheduling methods will be described hereinafter. The scheduling methods are controlled based on the main program. FIG. 3 is a flow chart showing the main program for scheduling.

Steps S1 and S2

Whether the number of lots to be allocated is proper is checked, and the process is branched according to the result. When the number is proper, the process is branched to step S3. When the number is improper, the process moves to step S2 for abnormal end.

Steps S3-S5

Preparation of schedules is started by various scheduling methods to be described hereinafter (step S3). In parallel with this, the scheduling time monitoring unit 41 starts monitoring the specified time (step S4), and continues measuring time until expiry of the specified time (step S5).

Steps S6 and S7

The process is branched depending on whether at least one of the schedules prepared by the various scheduling methods is completed. When no schedule has been completed, the number of lots is regarded as improper, and the process is carried out all over again from step S1. On the other hand, when at least one schedule has been completed, the schedule is selected. When only one schedule has been completed, this schedule is selected. When a plurality of schedules have been completed, one having the earliest expected completion time is selected from among these schedules. Alternatively, a schedule may be selected upon completion even when this occurs before expiry of the specified time.

<Basic Allocating Method>

Figure 4:
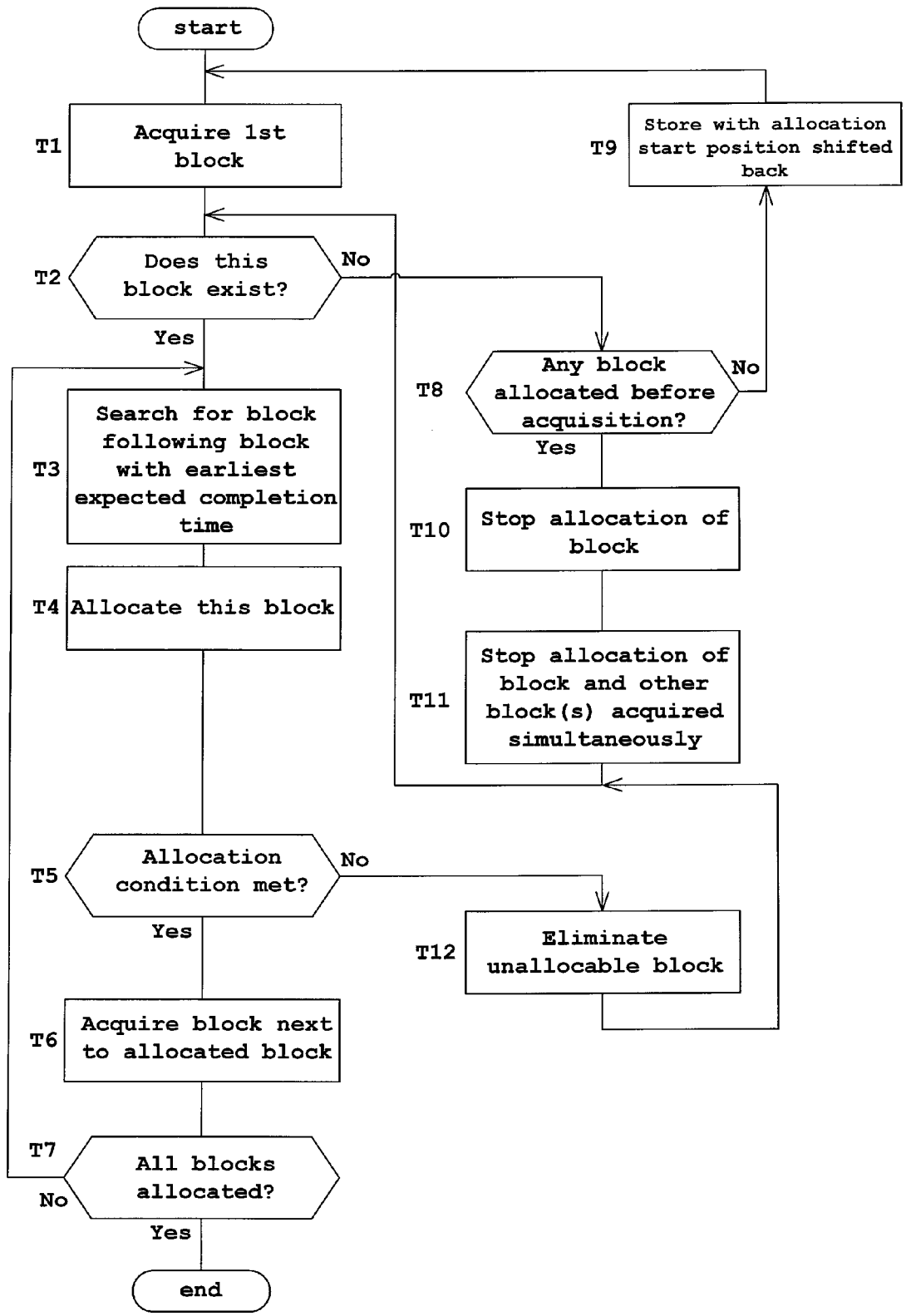
FIG. 4 is a flow chart showing a sequence of a basic allocating method.

FIG. 4 is a flow chart showing a sequence of the basic allocating method. FIG. 5A shows a specific example of time chart for lot 1 in a single batch. FIG. 5B shows a specific example of time chart for lot 2 in the single batch.

In order to facilitate understanding of the invention, as shown in FIG. 5, the following description will take, for example, treatment of the lots with a recipe made simpler than an actual recipe. Specifically, the recipe described hereinafter includes a treating step relating to transportation by the first transport mechanism CTC (block A), a treating step relating to transportation by the second transport mechanism WTR and deionized water cleaning treatment by the deionized water cleaning unit ONB1 of the first treating section 19 (block B), a treating step relating to transportation by the second transport mechanism WTR and drying treatment by the drying unit LPD1 (block C), and a treating step relating to transportation by the second transport mechanism WTR and transportation by the first transport mechanism CTC (block D). In the following description, a single treating step or a plurality of treating steps needing to be allocated continually is called a block. To facilitate distinguishment among a plurality of lots, the blocks will be indicated with reference "lot-block sign". That is, reference "1-A" denotes block A of lot 1.

Figure 6:
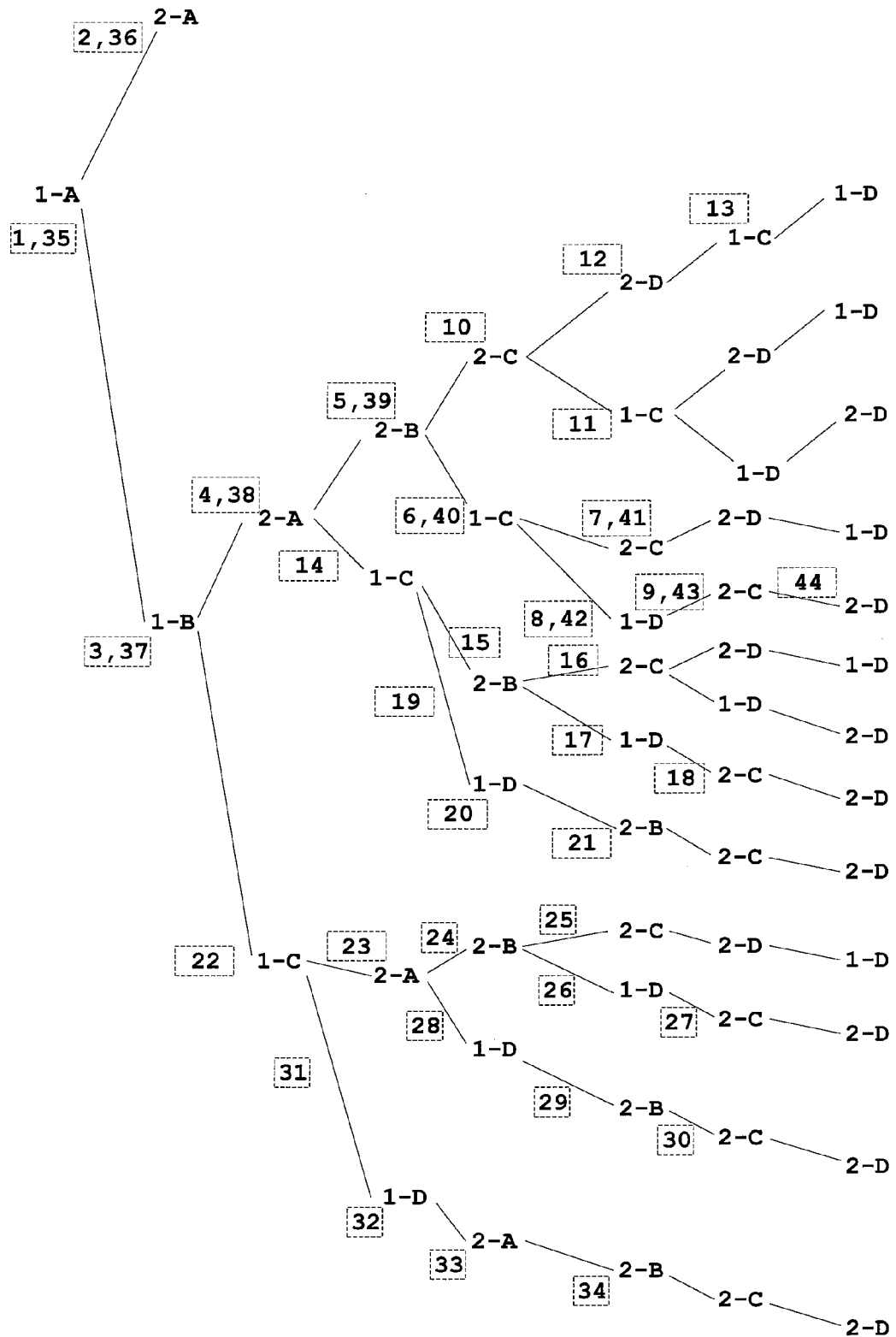
FIG. 6 is a schematic view showing an example of combinations of schedules in the basic allocating method.

In the above recipe, when priority is given to lot 1 and block 1-A is allocated first, a combination of blocks exists as shown in FIG. 6. FIG. 6 is a schematic view (systematic chart) showing an example of combination of schedules in the basic allocating method. The numbers enclosed in dotted lines in FIG. 6 correspond to the step numbers in the following description.

Steps T1 and T2

A first block is acquired, and the process is branched depending on whether the acquired block exists.

Steps T3 and T4

A search is made for a block whose preceding block has the earliest expected completion time. In this case, no preceding block exists for the first block to be allocated. Thus, the time at which a lot start is instructed (i.e. planned starting time) is regarded as the expected completion time for a preceding block. A block with an early expected completion time is allocated.

Steps T5-T7

The process is branched depending on whether the block allocated meets "allocation conditions" that there is no conflict between lots in any treating section or unit, and that the allocation does not cause a waiting time exceeding the allowed time in relation with the preceding block. When the allocation conditions are met, a block next to the allocated block is acquired. The process in step T3 et seq. are repeated until all blocks are allocated.

Steps T8 and T9

When, in step T2 noted above, the block is found not to exist, the process moves to step T8. The process is further branched depending on whether there is any block allocated before the acquisition. When there is no such block, the process moves to step T9, the allocating position is stored in memory in a way to shift its allocation start position backward.

Steps T10 and T11

When, in step T8 noted above, there is a block allocated before the acquisition, the process moves to step T10 to stop allocation of the block. Allocation of this block and blocks acquired simultaneously is stopped, and the process returns to step T2.

Step T12

When, in step T5 noted above, the allocation conditions are not met, the block that cannot be allocated is eliminated in step T12. Then, the process returns to step T2.

A specific example of schedule preparation will be described with reference to FIGS. 7 through 21. FIGS. 7 through 21 are time charts showing an allocating process by the basic allocating method.

Steps 1-3

Assume that a treatment start instruction is given earlier for lot 1 than for lot 2, at points of time (indicated by downward arrows) shown in FIG. 7A. Block A of lot 1 (sign 1-A) with an early expected completion time (expected starting time) is allocated first (step 1). Next, a comparison is made between the expected completion time of block A of lot 1 (sign 1-A) and the expected completion time (expected starting time) of lot 2. Since the expected completion time of lot 2 is earlier, block A of lot 2 (sign 2-A) is allocated after block A of lot 1 (sign 1-A) (FIG. 7B, Step 2). However, since block A of lot 1 (sign 1-A) and block B of lot 2 (sign 2-B) would conflict with each other in the same treatment by the first transport mechanism CTC, block A of lot 2 (sign 2-A) cannot be allocated. Thus, block B of lot 1 (sign 1-B) is allocated next, after block A of lot 1 (sign 1-A) (FIG. 7C, Step 3).

Steps 4-6

The expected completion time of block B of lot 1 (sign 1-B) is compared with the expected completion time (expected starting time) of lot 2. Since the expected completion time of lot 2 is the earlier, block A of lot 2 (sign 2-A) is allocated (FIG. 8A, Step 4). Next, the expected completion time of block B of lot 1 is compared with the expected completion time of block B of lot 2 (sign 2-B). Since the expected completion time of block 2-A is the earlier, block B of lot 2 (sign 2-B) is allocated (FIG. 8B, Step 5). Next, the expected completion time of block B of lot 1 (sign 1-B) is compared with the expected completion time of block B of lot 2 (sign 2-B). Since the expected completion time of block 1-B is earlier than that of block 2-B, block C of lot 1 (sign 1-C) is allocated (FIG. 8C, Step 6).

Steps 7-9

The expected completion times of block 1-C and block 2-B are compared. Since block 2-B is the earlier, block C of lot 2 (sign 2-C) is allocated (FIG. 9A, Step 7). Here, for reasons of the drying unit LPD1, block 2-C must be allocated with a short time interval after the preceding block 2-B. Block 2-C can be allocated unless this waiting time wt exceeds the allowed time. In this case, the waiting time wt exceeds the allowed time, thus failing to meet the allocation condition. Therefore, allocation of block 2-C is given up, and block 1-D is allocated (FIG. 9B, Step 8). Next, since block 1-D which is the final block of lot 1 has been allocated, the option is only block 2-C. Then, this block 2-C is allocated (FIG. 9C, Step 9).

Assume here that waiting time wt occurs with block 2-C, which exceeds the allowed time.

Steps 10-12

Since the allocation condition was not met, the allocations of preceding block 1-D and block 1-C are canceled. Since the option of allocating block 2-C after block 1-C is lost, block 2-C is allocated before (FIG. 10A, Step 10). Since the block 1-B has an earlier expected completion time than block 2-C, block 1-C is allocated (FIG. 10B, Step 11). Then, a conflict would occur between block C of lot 2 (sign 2-C) not unloaded from the drying unit LPD1 and block C of lot 1 (sign 1-C). Thus, block 2-D is allocated after block 2-C (FIG. 10C, Step 12).

Steps 13-15

Since block 2-D has been allocated, the option is only block 1-C, and so block 1-C is allocated (FIG. 11A, Step 13). Assume, however, that waiting time wt occurs with block 1-C, which exceeds the allowed time. Therefore, the allocations of preceding block 2-D, block 2-C and block 2-B are canceled, and block 1-C is allocated instead (FIG. 11B, Step 14). Next, block 2-B is allocated after block 2-A having an earlier expected completion time than block 1-C (FIG. 1C, Step 15).

Steps 16-18

The expected completion times of block 2-B and block 1-C are compared, and block 2-C is allocated after block 2-B having the earlier one (FIG. 12A, Step 16). In this case, the allocation condition is not met since block 1-C of lot 1 and block 2-C of lot 2 conflict in the drying unit LPD1. Thus, instead of block 2-C, block 1-D is allocated (FIG. 12B, Step 17). Since all the blocks of lot 1 have been allocated, the option is only block 2-C (FIG. 12C, Step 18). Assume, however, that waiting time wt exceeds the allowed time.

Steps 19-21

Since the option for allocating block 1-D after block 2-B is lost, block 1-D is allocated before block 2-B (FIG. 13A, Step 19). Then, block 2-B is allocated after block 2-A having an earlier expected completion time than block 1-D (FIG. 13B, Step 20). And block 2-C is allocated after block 2-B having an earlier expected completion time than block 1-D (FIG. 13C, Step 21). Assume here that waiting time wt exceeds the allowed time.

Steps 22-34

The procedure described above is repeated in a similar way to carry out a process of trial and error in block allocation for the two lots (FIGS. 14 through 18A, Steps 22-34). This trial and error process is indicated by signs 1-34 enclosed in the dotted lines in FIG. 6.

Steps 35-44

However, all blocks cannot be allocated through the above trial and error process after all. An interval in loading between lot 1 and lot 2 is extended as shown in FIG. 18C, and the trial and error process is repeated again (FIGS. 18B through 21, Steps 35-44).

According to the foregoing basic allocating method, the allocation of all blocks will be completed in step 44. This trial and error process is indicated by signs 1-44 enclosed in the dotted lines in FIG. 6.

Thus, the scheduling operation unit 33 of controller 31 which executes the basic allocating method prepares schedules in advance based on the data (systematic chart of FIG. 6) representing combinations of the blocks in the lots according to the recipe. The operation unit 33 allocates the first block of one of the lots, and thereafter, while following the systematic chart from this first block, allocates as a next block a block, selected from among the succeeding blocks in the lots, whose preceding block has the earliest expected completion time of all preceding blocks.

It is therefore possible to prepare schedules beforehand by the basic allocating method to allocate the lots such that a later operation of a preceding block and an early operation of a succeeding block overlap each other. A block, with its preceding block in the same lot expected to complete early, is selected and allocated with priority as the next block, thereby shortening time until completion of the next block.

<First Allocating Method> (Reasons for Allocation Impossible)

Figure 22:
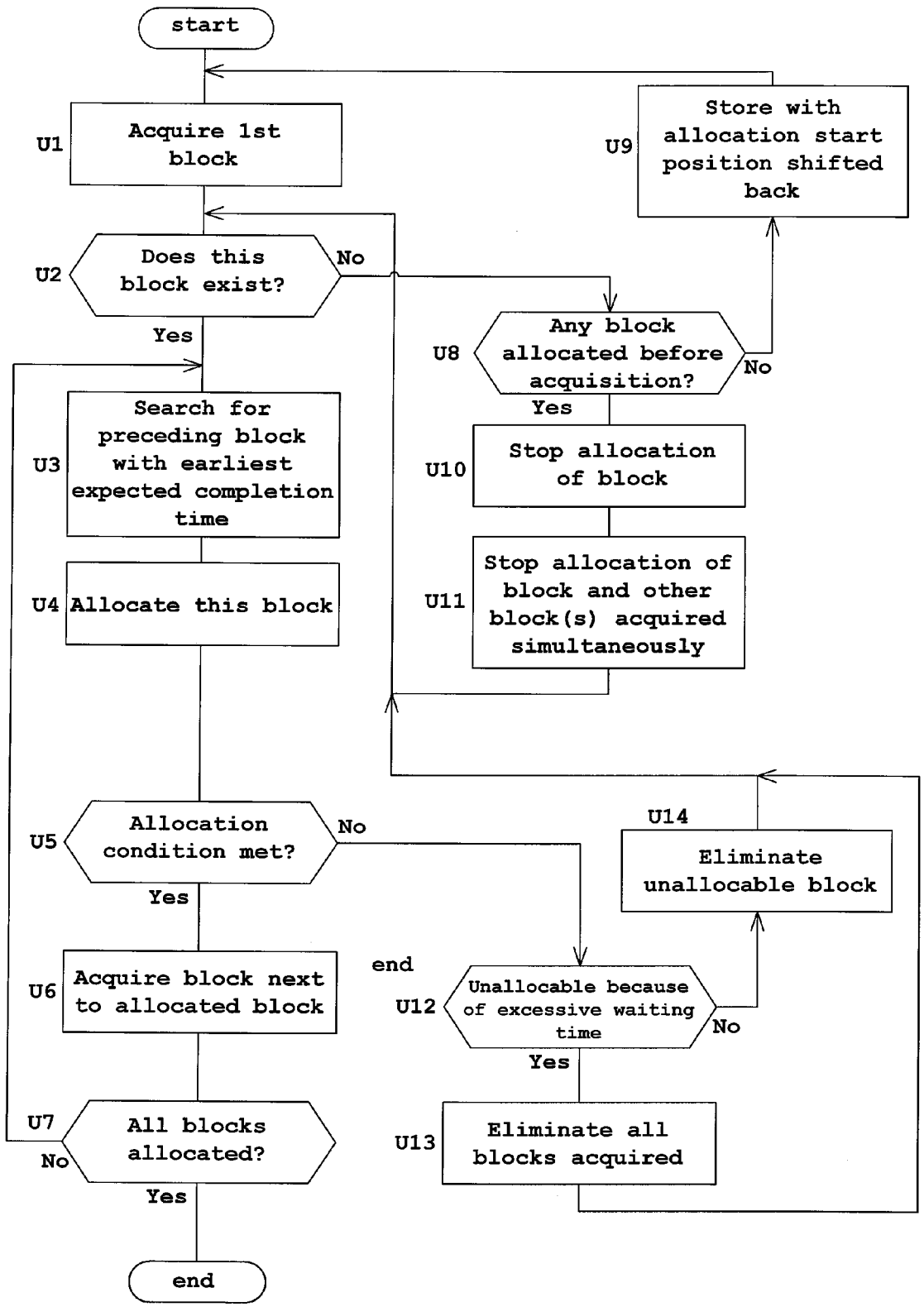
FIG. 22 is a flow chart showing a sequence of a first allocating method.
Figure 23:
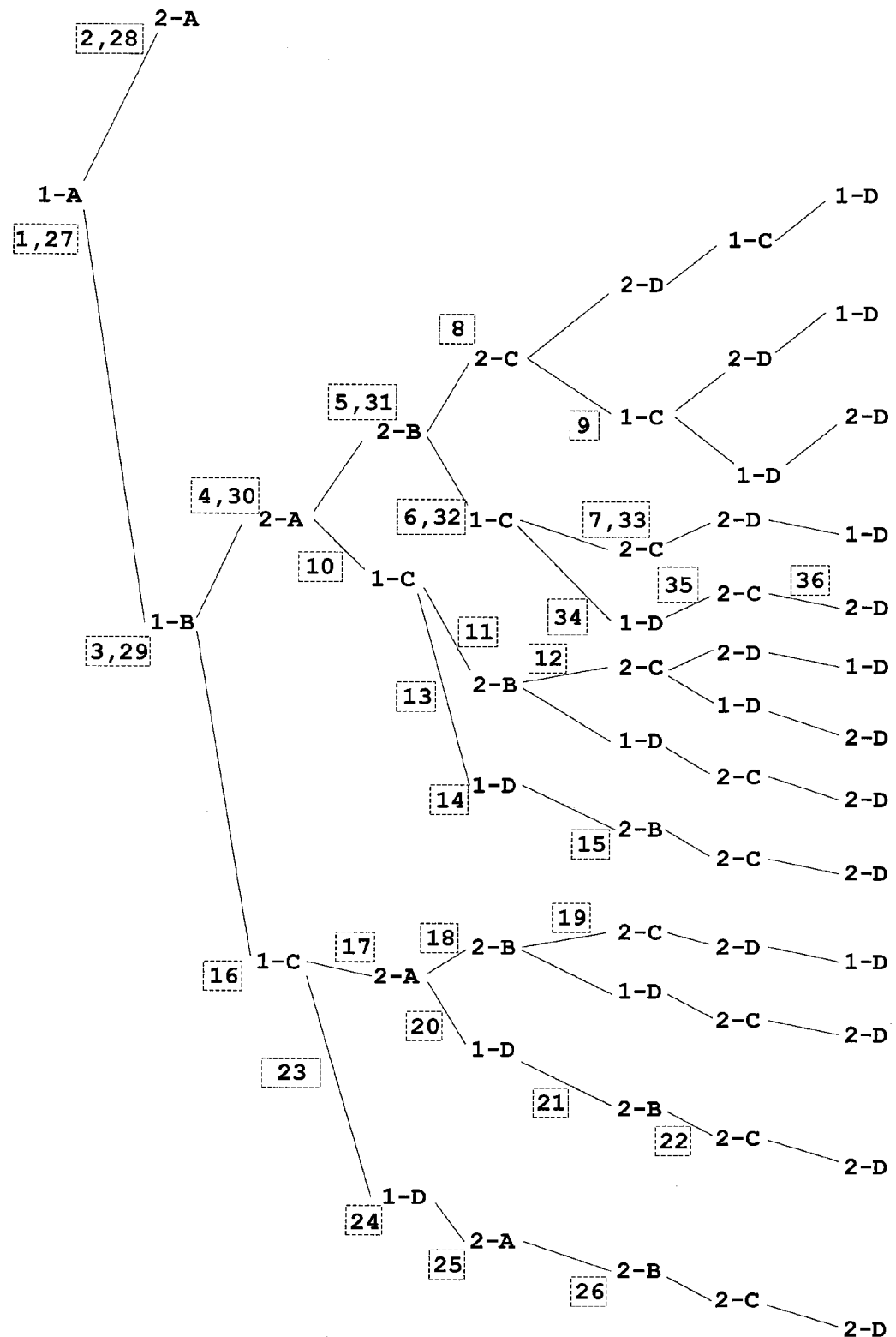
FIG. 23 is a schematic view showing an example of combinations of schedules in the first allocating method.

FIG. 22 is a flow chart showing a sequence of a first allocating method. FIG. 23 is a schematic view (systematic chart) showing an example of combinations of schedules in the first allocating method.

Steps U1-U7 are the same as steps T1-T7 in the foregoing basic allocating method, and will not be described. Steps U8-U11 also are the same as steps T8-T11 in the foregoing basic allocating method, and will not be described. The first allocating method corresponds to the special allocating method in this invention.

Step U12 and U13

When, in step U5, the allocation conditions are not met, the process is branched depending on whether the reason is that the waiting time exceeds the allowed time (step U12). When the reason is that the waiting time exceeds the allowed time, all acquired blocks are eliminated (step U13).

Step U14

When, in step U12 noted above, the reason for the block allocation being impossible is not waiting time, only the unallocable block is eliminated, and the process branches to step U2.

When lot 1 is started first in the above recipe and schedules are prepared by the first allocating method, a combination of blocks exists as shown in FIG. 23. FIG. 23 a schematic view (systematic chart) showing an example of combination of schedules in the first allocating method. The numbers enclosed in dotted lines in FIG. 23 correspond to the step numbers in the following description.

A specific example of schedule preparation will be described with reference to FIGS. 24 through 35. FIGS. 24 through 35 are time charts showing an allocating process by the first allocating method.

Steps 1-6

In these steps, the reason for allocation being impossible is only a conflict between the lots. Thus, the same allocating process as in the foregoing basic allocating method is followed (FIGS. 24 (Steps 1-3) and 25 (Steps 4-6)).

Steps 7-9

The expected completion times of block 1-C and block 2-B are compared. Since block 2-B has the earlier expected completion time, block C of lot 2 (sign 2-C) is allocated (FIG. 26A, Step 7). If the waiting time wt occurring here is within the allowed time, block 2-C can be allocated. Assume here that the waiting time wt exceeds the allowed time, thereby failing to meet the allocation condition. Therefore, after eliminating block 1-C, block 2-C is allocated after block 2-B (FIG. 26B, Step 8). Next, based on the expected completion times of block 1-B and block 2-C, block 1-C is allocated (FIG. 26C, Step 9).

Steps 10-12

Assume that, in Step 9, waiting time wt occurs with block 1-C, and this exceeds the allowed time. After eliminating block 2-C and block 2-B, block 1-C is allocated (FIG. 27A, Step 10). Next, the expected completion times of block 2-A and block 1-C are compared, and block 2-B following the earlier one is allocated (FIG. 27B, Step 11). Then, the expected completion times of block 2-B and block 1-C are compared, and block 2-C is allocated after block 2-B having the earlier time (FIG. 27C, Step 12).

Steps 13-15

Assume that, in Step 12, waiting time wt occurs with block 2-C, and this exceeds the allowed time. After eliminating block 2-C and block 2-B, since the option of allocating block 2-C after block 2-B is lost, block 1-D is allocated before (FIG. 28A, Step 13). The expected completion times of block 2-A and block 1-D are compared, and block 2-B following the earlier one is allocated (FIG. 28B, Step 14). Then, based on the expected completion times of block 2-B and block 1-D, block 2-C is allocated after block 2-B (FIG. 28C, Step 15).

Steps 16-18

Assume that, in Step 15, waiting time wt occurs with block 2-C, and this exceeds the allowed time. Block 2-C, block 2-B and block 2-A are eliminated. The option of allocating block 1-C after block 2-A is lost. Block 1-C is allocated before block 2-A (FIG. 29A, Step 16). The expected completion times of block 1-C is compared with the expected completion time (expected starting time) of lot 2. Since the expected completion time (expected starting time) of lot 2 is the earlier, block 2-A is allocated (FIG. 29B, Step 17). Next, the expected completion times of block 2-A and block 1-C are compared. Block 2-B is allocated after block 2-A which is the earlier (FIG. 29C, Step 18).

Steps 19-21

The expected completion times of block 1-C and block 2-B are compared. Block 2-C is allocated after block 2-B which is the earlier (FIG. 30A, Step 19). Assume here, however, that waiting time wt exceeds the allowed time. Thus, block 2-C and block 2-B are eliminated, and block 1-D is allocated instead (FIG. 30B, Step 20). Since all the blocks of lot 1 have been allocated, block 2-B which is the only option left is allocated (FIG. 30C, Step 21).

Steps 22-24

Since the option is only block 2-C following block 2-B, this block 2-C is allocated (FIG. 31A, Step 22). Assume that waiting time wt occurs with block 2-C and this exceeds the allowed time. Therefore, block 2-C, block 2-B and block 2-A are eliminated (FIG. 31B, Step 23). Since the option is only block 2-A, block 2-A is allocated (FIG. 31C, Step 24).

Steps 25-27

Since the option is only block 2-B following block 2-A, block 2-B is allocated (FIG. 32A, Step 25). Since the next option is only block 2-C following block 2-B, block 2-C is allocated (FIG. 32B, Step 26). Assume that waiting time wt occurs with block 2-C and this exceeds the allowed time. This renders allocations through all the paths in the combination of FIG. 23 impossible. The interval in loading between lot 1 and lot 2 is extended, and scheduling is carried out again. First, block 1-A having the earlier expected starting time is allocated (FIG. 32C, Step 27).

Steps 28-30

Since the expected starting time of lot 2 is the earlier of the expected completion time of block 1-A and the expected starting time of lot 2, block 2-A is allocated (FIG. 33A, Step 28). Since a conflict occurs between lot 1 and lot 2 in the first transport mechanism CTC, the allocation of block 2-A is canceled and block 1-B is allocated (FIG. 33B, Step 29). The expected starting time of lot 2 is compared with the expected completion time of block 1-B. Block 2-A of the earlier one is allocated (FIG. 33C, Step 30).

Steps 31-33

The expected completion times of block 1-B and block 2-A are compared. Since the block 2-A is the earlier, block 2-B is allocated after block 2-A (FIG. 34A, Step 31). Next, the expected completion times of block 1-B and block 1-C are compared. Block 1-C is allocated after block 1-B which is the earlier (FIG. 34B, Step 32). Since block 2-B has an earlier expected completion time than block 1-C, block 2-C is allocated after block 2-B (FIG. 34C, Step 33).

Steps 34-36

However, lot 1 is not unloaded from the drying unit LPD1 yet, and a conflict would occur between block 1-C of lot 1 and block 2-C of lot 2. That is, block 1-C and block 2-C cannot be allocated adjacent each other. Thus, block 2-C is eliminated. Since the option now is only block 1-D, block 1-D is allocated (FIG. 35A, Step 34). This completes allocation of all the blocks of lot 1. Since the option is only block 2-C, block 2-C is allocated (FIG. 35B, Step 35). The option is only block 2-D after block 2-C is allocated. Thus, block 2-D is allocated (FIG. 35C, Step 36).

The first allocating method described above can complete allocation of all blocks in step 36 which is earlier, i.e. taking fewer steps, than step 44 of the basic allocating method. This process of trial and error is indicated by signs 1-36 enclosed in the dotted lines in FIG. 23.

Thus, according to the first allocating method, the blocks are allocated based on the basic allocating method. When a waiting time occurring with certain of the blocks exceeds the allowed time for enabling a standby in a treating unit, allocation of such blocks is canceled. Based on the data (systematic chart of FIG. 23) representing combinations of the blocks in the lots according to the recipe, schedules are prepared by restarting a search at one branching point before a branching point upstream of each such block. Blocks downstream in the systematic chart of the blocks having a reason for being unallocable are not subjected to trial and error, which means a reduced number of times of trial. As a result, scheduling time can be shortened as compared with the basic allocating method described hereinbefore.

<Second Allocating Method> (Order of Loaded Lots)

Figure 36:
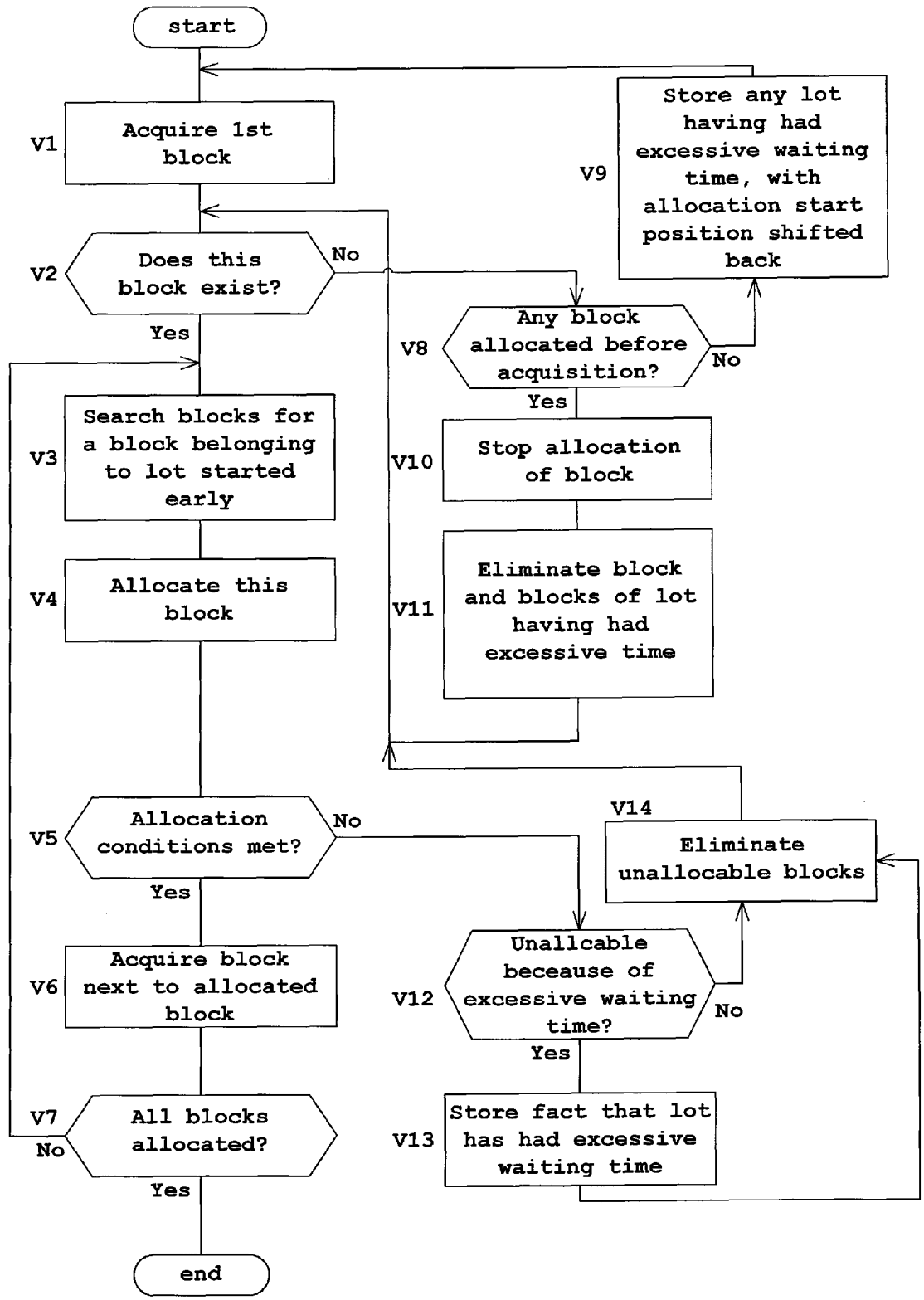
FIG. 36 is a flow chart showing a sequence of a second allocating method.
Figure 37:
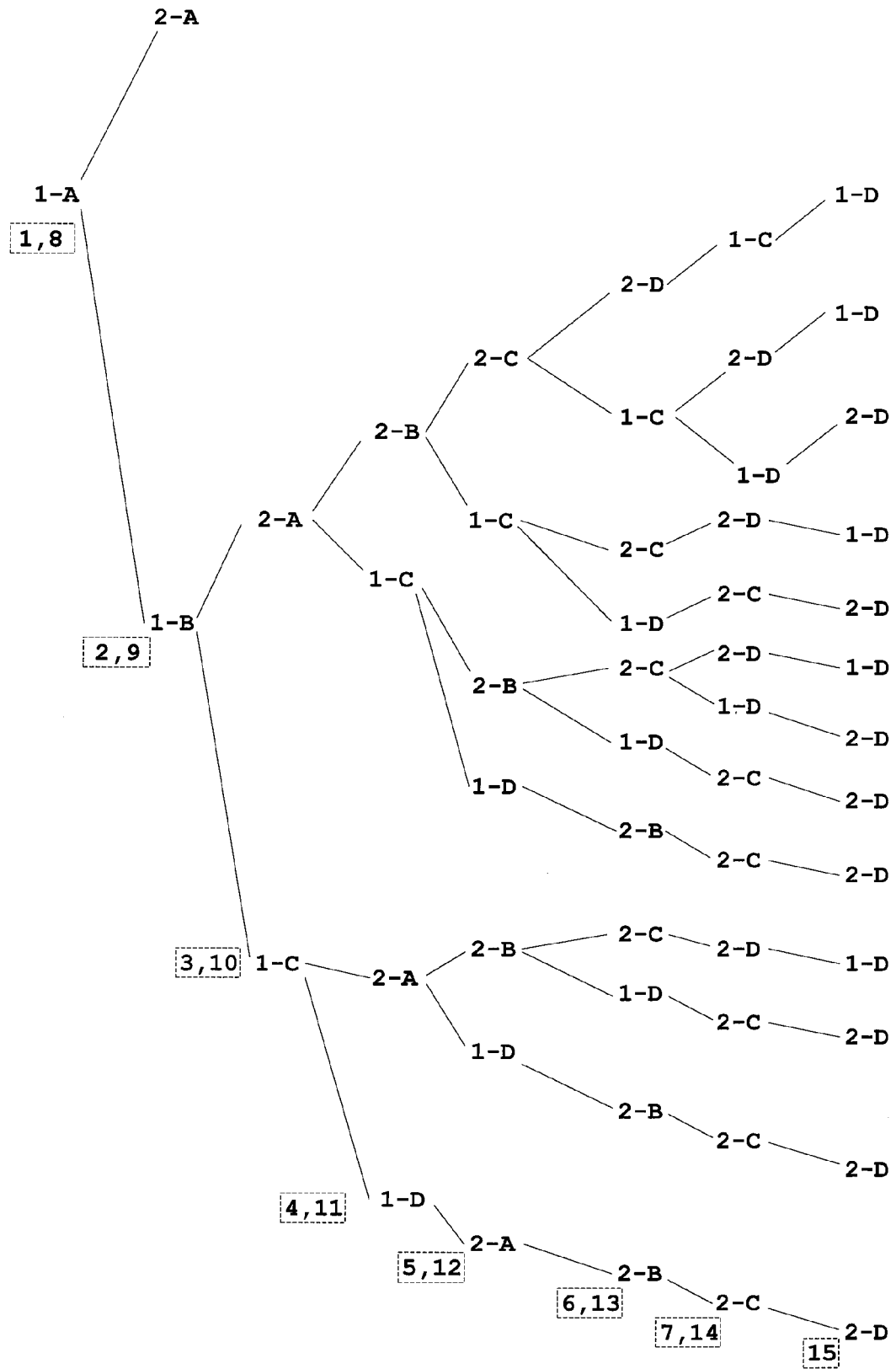
FIG. 37 is a schematic view showing an example of combinations of schedules in the second allocating method.

FIG. 36 is a flow chart showing a sequence of a second allocating method. FIG. 37 is a schematic view (systematic chart) showing an example of combinations of schedules in the second allocating method.

Steps V1, V2 and V4-V7 are the same as steps T1, T2 and T4-T7 in the foregoing basic allocating method, and will not particularly be described. The second allocating method corresponds to the "scheduling method for a substrate treating apparatus" in this invention.

Step V3

The acquired blocks are searched to determine a block belonging to a lot having an early expected starting time.

Steps V8-V11

Only steps V9 and V11 are different from steps T8-T11 in the basic allocating method and steps U8-U11 in the first allocating method. That is, step V9 is for storing in memory a lot including a block having had a waiting time exceeding the allowed time, with the allocation starting time of the first block of this lot shifted backward in time. Step V11 is for eliminating the blocks not allocated and the block having had the waiting time exceeding the allowed time.

Steps V12-V14

Step V13 is different from steps U12-U14 in the first allocating method. That is, step V13 stores the fact that the blocks belong to lot having had the waiting time exceeding the allowed time.

When lot 1 is started first in the above recipe and schedules are prepared by the second allocating method, a combination of blocks exists as shown in FIG. 37. The numbers enclosed in dotted lines in FIG. 37 correspond to the step numbers in the following description.

A specific example of schedule preparation will be described with reference to FIGS. 38 through 43. FIGS. 38 through 43 are time charts showing an allocating process by the second allocating method.

Steps 1-3

Block A-1 of lot 1 with an early expected completion time (expected starting time) is allocated first (FIG. 38A, Step 1). Next, a comparison between block 1-A and block 2-A shows that block 1-A is the earlier in the expected starting time of the lot, and therefore block 1-B is allocated after block 1-A (FIG. 38B, Step 2). Of block 1-B and block 2-A, block 1B has the earlier expected starting time. Thus, block 1-C is allocated after block 1-B (FIG. 38C, Step 3).

Steps 4-6

Of block 1-C and block 2-A, block 1C of lot 1 has the earlier expected starting time. Thus, block 1-D is allocated after block 1-C (FIG. 38C, Step 4). Since all the blocks of lot 1 have been allocated, block 2-A which is the only option left is allocated (FIG. 39B, Step 5). Next, block 2-B is allocated after block 2-A (FIG. 39C, Step 6).

Steps 7-9

Since the option is only block 2-C, block 2-C is allocated (FIG. 40A, Step 7). Assume, however, that its waiting time wt exceeds the allowed time. Then, the fact that allocation is impossible because the waiting time exceeds the allowed time is stored in memory, and unallocable blocks are eliminated. Specifically, all the blocks of lot 2 and all the blocks except block 1-A of lot 1 are eliminated (FIG. 40B, step 8). Subsequently, the interval in loading between lot 1 and lot 2 is extended, and scheduling is carried out again. Of lot 1 and lot 2, lot 1 has the earlier expected starting time. Thus, block 1-A is allocated (FIG. 40B, Step 8). Of block 1-B of lot 1 and block 2-A of lot 2, lot 1 has the earlier expected starting time. Thus, block 1-B is allocated (FIG. 40C, Step 9).

Steps 10-12

Of block 1-C of lot 1 and block 2-A of lot 2, lot 1 has the earlier expected starting time. Thus, block 1-C of lot 1 is allocated (FIG. 41A, Step 10). Next, of block 1-D and block 2-A, lot 1 has the earlier expected starting time. Thus, block 1-D is allocated (FIG. 41B, Step 11). Since all the blocks of lot 1 have been allocated, block 2-A of lot 2 is allocated (FIG. 41C, Step 12). However, the time interval between block 1-A and block 2-A has been extended to be longer than the previous time interval.

Steps 13-15

Since the option is only block 2-B, block 2-B is allocated (FIG. 42A, Step 13). Since the option is only block 2-C, block 2-C is allocated (FIG. 42B, Step 14). Next, since the option is only block 2-D, block 2-D is allocated (FIG. 42C, Step 15).

The second allocating method described above can complete allocation of all blocks in step 15 which is earlier, i.e. taking fewer steps, than step 44 of the basic allocating method. This process of trial and error is indicated by signs 1-15 enclosed in the dotted lines in FIG. 37.

Thus, the second allocating method allocates, with priority, blocks of a lot earlier in the order of starting treatment than another lot designated first. When the blocks of a different lot are allocated after allocating the blocks of a certain lot, a physical restriction can make the allocation impossible. The second allocating method can inhibit backtracking in allocation of the blocks such as tracing back the systematic chart. Consequently, scheduling time can be shortened.

<Third Allocating Method> (Consecutive Blocks)

Figure 44:
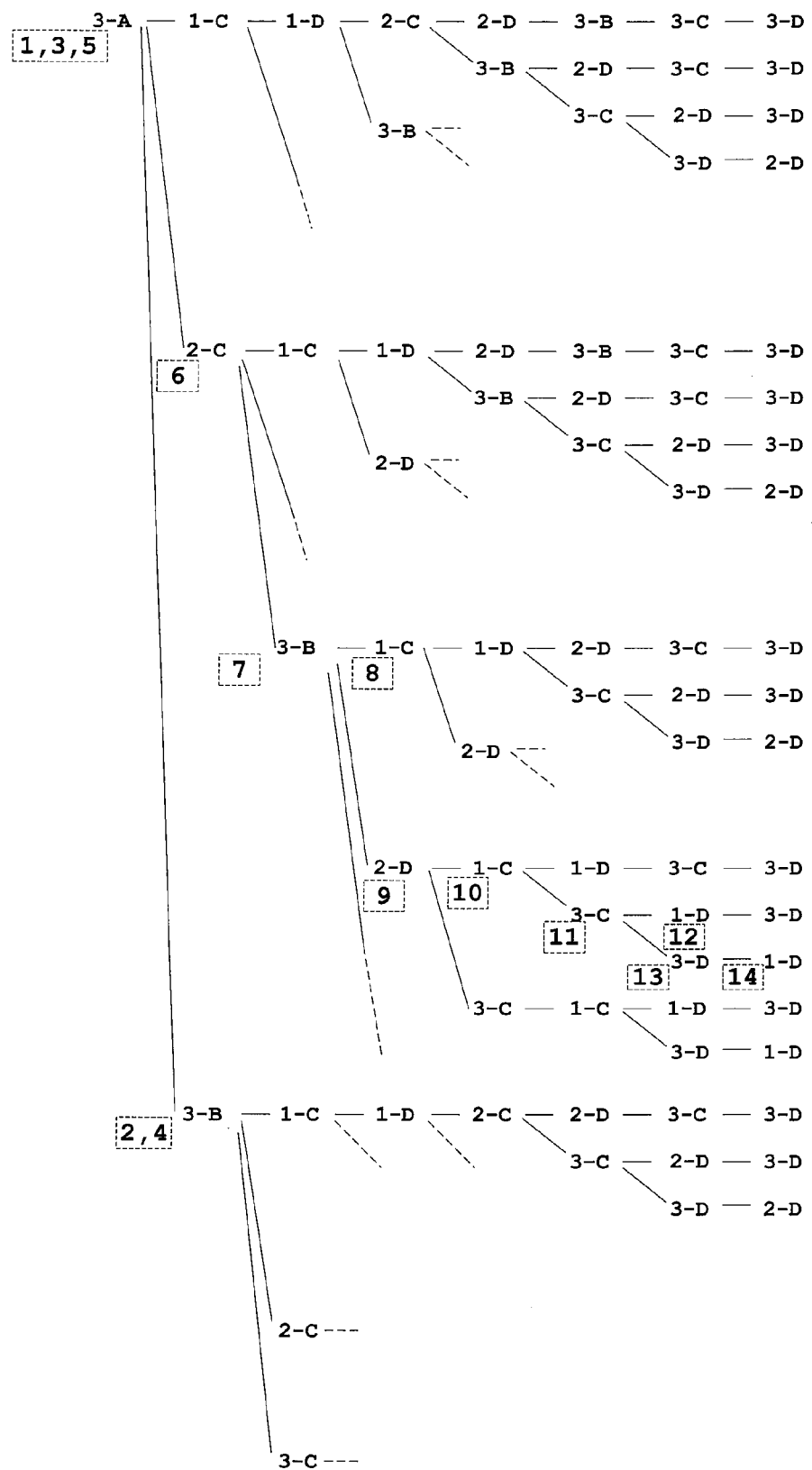
FIG. 44 is a schematic view showing an example of combinations of schedules for treating three lots by a basic allocating method.
Figure 45:
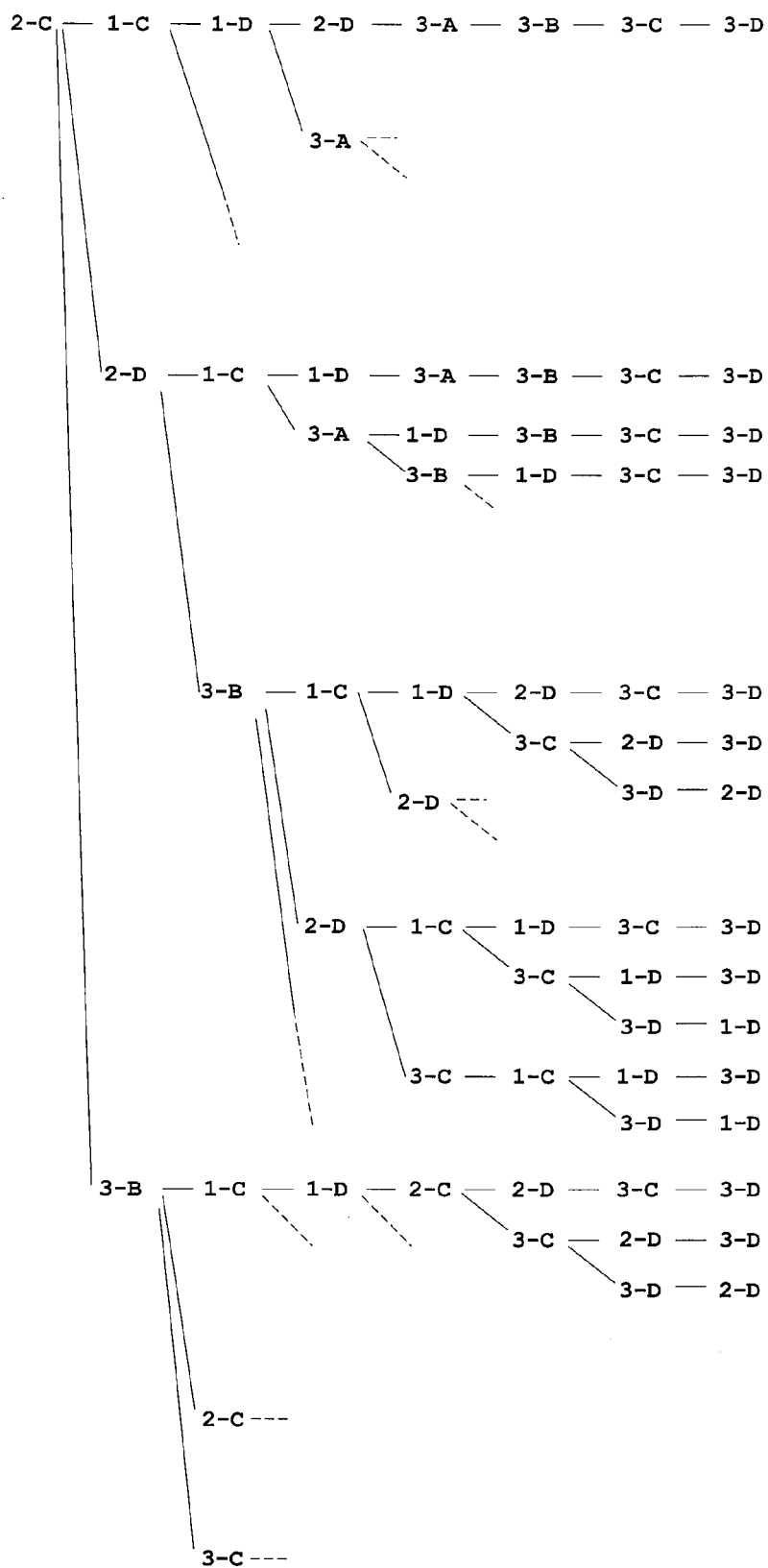
FIG. 45 is a schematic view showing an example of combinations of schedules for treating the three lots by the basic allocating method.

To facilitate understanding of the difference from the basic allocating method, this third allocating method will be described, applying a recipe as shown in FIG. 43, which is different from the foregoing recipe, and taking a case of scheduling three lots for example. FIG. 43A shows a specific example of time chart for lot 1 in a single batch. FIG. 43B shows a specific example of time chart for lot 2 in the single batch. FIG. 43C shows a specific example of time chart for lot 3 in the single batch.

Where the number of lots is three and the above recipe is applied, combinations of blocks exist as shown in FIGS. 44 and 45. FIG. 44 is a schematic view (systematic chart) showing an example of combinations of schedules for treating three lots by a basic allocating method. The numbers enclosed in dotted lines in FIG. 44 correspond to the step numbers in the following description.

This third allocating method corresponds to the "scheduling method for a substrate treating apparatus" in this invention.

<Basic Allocating Method for Three Lots>

A specific schedule preparation will be described with reference to FIGS. 46 through 51. FIGS. 46 through 51 are time charts showing allocating processes by the basic allocating method for the three lots.

An expected starting time of lot 3 is set after 1 and lot 2. Assume that the timing is as shown in FIG. 46A, for example. Specifically, the expected starting time for lot 3 is set to coincide with treatment of lot 1 in the deionized water cleaning unit ONB1 and treatment of lot 2 in the deionized water cleaning unit ONB2. Thus, block 1-B and block 2-B being under treatment at this point of time and subsequent blocks are canceled first (FIG. 46B).

Step 1

At this time, the expected starting time of lot 3 is the earliest among the expected completion time of block 1-B, the expected completion time of block 2-B and the expected starting time of lot 3. Thus, block 3-A is allocated (FIG. 46C, Step 1).

Steps 2-4

Since block 3-A has the earliest expected completion time among block 1-B, block 2-B and block 3-A, block 3-B is allocated (FIG. 47A, Step 2). However, since block 2-B has not been unloaded from the deionized water cleaning unit ONB2 yet, a conflict will occur between the lots. Therefore, block 3-B cannot be allocated. Then, the allocating position of block 3-A of lot 3 is shifted back in time (FIG. 47B, Step 3). Since block 3-A has the earliest expected completion time among block 1-B, block 2-B and block 3-A, block 3-B is allocated (FIG. 47C, Step 4).

Steps 5-7

Since lot 2 and lot 3 would collide in the deionized water cleaning unit ONB2, block 3-B cannot be allocated. Therefore, block 3-B is eliminated, and block 3-A is shifted back in time again (FIG. 48A, Step 5). Next, block 2-C is allocated after block 2-B having the earliest expected completion time among block 1-B, block 2-B and block 3-A (FIG. 48B, Step 6). Next, block 3-B is allocated after block 3-A having the earliest expected completion time among block 1-B, block 2-C and block 3-A (FIG. 48C, Step 7).

Steps 8-10

Block 1-C is allocated after block 1-B having the earliest expected completion time among block 1-B, block 2-C and block 3-B (FIG. 49A, Step 8). However, since a conflict occurs between the lots, block 1-C is canceled, and 2-D is allocated after block 2-C having the earlier expected completion time of block 2-C and block 3-B (FIG. 49B, Step 9). Next, block 1-C is allocated after block 1-B having the earliest expected completion time among block 1-B, block 2-D and block 3-B (FIG. 49C, Step 10).

Steps 11-13

Block 3-C is allocated after block 3-B having the earlier expected completion time of block 1-C and block 3-B (FIG. 50A, Step 11). However, since block 1-C and block 3-C conflict, the allocation of block 3-C is avoided, and block 1-D is allocated after block 1-C (FIG. 50B, Step 12). Next, since the option is only block 3-C, block 3-C is allocated (FIG. 50C, Step 13).

Step 14

Since the option is only block 3-D, block 3-D is allocated after block 3-C (FIG. 51, Step 14).

According to the basic allocating method for three lots, as described above, the allocation of all the blocks is completed in step 14. This process of trial and error is indicated by signs 1-14 enclosed in the dotted lines in FIG. 44.

Figure 52:
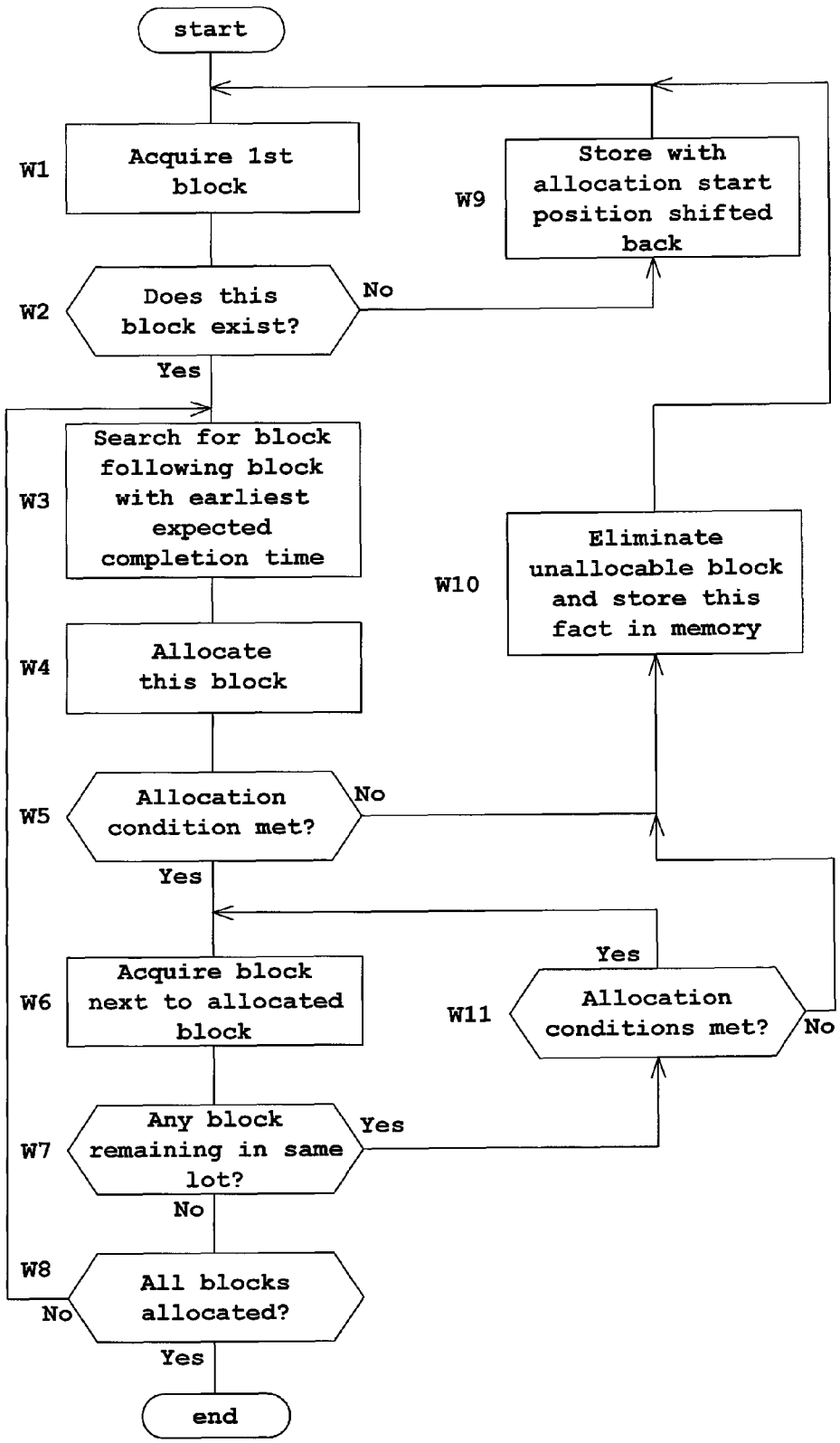
Figure 53:
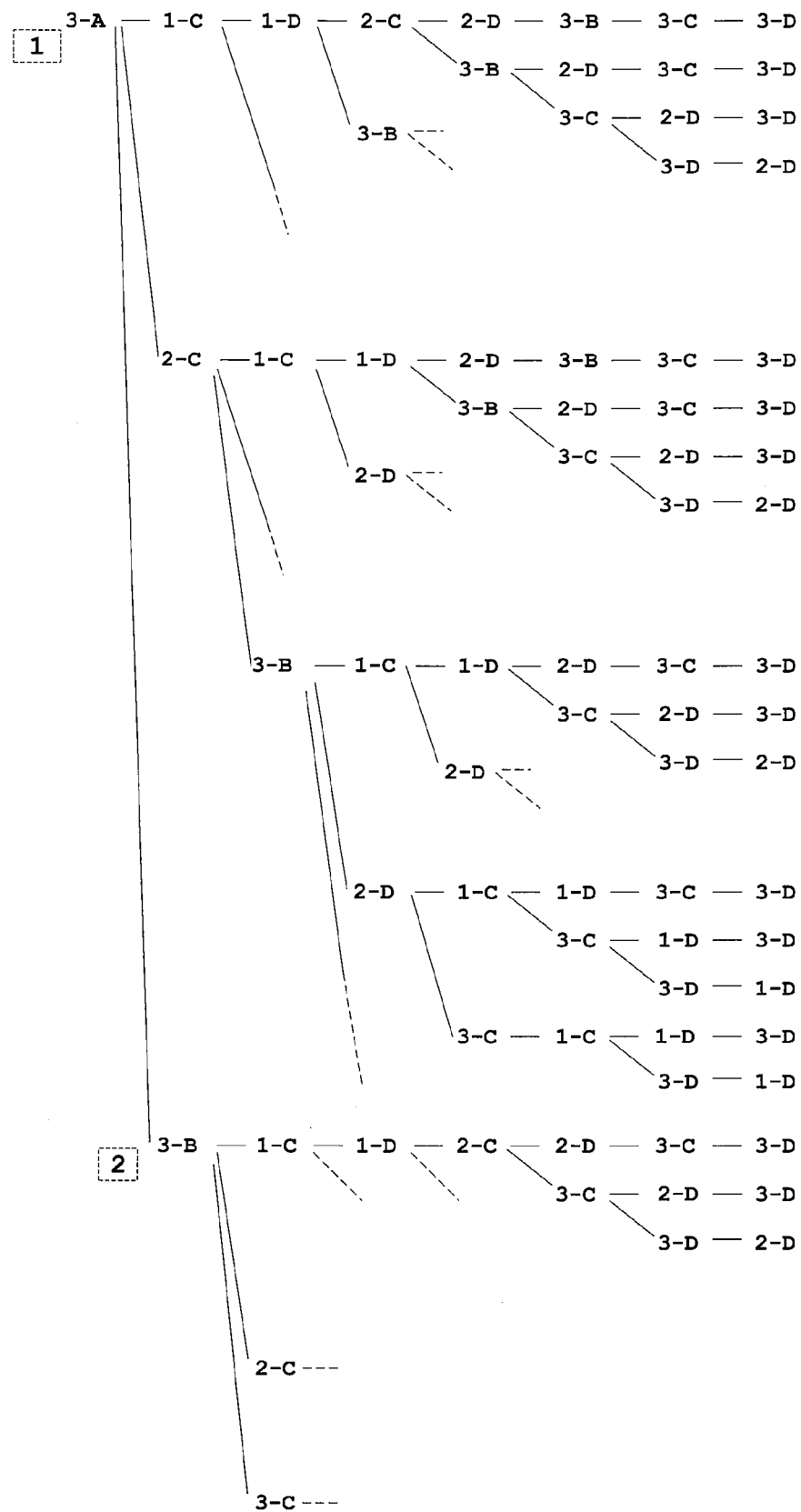
Figure 54:
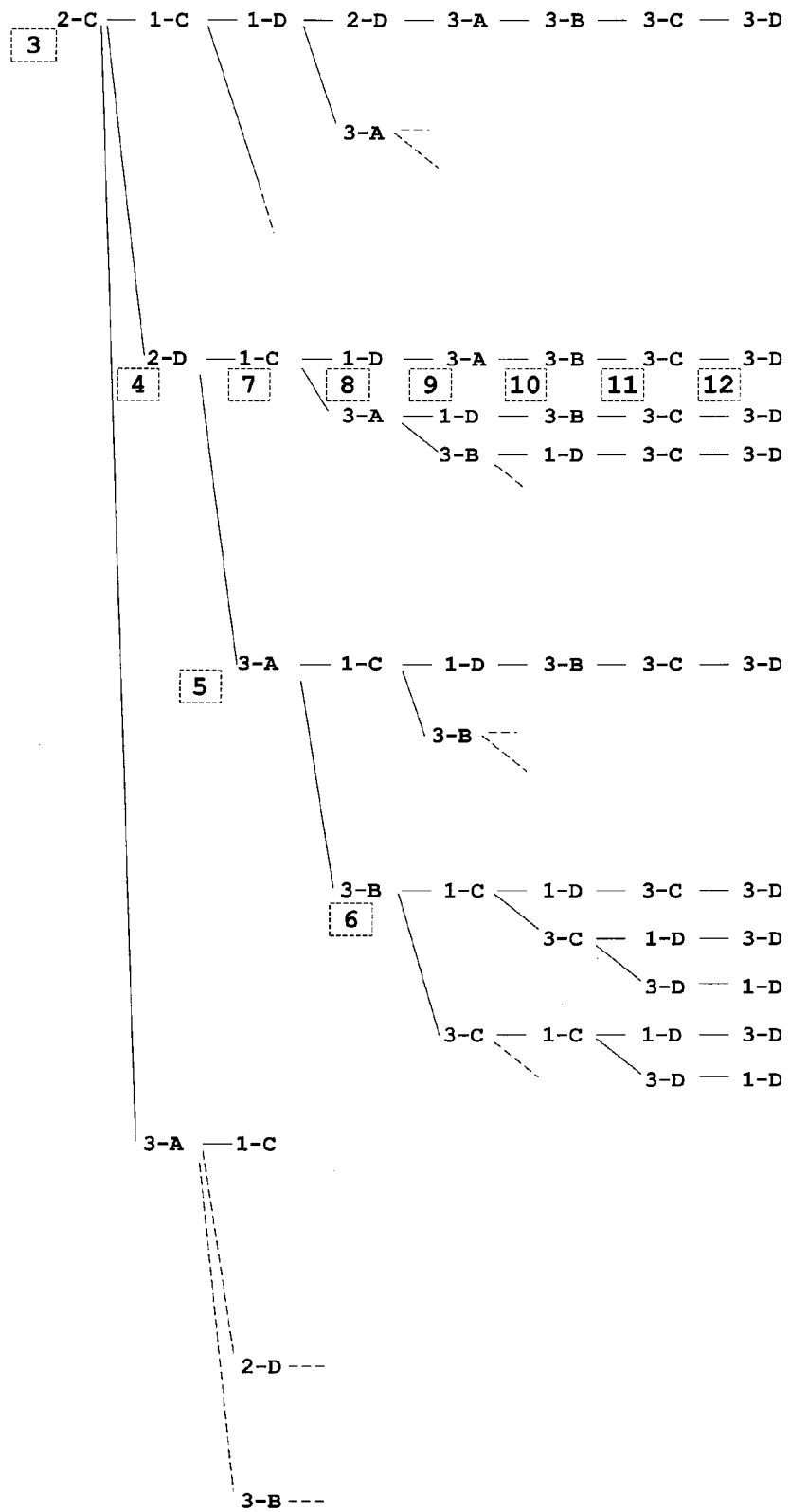

Next, the third allocating method will be described. FIG. 52 is a flow chart showing a sequence of the third allocating method. FIGS. 53 and 54 are schematic view (systematic charts) showing examples of combinations of schedules in the third allocating method.

Steps W1 and W2

The first block not started yet is acquired from among the lots not in the unallocable state. The process is branched depending on whether such block exists or not.

Steps W3-W8

Acquired blocks are searched to determine a block following a block having the earliest expected completion time (Step W3), and this block is allocated (Step W4). The process is branched depending on whether allocation conditions are met (Step W5). When the allocation conditions are met, a block following the allocated block is acquired (Step W6). The process is branched depending on whether the same lot includes a block next to the above block (Step W7). When there is no next block, the process is branched depending on whether all the blocks have been allocated. The process from step W3 is repeated until all the blocks have been allocated (Step W8).

Step W9

When step W2 finds no block, the unallocable state is reset. The allocation start position of the first block in the lot is shifted back in time, and this position is stored in memory.

Step W10

When, in step W5, the allocation conditions are not met, the blocks of the unallocable lot are eliminated. The fact of being unallocable is stored in memory.

Step W11

When step W7 finds a block in the same lot remaining unallocated, the process is branched whether this block meets the allocation conditions and can be allocated. When the block meets the allocation conditions and can be allocated, the process branches to step W6. Otherwise, the process branches to step W10.

A specific example of schedule preparation will be described with reference to FIGS. 55 through 59. FIGS. 55 through 59 are time charts showing an allocating process by the third allocating method.

As in the basic allocating method, an expected starting time of lot 3 is set after 1 and lot 2. Assume that the timing is as shown in FIG. 55A, for example. First, block 1-B and block 2-B being under treatment at this point of time and subsequent blocks are canceled (FIG. 55B).

Step 1

At this time, the expected starting time of lot 3 is the earliest among the expected completion time of block 1-B, the expected completion time of block 2-B and the expected starting time of lot 3. Thus, block 3-A is allocated (FIG. 55C, Step 1).

Steps 2-4

Since block 3-A has been allocated, block 3-B is allocated in succession (FIG. 56A, Step 2). However, since a conflict occurs between block 2-B and block 3-B, the allocation of block 3-B is avoided, and this fact is stored in memory. Since block 3-B cannot be allocated, blocks 3-A and 3-B are deleted, and block 2-C having the next earliest expected completion time is allocated (FIG. 56B, Step 3). Since the same lot 2 includes block 2-D, block 2-D is allocated after block 2-C (FIG. 56C, Step 4).

Steps 5-7

Since all the blocks of lot 2 have been allocated, block 3-A of lot 3 having the next earliest expected starting time is allocated (FIG. 57A, Step 5). Block 3-A was unallocable the previous time, and its allocation start position has been stored as shifted back in time. Therefore, the allocating position is shifted in time from the position in step 2 (FIG. 56A). Since block 3-A has now been allocated, block 3-B is allocated in succession (FIG. 57B, Step 6). However, since this allocation fails to meet the allocation conditions, block 3-B is eliminated and block 3-A also is eliminated, and block 1-C of lot 1 is allocated (FIG. 57C, Step 7).

Steps 8-10

Since block 1-C has been allocated, block 1-D is allocated in succession (FIG. 58A, Step 8). Since all the blocks of lot 1 have been allocated, lot 3 is allocated now. Since the allocating position was shifted in previous step 5 (FIG. 57A), block 3-A is now allocated in the position shifted further back in time (FIG. 58B, Step 9). Since block 3-A has been allocated, block 3-B is allocated in succession (FIG. 58C, Step 10).

Steps 11 and 12

Since block 3-B has been allocated, block 3-C is allocated in succession (FIG. 59A, Step 11). Since block 3-C has been allocated, block 3-D is allocated (FIG. 59B, Step 12).

The third allocating method described above can complete allocation of all blocks in step 12 which is earlier, i.e. taking fewer steps, than step 14 of the basic allocating method. This process of trial and error is indicated by signs 1-14 enclosed in the dotted lines in FIGS. 53 and 54.

In the third allocating method, as described above, the blocks in the same lot as the block allocated previously are allocated with priority. Therefore, this method can shorten scheduling time in scheduling treatment resumed after the apparatus is stopped.

<Fourth Allocating Method>

FIG. 60 is a flow chart showing a sequence of a fourth allocating method. FIG. 61 is a schematic view (systematic chart) showing an example of combinations of schedules in the fourth allocating method.

Steps X1, X2 and X4-X7 are the same as steps T1, T2 and T4-T7 in the foregoing basic allocating method, and will not be described again.

The fourth allocating method corresponds to the "scheduling method for a substrate treating apparatus" in this invention.

Step X3

The acquired blocks are searched to determine a block whose preceding block has the shortest allowed time. However, in comparing first blocks, the one having an earlier expected starting time is selected.

Steps X8-X11

Steps X9 and X11 are different from the basic allocating method. That is, step X9 is for storing in memory blocks of a lot having had a waiting time exceeding the allowed time, with the allocation starting time shifted back. Step V11 is for acquiring again blocks having been acquired simultaneously with the block not allocated, and eliminating the block not allocated and the block having had a waiting time exceeding the allowed time.

Steps X12-X14

These steps are the same as in the second allocating method described hereinbefore.

When lot 1 is started first in the recipe for the basic allocating method, first allocating method and second allocating method, and schedules are prepared by the fourth allocating method, a combination of blocks exists as shown in FIG. 61. The numbers enclosed in dotted lines in FIG. 61 correspond to the step numbers in the following description.

A specific example of schedule preparation will be described with reference to FIGS. 62 through 66. FIGS. 62 through 66 are time charts showing an allocating process by the second allocating method. It is assumed in this example, however, that allowed time=0 for the first transport mechanism CTC, that allowed time=∞ for the drying unit LPD1, and that allowed time=∞ for the deionized water cleaning unit ONB1 of the first treating section and for the deionized water cleaning unit ONB2 of the second treating section.

Steps 1-3

Block A-1 of lot 1 with an early expected completion time (expected starting time) is allocated first (FIG. 62A, Step 1). Block 1-B and block 2-A are allocable next. Of the expected starting times of preceding block 1-A and lot 2, block 1-A has the shorter allowed time. Thus, block 1-B following block 1-A is allocated (FIG. 62B, Step 2). Block 1-C and block 2-A are allocable next. Of the expected starting times of preceding block 1-B and lot 2, block 1-B has the shorter allowed time. Thus, block 1-C following block 1-B is allocated (FIG. 62C, Step 3).

Steps 4-6

Block 1-D and block 2-A of lot 2 are allocable next. The expected starting times of preceding block 1-C and lot 2 are equal in allowed time. Thus, the expected starting times of block 1-C and block 2-A are compared, and block 2-A having the earlier starting time is allocated (FIG. 63A, Step 4). Then, a comparison is made between the allowed times of block 1-C (allowed time=∞) and block 2-A (allowed time=0) preceding allocable block 1-D and block 2-B. Block 2-B following block 2-A having the shorter allowed time is allocated (FIG. 63B, Step 5). Next, a comparison is made between the allowed times of block 1-C (allowed time=∞) and block 2-B (allowed time=180 seconds) preceding allocable block 1-D and block 2-C. Block 2-C following block 2-B having the shorter allowed time is allocated (FIG. 63C, Step 6).

Steps 7-9

Assume, however, that waiting time wt of block 2-C exceeds the allowed time. Thus, the interval in loading between lot 1 and lot 2 is extended, and scheduling is carried out again. First, block 1-A of lot 1 having the early expected starting time is allocated (FIG. 64A, Step 7). Of the expected starting times of block 1-A preceding allocable block 1-B and lot 2 preceding allocable block 2-A, block 1-A has the shorter allowed time. Thus, block 1-B is allocated after block 1-A (FIG. 64B, Step 8). Subsequently, block 1-C with the short allowed time is allocated (FIG. 64C, Step 9).

Steps 10-12

Of the expected starting times of block 1-C and lot 2 preceding allocable block 1-D and block 2-A, respectively, block 2-A has the earlier expected starting time. Thus, block 2-A is allocated (FIG. 65A, Step 10). Next, of preceding block 1-C (allowed time=∞) and block 2-A (allowed time=0 sec), block 2-A has the shorter allowed time. Thus, block 2-B is allocated after block 2-A (FIG. 65B, Step 11). Then, of preceding block 1-C (allowed time=∞) and block 2-B (allowed time=180 sec), block 2-B has the shorter allowed time. Thus, block 2-C is allocated after block 2-B (FIG. 65C, Step 12).

Steps 13-15

However, when block 2-C is allocated, there will be a conflict between lot 1 and lot 2 in the drying unit LPD1. Thus, block 2-C is eliminated and block 1-D is allocated (FIG. 66A, Step 13). Since all the blocks of lot 1 have been allocated, the option left is only block 2-C, and so block 2-C is allocated (FIG. 66B, Step 14). Since the option is only block 2-D, block 2-D is allocated (FIG. 66C, Step 15).

The fourth allocating method described above can complete allocation of all blocks in step 15 which is earlier, i.e. taking fewer steps, than step 44 of the basic allocating method. This process of trial and error is indicated by signs 1-15 enclosed in the dotted lines in FIG. 61.

According to the fourth allocating method, even though blocks with a short allowed time can be allocated physically, a failure in observing the allowed time could make allocation impossible. This often results in backtracking in their combinations (systematic chart). Thus, blocks with a short allowed time are allocated with priority, to facilitate avoidance of allocating impossibility due to the allowed time, thereby shortening scheduling time.

Schedules are prepared by using the scheduling methods including the above-mentioned basic allocating method, first allocating method, second allocating method, third allocating method and fourth allocating method. The operating rate of the substrate treating apparatus can be improved by carrying out a schedule with an early expected completion time among schedules prepared within a specified time. Moreover, schedule preparation time can be prevented from becoming prolonged by providing the plural types of allocating methods.

This invention is not limited to the foregoing embodiment, but may be modified as follows:

(1) In the foregoing embodiment, a scheduling method has been described taking the example of combining the basic allocating method with the first allocating method, second allocating method, third allocating method and fourth allocating method. It is also in accordance with this invention to combine the basic allocating method with at least one of the other allocating methods.

(2) In the foregoing embodiment, scheduling is carried out for treating two or three lots simultaneously. This invention is applicable also where schedules are made for four or more lots.

(3) The foregoing embodiment has been described taking recipes for carrying out water cleaning treatment and drying treatment of the lots, for example. This invention is not limited to these recipes, but may employ various other recipes.

This invention may be embodied in other specific forms without departing from the spirit or essential attributes thereof and, accordingly, reference should be made to the appended claims, rather than to the foregoing specification, as indicating the scope of the invention.

What is claimed is:

1. A scheduling method for a substrate treating apparatus having a plurality of treating units for treating substrates, wherein, based on a procedure including a plurality of treating steps, a controller determines an order of treating a plurality of lots successively in the treating units, said method comprising the steps of:

preparing a plurality of schedules through execution of:
    a basic allocating method, based on a systematic chart
        representing combinations of the treating steps for the respective lots, for allocating a first treating step of one of the lots, and thereafter, while following the systematic chart from said treating step, for searching and allocating as a next treating step a treating step selected from among succeeding treating steps in the lots, whose preceding treating step has an earliest expected completion time of all preceding treating steps; and a first allocating method for allocating treating steps based on said basic allocating method, and when a waiting time occurring with one of said treating steps exceeds an allowed time for enabling a standby at one of said treating units, for avoiding allocation of said one of said treating steps and restarting a search at one branching point before a branching point upstream of said one of said treating steps; and selecting one schedule having been completed within a specified time, from the plurality of schedules prepared.

2. A method as defined in claim 1, wherein said step of preparing a plurality of schedules includes, besides said allocating methods:

a second allocating method executed, when allocating treating steps based on said basic allocating method, for allocating a first treating step of each of first designated lots according to an order of starting treatment of the lots, and thereafter allocating a next treating step of one of the lots earlier in said order of starting treatment, with priority over next treating steps of the other lots.

3. A method as defined in claim 1, wherein said step of preparing a plurality of schedules includes, besides said allocating methods:

a third allocating method executed, when allocating treating steps based on said basic allocating method, and when one of the lots includes an allocable treating step following a treating step allocated previously, for allocating said allocable treating step of said one of the lots with priority.

4. A method as defined in claim 2, wherein said step of preparing a plurality of schedules includes, besides said allocating methods:

a third allocating method executed, when allocating treating steps based on said basic allocating method, and when one of the lots includes an allocable treating step following a treating step allocated previously, for allocating said allocable treating step of said one of the lots with priority.

5. A method as defined in claim 1, wherein said step of preparing a plurality of schedules includes, besides said allocating methods:

a fourth allocating method executed, when allocating treating steps based on said basic allocating method, for allocating, with priority, treating steps of a lot having a treating step with a short allowed time for enabling a standby at one of said treating units.

6. A method as defined in claim 2, wherein said step of preparing a plurality of schedules includes, besides said allocating methods:

a fourth allocating method executed, when allocating treating steps based on said basic allocating method, for allocating, with priority, treating steps of a lot having a treating step with a short allowed time for enabling a standby at one of said treating units.

7. A method as defined in claim 3, wherein said step of preparing a plurality of schedules includes, besides said allocating methods:

a fourth allocating method executed, when allocating treating steps based on said basic allocating method, for allocating, with priority, treating steps of a lot having a treating step with a short allowed time for enabling a standby at one of said treating units.

8. A scheduling method for a substrate treating apparatus having a plurality of treating units for treating substrates, wherein, based on a procedure including a plurality of treating steps, a controller determines an order of treating a plurality of lots successively in the treating units, said method comprising the steps of:

preparing a plurality of schedules through execution of:

a basic allocating method, based on a systematic chart representing combinations of the treating steps for the respective lots, for allocating a first treating step of one of the lots, and thereafter, while following the systematic chart from said treating step, for searching and allocating as a next treating step a treating step selected from among succeeding treating steps in the lots, whose preceding treating step has an earliest expected completion time of all preceding treating steps; and a second allocating method executed, when allocating treating steps based on said basic allocating method, for allocating a first treating step of each of first designated lots according to an order of starting treatment of the lots, and thereafter allocating a next treating step of one of the lots earlier in said order of starting treatment, with priority over next treating steps of the other lots; and selecting one schedule having been completed within a specified time, from the plurality of schedules prepared.

9. A method as defined in claim 8, wherein said step of preparing a plurality of schedules includes, besides said allocating methods:

a third allocating method executed, when allocating treating steps based on said basic allocating method, and when one of the lots includes an allocable treating step following a treating step allocated previously, for allocating said allocable treating step of said one of the lots with priority.

10. A method as defined in claim 8, wherein said step of preparing a plurality of schedules includes, besides said allocating methods:

a fourth allocating method executed, when allocating treating steps based on said basic allocating method, for allocating, with priority, treating steps of a lot having a treating step with a short allowed time for enabling a standby at one of said treating units.

11. A method as defined in claim 9, wherein said step of preparing a plurality of schedules includes, besides said allocating methods:

a fourth allocating method executed, when allocating treating steps based on said basic allocating method, for allocating, with priority, treating steps of a lot having a treating step with a short allowed time for enabling a standby at one of said treating units.

12. A scheduling method for a substrate treating apparatus having a plurality of treating units for treating substrates, wherein, based on a procedure including a plurality of treating steps, a controller determines an order of treating a plurality of lots successively in the treating units, said method comprising the steps of:

preparing a plurality of schedules through execution of:

a basic allocating method, based on a systematic chart representing combinations of the treating steps for the respective lots, for allocating a first treating step of one of the lots, and thereafter, while following the systematic chart from said treating step, for searching and allocating as a next treating step a treating step selected from among succeeding treating steps in the lots, whose preceding treating step has an earliest expected completion time of all preceding treating steps; and a third allocating method executed, when allocating treating steps based on said basic allocating method, and when one of the lots includes an allocable treating step following a treating step allocated previously, for allocating said allocable treating step of said one of the lots with priority; and selecting one schedule having been completed within a specified time, from the plurality of schedules prepared.

13. A method as defined in claim 12, wherein said step of preparing a plurality of schedules includes, besides said allocating methods:

a fourth allocating method executed, when allocating treating steps based on said basic allocating method, for allocating, with priority, treating steps of a lot having a treating step with a short allowed time for enabling a standby at one of said treating units.

14. A scheduling method for a substrate treating apparatus having a plurality of treating units for treating substrates, wherein, based on a procedure including a plurality of treating steps, a controller determines an order of treating a plurality of lots successively in the treating units, said method comprising the steps of preparing a plurality of schedules through execution of:

a basic allocating method, based on a systematic chart representing combinations of the treating steps for the respective lots, for allocating a first treating step of one of the lots, and thereafter, while following the systematic chart from said treating step, for searching and allocating as a next treating step a treating step selected from among succeeding treating steps in the lots, whose preceding treating step has an earliest expected completion time of all preceding treating steps; and a fourth allocating method executed, when allocating treating steps based on said basic allocating method, for allocating, with priority, treating steps of a lot having a treating step with a short allowed time for enabling a standby at one of said treating units; and selecting one schedule having been completed within a specified time, from the plurality of schedules prepared.

15. A scheduling method for a substrate treating apparatus having a plurality of treating units for treating substrates, wherein, based on a procedure including a plurality of treating steps, a controller determines an order of treating a plurality of lots successively in the treating units, said method comprising the steps of:

preparing a plurality of schedules through execution of:

a first allocating method for allocating treating steps based on a basic allocating method which, based on a systematic chart representing combinations of the treating steps for the respective lots, allocates a first treating step of one of the lots, and thereafter, while following the systematic chart from said treating step, searches and allocates as a next treating step a treating step selected from among succeeding treating steps in the lots, whose preceding treating step has an earliest expected completion time of all preceding treating steps, and when a waiting time occurring with one of said treating steps exceeds an allowed time for enabling a standby at one of said treating units, for avoiding allocation of said one of said treating steps and restarting a search at one branching point before a branching point upstream of said one of said treating steps; and a second allocating method executed, when allocating treating steps based on said basic allocating method, for allocating a first treating step of each of first designated lots according to an order of starting treatment of the lots, and thereafter allocating a next treating step of one of the lots earlier in said order of starting treatment, with priority over next treating steps of the other lots; and selecting one schedule having been completed within a specified time, from the plurality of schedules prepared.

16. A method as defined in claim 15, wherein said step of preparing a plurality of schedules includes, besides said allocating methods:

a third allocating method executed, when allocating treating steps based on said basic allocating method, and when one of the lots includes an allocable treating step following a treating step allocated previously, for allocating said allocable treating step of said one of the lots with priority.

17. A method as defined in claim 15, wherein said step of preparing a plurality of schedules includes, besides said allocating methods:

a fourth allocating method executed, when allocating treating steps based on said basic allocating method, for allocating, with priority, treating steps of a lot having a treating step with a short allowed time for enabling a standby at one of said treating units.

18. A method as defined in claim 16, wherein said step of preparing a plurality of schedules includes, besides said allocating methods:

a fourth allocating method executed, when allocating treating steps based on said basic allocating method, for allocating, with priority, treating steps of a lot having a treating step with a short allowed time for enabling a standby at one of said treating units.

19. A scheduling method for a substrate treating apparatus having a plurality of treating units for treating substrates, wherein, based on a procedure including a plurality of treating steps, a controller determines an order of treating a plurality of lots successively in the treating units, said method comprising the steps of:

preparing a plurality of schedules through execution of:

a first allocating method for allocating treating steps based on a basic allocating method which, based on a systematic chart representing combinations of the treating steps for the respective lots, allocates a first treating step of one of the lots, and thereafter, while following the systematic chart from said treating step, searches and allocates as a next treating step a treating step selected from among succeeding treating steps in the lots, whose preceding treating step has an earliest expected completion time of all preceding treating steps, and when a waiting time occurring with one of said treating steps exceeds an allowed time for enabling a standby at one of said treating units, for avoiding allocation of said one of said treating steps and restarting a search at one branching point before a branching point upstream of said one of said treating steps; and a third allocating method executed, when allocating treating steps based on said basic allocating method, and when one of the lots includes an allocable treating step following a treating step allocated previously, for allocating said allocable treating step of said one of the lots with priority; and selecting one schedule having been completed within a specified time, from the plurality of schedules prepared.

20. A method as defined in claim 19, wherein said step of preparing a plurality of schedules includes, besides said allocating methods:

a fourth allocating method executed, when allocating treating steps based on said basic allocating method, for allocating, with priority, treating steps of a lot having a treating step with a short allowed time for enabling a standby at one of said treating units.

21. A scheduling method for a substrate treating apparatus having a plurality of treating units for treating substrates, wherein, based on a procedure including a plurality of treating steps, a controller determines an order of treating a plurality of lots successively in the treating units, said method comprising the steps of preparing a plurality of schedules through execution of:

a first allocating method for allocating treating steps based on a basic allocating method which, based on a systematic chart representing combinations of the treating steps for the respective lots, allocates a first treating step of one of the lots, and thereafter, while following the systematic chart from said treating step, searches and allocates as a next treating step a treating step selected from among succeeding treating steps in the lots, whose preceding treating step has an earliest expected completion time of all preceding treating steps, and when a waiting time occurring with one of said treating steps exceeds an allowed time for enabling a standby at one of said treating units, for avoiding allocation of said one of said treating steps and restarting a search at one branching point before a branching point upstream of said one of said treating steps; and a fourth allocating method executed, when allocating treating steps based on said basic allocating method, for allocating, with priority, treating steps of a lot having a treating step with a short allowed time for enabling a standby at one of said treating units; and selecting one schedule having been completed within a specified time, from the plurality of schedules prepared.

22. A scheduling method for a substrate treating apparatus having a plurality of treating units for treating substrates, wherein, based on a procedure including a plurality of treating steps, a controller determines an order of treating a plurality of lots successively in the treating units, said method comprising the steps of:

preparing a plurality of schedules through execution of:

a second allocating method for allocating treating steps based on a basic allocating method which, based on a systematic chart representing combinations of the treating steps for the respective lots, allocates a first treating step of one of the lots, and thereafter, while following the systematic chart from said treating step, searches and allocates as a next treating step a treating step selected from among succeeding treating steps in the lots, whose preceding treating step has an earliest expected completion time of all preceding treating steps, and for allocating a first treating step of each of first designated lots according to an order of starting treatment of the lots, and thereafter allocating a next treating step of one of the lots earlier in said order of starting treatment, with priority over next treating steps of the other lots; and a third allocating method executed, when allocating treating steps based on said basic allocating method, and when one of the lots includes an allocable treating step following a treating step allocated previously, for allocating said allocable treating step of said one of the lots with priority; and selecting one schedule having been completed within a specified time, from the plurality of schedules prepared.

23. A method as defined in claim 22, wherein said step of preparing a plurality of schedules includes, besides said allocating methods:

a fourth allocating method executed, when allocating treating steps based on said basic allocating method, for allocating, with priority, treating steps of a lot having a treating step with a short allowed time for enabling a standby at one of said treating units.

24. A scheduling method for a substrate treating apparatus having a plurality of treating units for treating substrates, wherein, based on a procedure including a plurality of treating steps, a controller determines an order of treating a plurality of lots successively in the treating units, said method comprising the steps of:

preparing a plurality of schedules through execution of:

a second allocating method for allocating treating steps based on a basic allocating method which, based on a systematic chart representing combinations of the treating steps for the respective lots, allocates a first treating step of one of the lots, and thereafter, while following the systematic chart from said treating step, searches and allocates as a next treating step a treating step selected from among succeeding treating steps in the lots, whose preceding treating step has an earliest expected completion time of all preceding treating steps, and for allocating a first treating step of each of first designated lots according to an order of starting treatment of the lots, and thereafter allocating a next treating step of one of the lots earlier in said order of starting treatment, with priority over next treating steps of the other lots; and a fourth allocating method executed, when allocating treating steps based on said basic allocating method, for allocating, with priority, treating steps of a lot having a treating step with a short allowed time for enabling a standby at one of said treating units; and selecting one schedule having been completed within a specified time, from the plurality of schedules prepared.

25. A scheduling method for a substrate treating apparatus having a plurality of treating units for treating substrates, wherein, based on a procedure including a plurality of treating steps, a controller determines an order of treating a plurality of lots successively in the treating units, said method comprising the steps of:

preparing a plurality of schedules through execution of:

a third allocating method for allocating treating steps based on a basic allocating method which, based on a systematic chart representing combinations of the treating steps for the respective lots, allocates a first treating step of one of the lots, and thereafter, while following the systematic chart from said treating step, searches and allocates as a next treating step a treating step selected from among succeeding treating steps in the lots, whose preceding treating step has an earliest expected completion time of all preceding treating steps, and when one of the lots includes an allocable treating step following a treating step allocated previously, for allocating said allocable treating step of said one of the lots with priority; and a fourth allocating method executed, when allocating treating steps based on said basic allocating method, for allocating, with priority, treating steps of a lot having a treating step with a short allowed time for enabling a standby at one of said treating units; and selecting one schedule having been completed within a specified time, from the plurality of schedules prepared.

26. A method as defined in claim 1, wherein said step of selecting one schedule is executed by said controller to select a single schedule relating a treatment completed earliest, from among schedules completed within the specified time.

27. A method as defined in claim 8, wherein said step of selecting one schedule is executed by said controller to select a single schedule relating a treatment completed earliest, from among schedules completed within the specified time.

28. A method as defined in claim 12, wherein said step of selecting one schedule is executed by said controller to select a single schedule relating a treatment completed earliest, from among schedules completed within the specified time.

29. A method as defined in claim 14, wherein said step of selecting one schedule is executed by said controller to select a single schedule relating a treatment completed earliest, from among schedules completed within the specified time.

30. A method as defined in claim 15, wherein said step of selecting one schedule is executed by said controller to select a single schedule relating a treatment completed earliest, from among schedules completed within the specified time.

31. A method as defined in claim 19, wherein said step of selecting one schedule is executed by said controller to select a single schedule relating a treatment completed earliest, from among schedules completed within the specified time.

32. A method as defined in claim 21, wherein said step of selecting one schedule is executed by said controller to select a single schedule relating a treatment completed earliest, from among schedules completed within the specified time.

33. A method as defined in claim 22, wherein said step of selecting one schedule is executed by said controller to select a single schedule relating a treatment completed earliest, from among schedules completed within the specified time.

34. A method as defined in claim 24, wherein said step of selecting one schedule is executed by said controller to select a single schedule relating a treatment completed earliest, from among schedules completed within the specified time.

35. A method as defined in claim 25, wherein said step of selecting one schedule is executed by said controller to select a single schedule relating a treatment completed earliest, from among schedules completed within the specified time.

36. A scheduling program for a substrate treating apparatus having a plurality of treating units for treating substrates, wherein, based on a procedure including a plurality of treating steps, a controller determines an order of treating a plurality of lots successively in the treating units, said program comprising the steps of:

preparing a plurality of schedules through execution of:
a basic allocating method, based on a systematic chart representing combinations of the treating steps for the respective lots, for allocating a first treating step of one of the lots, and thereafter, while following the systematic chart from said treating step, for searching and allocating as a next treating step a treating step selected from among succeeding treating steps in the lots, whose preceding treating step has an earliest expected completion time of all preceding treating steps; and a first allocating method for allocating treating steps based on said basic allocating method, and when a waiting time occurring with one of said treating steps exceeds an allowed time for enabling a standby at one of said treating units, for avoiding allocation of said one of said treating steps and restarting a search at one branching point before a branching point upstream of said one of said treating steps; and selecting one schedule having been completed within a specified time, from the plurality of schedules prepared.

37. A scheduling program for a substrate treating apparatus having a plurality of treating units for treating substrates, wherein, based on a procedure including a plurality of treating steps, a controller determines an order of treating a plurality of lots successively in the treating units, said program comprising the steps of:

preparing a plurality of schedules through execution of:
a basic allocating method, based on a systematic chart representing combinations of the treating steps for the respective lots, for allocating a first treating step of one of the lots, and thereafter, while following the systematic chart from said treating step, for searching and allocating as a next treating step a treating step selected from among succeeding treating steps in the lots, whose preceding treating step has an earliest expected completion time of all preceding treating steps; and a second allocating method executed, when allocating treating steps based on said basic allocating method, for allocating a first treating step of each of first designated lots according to an order of starting treatment of the lots, and thereafter allocating a next treating step of one of the lots earlier in said order of starting treatment, with priority over next treating steps of the other lots; and selecting one schedule having been completed within a specified time, from the plurality of schedules prepared.

38. A scheduling program for a substrate treating apparatus having a plurality of treating units for treating substrates, wherein, based on a procedure including a plurality of treating steps, a controller determines an order of treating a plurality of lots successively in the treating units, said program comprising the steps of preparing a plurality of schedules through execution of:
a basic allocating method, based on a systematic chart representing combinations of the treating steps for the respective lots, for allocating a first treating step of one of the lots, and thereafter, while following the systematic chart from said treating step, for searching and allocating as a next treating step a treating step selected from among succeeding treating steps in the lots, whose preceding treating step has an earliest expected completion time of all preceding treating steps; and a third allocating method executed, when allocating treating steps based on said basic allocating method, and when one of the lots includes an allocable treating step following a treating step allocated previously, for allocating said allocable treating step of said one of the lots with priority; and selecting one schedule having been completed within a specified time, from the plurality of schedules prepared.

39. A scheduling program for a substrate treating apparatus having a plurality of treating units for treating substrates, wherein, based on a procedure including a plurality of treating steps, a controller determines an order of treating a plurality of lots successively in the treating units, said program comprising the steps of:

preparing a plurality of schedules through execution of:
a basic allocating method, based on a systematic chart representing combinations of the treating steps for the respective lots, for allocating a first treating step of one of the lots, and thereafter, while following the systematic chart from said treating step, for searching and allocating as a next treating step a treating step selected from among succeeding treating steps in the lots, whose preceding treating step has an earliest expected completion time of all preceding treating steps; and a fourth allocating method executed, when allocating treating steps based on said basic allocating method, for allocating, with priority, treating steps of a lot having a treating step with a short allowed time for enabling a standby at one of said treating units; and selecting one schedule having been completed within a specified time, from the plurality of schedules prepared.

40. A scheduling program for a substrate treating apparatus having a plurality of treating units for treating substrates, wherein, based on a procedure including a plurality of treating steps, a controller determines an order of treating a plurality of lots successively in the treating units, said program comprising the steps of:

preparing a plurality of schedules through execution of:

a first allocating method for allocating treating steps based on a basic allocating method which, based on a systematic chart representing combinations of the treating steps for the respective lots, allocates a first treating step of one of the lots, and thereafter, while following the systematic chart from said treating step, searches and allocates as a next treating step a treating step selected from among succeeding treating steps in the lots, whose preceding treating step has an earliest expected completion time of all preceding treating steps, and when a waiting time occurring with one of said treating steps exceeds an allowed time for enabling a standby at one of said treating units, for avoiding allocation of said one of said treating steps and restarting a search at one branching point before a branching point upstream of said one of said treating steps; and a second allocating method executed, when allocating treating steps based on said basic allocating method, for allocating a first treating step of each of first designated lots according to an order of starting treatment of the lots, and thereafter allocating a next treating step of one of the lots earlier in said order of starting treatment, with priority over next treating steps of the other lots; and selecting one schedule having been completed within a specified time, from the plurality of schedules prepared.

41. A scheduling program for a substrate treating apparatus having a plurality of treating units for treating substrates, wherein, based on a procedure including a plurality of treating steps, a controller determines an order of treating a plurality of lots successively in the treating units, said program comprising the steps of:

preparing a plurality of schedules through execution of:

a first allocating method for allocating treating steps based on a basic allocating method which, based on a systematic chart representing combinations of the treating steps for the respective lots, allocates a first treating step of one of the lots, and thereafter, while following the systematic chart from said treating step, searches and allocates as a next treating step a treating step selected from among succeeding treating steps in the lots, whose preceding treating step has an earliest expected completion time of all preceding treating steps, and when a waiting time occurring with one of said treating steps exceeds an allowed time for enabling a standby at one of said treating units, for avoiding allocation of said one of said treating steps and restarting a search at one branching point before a branching point upstream of said one of said treating steps; and a third allocating method executed, when allocating treating steps based on said basic allocating method, and when one of the lots includes an allocable treating step following a treating step allocated previously, for allocating said allocable treating step of said one of the lots with priority; and selecting one schedule having been completed within a specified time, from the plurality of schedules prepared.

42. A scheduling program for a substrate treating apparatus having a plurality of treating units for treating substrates, wherein, based on a procedure including a plurality of treating steps, a controller determines an order of treating a plurality of lots successively in the treating units, said program comprising the steps of:

preparing a plurality of schedules through execution of:

a first allocating method for allocating treating steps based on a basic allocating method which, based on a systematic chart representing combinations of the treating steps for the respective lots, allocates a first treating step of one of the lots, and thereafter, while following the systematic chart from said treating step, searches and allocates as a next treating step a treating step selected from among succeeding treating steps in the lots, whose preceding treating step has an earliest expected completion time of all preceding treating steps, and when a waiting time occurring with one of said treating steps exceeds an allowed time for enabling a standby at one of said treating units, for avoiding allocation of said one of said treating steps and restarting a search at one branching point before a branching point upstream of said one of said treating steps; and a fourth allocating method executed, when allocating treating steps based on said basic allocating method, for allocating, with priority, treating steps of a lot having a treating step with a short allowed time for enabling a standby at one of said treating units; and selecting one schedule having been completed within a specified time, from the plurality of schedules prepared.

43. A scheduling program for a substrate treating apparatus having a plurality of treating units for treating substrates, wherein, based on a procedure including a plurality of treating steps, a controller determines an order of treating a plurality of lots successively in the treating units, said program comprising the steps of:

preparing a plurality of schedules through execution of:

a second allocating method for allocating treating steps based on a basic allocating method which, based on a systematic chart representing combinations of the treating steps for the respective lots, allocates a first treating step of one of the lots, and thereafter, while following the systematic chart from said treating step, searches and allocates as a next treating step a treating step selected from among succeeding treating steps in the lots, whose preceding treating step has an earliest expected completion time of all preceding treating steps, and for allocating a first treating step of each of first designated lots according to an order of starting treatment of the lots, and thereafter allocating a next treating step of one of the lots earlier in said order of starting treatment, with priority over next treating steps of the other lots; and a third allocating method executed, when allocating treating steps based on said basic allocating method, and when one of the lots includes an allocable treating step following a treating step allocated previously, for allocating said allocable treating step of said one of the lots with priority; and selecting one schedule having been completed within a specified time, from the plurality of schedules prepared.

44. A scheduling program for a substrate treating apparatus having a plurality of treating units for treating substrates, wherein, based on a procedure including a plurality of treating steps, a controller determines an order of treating a plurality of lots successively in the treating units, said program comprising the steps of:

preparing a plurality of schedules through execution of:

a second allocating method for allocating treating steps based on a basic allocating method which, based on a systematic chart representing combinations of the treating steps for the respective lots, allocates a first treating step of one of the lots, and thereafter, while following the systematic chart from said treating step, searches and allocates as a next treating step a treating step selected from among succeeding treating steps in the lots, whose preceding treating step has an earliest expected completion time of all preceding treating steps, and for allocating a first treating step of each of first designated lots according to an order of starting treatment of the lots, and thereafter allocating a next treating step of one of the lots earlier in said order of starting treatment, with priority over next treating steps of the other lots; and a fourth allocating method executed, when allocating treating steps based on said basic allocating method, for allocating, with priority, treating steps of a lot having a treating step with a short allowed time for enabling a standby at one of said treating units; and selecting one schedule having been completed within a specified time, from the plurality of schedules prepared.

45. A scheduling program for a substrate treating apparatus having a plurality of treating units for treating substrates, wherein, based on a procedure including a plurality of treating steps, a controller determines an order of treating a plurality of lots successively in the treating units, said program comprising the steps of:

preparing a plurality of schedules through execution of:

a third allocating method for allocating treating steps based on a basic allocating method which, based on a systematic chart representing combinations of the treating steps for the respective lots, allocates a first treating step of one of the lots, and thereafter, while following the systematic chart from said treating step, searches and allocates as a next treating step a treating step selected from among succeeding treating steps in the lots, whose preceding treating step has an earliest expected completion time of all preceding treating steps, and when one of the lots includes an allocable treating step following a treating step allocated previously, for allocating said allocable treating step of said one of the lots with priority; and a fourth allocating method executed, when allocating treating steps based on said basic allocating method, for allocating, with priority, treating steps of a lot having a treating step with a short allowed time for enabling a standby at one of said treating units; and selecting one schedule having been completed within a specified time, from the plurality of schedules prepared.

46. A scheduling method for a substrate treating apparatus having a plurality of treating units for treating substrates, wherein, based on a procedure including a plurality of treating steps, a controller determines an order of treating a plurality of lots successively in the treating units, said method comprising the steps of:

allocating the treating steps by a basic allocating method which, based on a systematic chart representing combinations of the treating steps for the respective lots, allocates a first treating step of one of the lots, and thereafter, while following the systematic chart from said treating step, and searches and allocates as a next treating step a treating step selected from among succeeding treating steps in the lots, whose preceding treating step has an earliest expected completion time of all preceding treating steps; and preparing schedules by using also a special allocating method executed, when allocating the treating steps based on said basic allocating method and a waiting time occurring with one of said treating steps exceeds an allowed time for enabling a standby at one of said treating units, for avoiding allocation of said one of said treating steps and restarting a search at one branching point before a branching point upstream of said one of said treating steps.

47. A scheduling program for a substrate treating apparatus having a plurality of treating units for treating substrates, wherein, based on a procedure including a plurality of treating steps, a controller determines an order of treating a plurality of lots successively in the treating units, said program comprising the steps of:

allocating the treating steps by a basic allocating method which, based on a systematic chart representing combinations of the treating steps for the respective lots, allocates a first treating step of one of the lots, and thereafter, while following the systematic chart from said treating step, and searches and allocates as a next treating step a treating step selected from among succeeding treating steps in the lots, whose preceding treating step has an earliest expected completion time of all preceding treating steps; and preparing schedules by using also a special allocating method executed, when allocating the treating steps based on said basic allocating method and a waiting time occurring with one of said treating steps exceeds an allowed time for enabling a standby at one of said treating units, for avoiding allocation of said one of said treating steps and restarting a search at one branching point before a branching point upstream of said one of said treating steps.

48. A scheduling method for a substrate treating apparatus having a plurality of treating units for treating substrates, wherein, based on a procedure including a plurality of treating steps, a controller determines an order of treating a plurality of lots successively in the treating units, said method comprising the steps of:

allocating the treating steps, based on a systematic chart representing combinations according to the order of treatment of the treating steps for the respective lots, by allocating a first treating step of one of the lots, and thereafter, while following the systematic chart from said treating step, searching and allocating a next treating step of each lot; and preparing schedules such that, in searching and allocating the next treating step, after allocating the first treating step of each of first designated lots according to an order of starting treatment of the lots, a next treating step of one of the lots earlier in said order of starting treatment is allocated with priority over next treating steps of the other lots.

49. A scheduling program for a substrate treating apparatus having a plurality of treating units for treating substrates, wherein, based on a procedure including a plurality of treating steps, a controller determines an order of treating a plurality of lots successively in the treating units, said program comprising the steps of:

allocating the treating steps, based on a systematic chart representing combinations according to the order of treatment of the treating steps for the respective lots, by allocating a first treating step of one of the lots, and thereafter, while following the systematic chart from said treating step, searching and allocating a next treating step of each lot; and preparing schedules such that, in searching and allocating the next treating step, after allocating the first treating step of each of first designated lots according to an order of starting treatment of the lots, a next treating step of one of the lots earlier in said order of starting treatment is allocated with priority over next treating steps of the other lots.

50. A scheduling method for a substrate treating apparatus having a plurality of treating units for treating substrates, wherein, based on a procedure including a plurality of treating steps, a controller determines an order of treating a plurality of lots successively in the treating units, said method comprising the steps of:

allocating the treating steps, based on a systematic chart representing combinations according to the order of treatment of the treating steps for the respective lots, by allocating a first treating step of one of the lots, and thereafter, while following the systematic chart from said treating step, searching and allocating a next treating step of each lot; and preparing schedules such that, in searching and allocating the next treating step, when one of the lots includes an allocable treating step following a treating step allocated previously, said allocable treating step of said one of the lots is allocated with priority.

51. A scheduling program for a substrate treating apparatus having a plurality of treating units for treating substrates, wherein, based on a procedure including a plurality of treating steps, a controller determines an order of treating a plurality of lots successively in the treating units, said program comprising the steps of:

allocating the treating steps, based on a systematic chart representing combinations according to the order of treatment of the treating steps for the respective lots, by allocating a first treating step of one of the lots, and thereafter, while following the systematic chart from said treating step, searching and allocating a next treating step of each lot; and preparing schedules such that, in searching and allocating the next treating step, when one of the lots includes an allocable treating step following a treating step allocated previously, said allocable treating step of said one of the lots is allocated with priority.

52. A scheduling method for a substrate treating apparatus having a plurality of treating units for treating substrates, wherein, based on a procedure including a plurality of treating steps, a controller determines an order of treating a plurality of lots successively in the treating units, said method comprising the steps of:

allocating the treating steps, based on a systematic chart representing combinations according to the order of treatment of the treating steps for the respective lots, by allocating a first treating step of one of the lots, and thereafter, while following the systematic chart from said treating step, searching and allocating a next treating step of each lot; and preparing schedules such that, in searching and allocating the next treating step, treating steps of a lot having a treating step with a short allowed time for enabling a standby at one of said treating units are allocated with priority.

53. A scheduling program for a substrate treating apparatus having a plurality of treating units for treating substrates, wherein, based on a procedure including a plurality of treating steps, a controller determines an order of treating a plurality of lots successively in the treating units, said program comprising the steps of:

allocating the treating steps, based on a systematic chart representing combinations according to the order of treatment of the treating steps for the respective lots, by allocating a first treating step of one of the lots, and thereafter, while following the systematic chart from said treating step, searching and allocating a next treating step of each lot; and preparing schedules such that, in searching and allocating the next treating step, treating steps of a lot having a treating step with a short allowed time for enabling a standby at one of said treating units are allocated with priority.

* * * * *